(12) United States Patent
Brynzda et al.

(10) Patent No.: US 8,030,422 B2
(45) Date of Patent: Oct. 4, 2011

(54) RECOVERABLE POLYMER-BOUND HOMOGENEOUS CATALYSTS FOR CATALYTIC CHAIN TRANSFER PROCESS

(75) Inventors: Henry Edward Brynzda, Avondale, PA (US); Michael Charles Grady, Oaklyn, NJ (US); Sigridur Soley Kristjansdottir, Wilmington, DE (US); Christina M. Older, Wilmington, DE (US); Matthew Arthur Page, Wilmington, DE (US); Joachim C. Ritter, Wilmington, DE (US); Wilson Tam, Boothwyn, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 236 days.

(21) Appl. No.: 11/505,270

(22) Filed: Aug. 16, 2006

(65) Prior Publication Data
US 2010/0261851 A1    Oct. 14, 2010

Related U.S. Application Data

(60) Provisional application No. 60/709,922, filed on Aug. 19, 2005, provisional application No. 60/709,921, filed on Aug. 19, 2005, provisional application No. 60/709,929, filed on Aug. 19, 2005, provisional application No. 60/709,779, filed on Aug. 19, 2005, provisional application No. 60/709,928, filed on Aug. 19, 2005.

(51) Int. Cl.
*C08F 4/60*    (2006.01)
*C07F 4/70*    (2006.01)
*C08F 4/80*    (2006.01)

(52) U.S. Cl. ............ 526/172; 526/169.1; 526/904; 526/69; 526/329.7; 526/318; 526/318.4; 526/303.1; 526/341; 526/332; 526/346; 526/344; 526/279; 502/171

(58) Field of Classification Search .......... 502/103; 526/172, 161, 169.1, 904
See application file for complete search history.

(56) References Cited

U.S. PATENT DOCUMENTS

| | | | |
|---|---|---|---|
| 4,526,945 A | 7/1985 | Carlson et al. | |
| 4,547,323 A | 10/1985 | Carlson | |
| 4,680,352 A * | 7/1987 | Janowicz et al. | 526/147 |
| 4,680,354 A | 7/1987 | Lin et al. | |
| 4,694,054 A | 9/1987 | Janowicz | |
| 4,886,861 A | 12/1989 | Janowicz | |
| 5,362,826 A | 11/1994 | Berge et al. | |
| 5,468,785 A * | 11/1995 | Greuel et al. | 522/63 |
| 5,587,431 A * | 12/1996 | Gridnev et al. | 525/269 |
| 5,602,220 A * | 2/1997 | Haddleton et al. | 526/172 |
| 5,726,263 A | 3/1998 | Gridnev | |
| 5,760,257 A * | 6/1998 | Tanaka et al. | 554/36 |
| 5,770,648 A | 6/1998 | Antonelli et al. | |
| 5,847,060 A | 12/1998 | Gridnev et al. | |
| 5,955,532 A | 9/1999 | Chang et al. | |
| 6,482,900 B1 * | 11/2002 | Nakagawa et al. | 526/90 |
| 6,635,690 B2 | 10/2003 | Heilmann et al. | |
| 7,022,792 B2 | 4/2006 | Gridnev et al. | |
| 2004/0063880 A1 | 4/2004 | Chisholm et al. | |
| 2006/0111535 A1 | 5/2006 | Gridnev et al. | |

FOREIGN PATENT DOCUMENTS

| | | |
|---|---|---|
| WO | WO 87/03605 | 6/1987 |
| WO | WO 89/11868 | 12/1989 |
| WO | WO 96/33224 | 10/1996 |
| WO | WO 98/18839 | 5/1998 |
| WO | WO 98/50436 | 11/1998 |

OTHER PUBLICATIONS

Wamser, et al., "Synthesis and Photoactivity of Chemically Asymmetric Polymeric Porphyrin Films Made by Interfacial Polymerization", J. Am. Chem. Soc. (1989), 111, pp. 8485-8491.
Bergbreiter, et al., "Anionic Syntheses of Terminally Functionalized Ethylene Oligemers", J. of Polymer Science: Part A: Polymer Chemistry, vol. 27 (1989), pp. 4205-4226.
Liang et al., "Coordination chemistry of a multidentate pyrrolylaldiminate ligand. X-ray crystal structure of double-helical bis-u-[N, N'-ethylenedi(5-tert-butyl-pyrrol-2-yldiminate)]-dimagnesium", J. of Organometallic Chemistry 689 (2004), pp. 945-952.
Hunt et al., "Discovery of the Pyrrolo[2, 1-f][1,2,4]triazine Nucleus as a New Kinase Inhibitor Template", J. Medicinal Chemistry (2004), 47, pp. 4054-4059.
Yadav et al., "Zinc-mediated acylation and sulfonation of pyrrole and its derivatives", Tetrahedron Letters 43 (2002), pp. 8133-8135.
Bedford, et al., "Orthopalladated and -platinated Bulky Triarylphosphite Complexes: Synthesis, Reactivity and Application as High-Activity Catalysts for Suzuke and Stille Coupling Reactions", Chemistry European Journal 9 (2003), pp. 3216-3227.
Chichak, et al., "Nanoscale Borromeates", J. Org. Chem. 70 (2005, pp. 7956-7962.
Bottoni et al., "Migratory Aptitudes of Simple Alkyl Groups in the Anionotropic Rearrangement of Quaternary Chloromethyl Borate Species: A Combined Experimental and Theoretical Investigation", J. Org. Chem. 68 (2003) pp. 3397-3405.
Busch et al., "Cobalt(II) Complexes of the Quadridentate Macrocycle 1,12-Dimethyl-3,7,11,17-tetraazabicyclo[11.3.1]heptadeca-1(17), 1,11,13,15-pentaene", Inorganic Chemistry 9 (3) (1970), pp. 505-512.
PCT International Search Report and Written Opinion for International Application No. PCT/US2006/032214 dated Jan. 12, 2007.

* cited by examiner

*Primary Examiner* — Rip A. Lee
(74) *Attorney, Agent, or Firm* — Brian J Myers

(57) ABSTRACT

Disclosed herein are novel polymer-tethered ligands, metal complexes comprising these ligands, and the use of these complexes as chain transfer catalysts to control the molecular weight of oligomeric and polymeric materials produced in a radical polymerization process. The materials made by the processes disclosed herein have significantly reduced color, making them suitable for a wide range of color-critical end-uses, including automotive coatings.

34 Claims, No Drawings

RECOVERABLE POLYMER-BOUND HOMOGENEOUS CATALYSTS FOR CATALYTIC CHAIN TRANSFER PROCESS

CROSS-REFERENCES

This application claims priority benefit from U.S. Provisional Application Ser. No. 60/709,922, filed Aug. 19, 2005; U.S. Provisional Application Ser. No. 60/709,921, filed Aug. 19, 2005; U.S. Provisional Application Ser. No. 60/709,929, Aug. 19, 2005; U.S. Provisional Application Ser. No. 60/709,779, Aug. 19, 2005; U.S. Provisional Application Ser. No. 60/709,928, Aug. 19, 2005, all of which are incorporated by reference herein for all purposes as if fully set forth.

FIELD OF THE INVENTION

Disclosed herein are recoverable polymer-bound homogeneous catalysts for catalytic chain transfer free radical polymerization processes. A process is also disclosed for controlling the molecular weight of polymer and copolymer produced from radical initiated polymerization with a recoverable catalytic chain transfer agent. Compositions of these new catalysts are also disclosed.

BACKGROUND OF THE INVENTION

The present disclosure relates to free radical polymerization processes employing chain transfer agents for controlling the molecular weight of polymer and copolymer product using a recoverable catalytic chain transfer agent. Removal of the catalyst at the end of the reaction results in colorless to lightly colored resins.

Techniques for controlling the molecular weight of polymer and copolymer with chain transfer agents are disclosed in the prior art, as described in U.S. Pat. Nos. 4,526,945 and 4,547,323, respectively. Problems associated with use of known chain transfer agents include undesirable odor, intense color, and broad molecular weight distribution in the resulting polymer. Improved chain transfer agents are of considerable interest to the chemical industry. Catalytic chain transfer (CCT) is a versatile technology that allows for effective molecular weight/chain length control in free radical polymerizations by controlling the amount of catalyst and initiator used. Materials with lower molecular weights (i.e., smaller chains) generally require the use of larger amounts of the catalyst system while those with higher molecular weights generally result from the use of lower catalyst concentrations.

Certain catalytic chain transfer agents such as various cobalt porphyrins, iron porphyrins, cobalt aza-porphyrins, cobalt hemiporphyrins, cobalt phthalocyanines, cobalt naphthapthalocyanines, cobalt dipyrrole bis(nitromethylidenes) and cobalt oxime complexes enable molecular weight control of free-radical polymerizations of methacrylates (such as methyl methacrylate), which can lead to the formation of small molecules (such as dimer, trimer, tetramer), oligomers or higher molecular weight poly(methacrylate) containing unsaturated end groups. The products from catalytic chain transfer can be used as macromonomers in further polymerization or copolymerization. Such macromonomers are commonly used in forming structured polymers particularly useful as dispersants, binders, and other additives in automotive exterior paints. Examples of such applications are described in U.S. Pat. Nos. 5,770,648; 6,635,690; and 5,955,532.

One limitation of CCT arises from the color of the homogeneous cobalt catalysts generally employed that cannot be easily removed from the product. U.S. Pat. Nos. 4,680,352, 4,694,054 and 4,886,861 disclose the use of cobalt(II) chelates in processes for free radical polymerization, wherein they act as catalytic chain transfer agents for controlling the molecular weight of the homopolymers and copolymers produced. The cobalt chelates are generally left in the polymer, or removed by extensive purification procedures, including filtering, ion exchange, chromatography, and the like. See, for example, U.S. Pat. Nos. 5,726,263 and 4,526,945. PCT Publication WO 87/03605 discloses the use of cobalt (III) compounds to produce oligomeric species by free radical polymerization of unsaturated monomers. These catalysts, while useful, are also not easily separated from the reaction mixture and typically remain in the final reaction product. Since colored catalyst species remain in the product, these versatile building blocks have limited use in applications that demand color-free and/or metal-free products such as clear coats used in automotive finishing and refinishing operations. Metal and color contaminant-free resins and catalysts that can be recovered and reused would have high value.

One aspect of the present disclosure is to provide novel catalysts for use as chain transfer catalysts in oligomerization and polymerization of olefinic monomers (preferably methacrylates and methacrylic acid derivatives), characterized in that said catalysts are homogeneous and display high activity during the polymerization stage of the process and can be easily removed after the polymerization reaction is completed by means of phase separation. Another aspect is to provide a process which uses these novel catalysts to yield macromonomer, oligomer, and polymer with less color than processes with conventional catalysts.

SUMMARY OF THE INVENTION

The embodiments disclosed herein provide a process for the polymerization and co-polymerization of olefinic monomers employing a polymer-bound chain transfer catalyst to produce a molecular weight controlled olefin-terminated macromonomer/oligomer/polymer, said process comprising:

forming a reaction medium comprising said olefinic monomers, an initiator and said chain transfer catalyst and performing the desired polymerization or co-polymerization reaction;

effecting a phase partition of the chain transfer catalyst; and separating said chain transfer catalyst from said macromonomer/oligomer/polymer.

The process described herein also allows for the optional reuse of said catalysts.

Also provided is the process wherein the phase partition is controlled by one or more of the following:
  adjusting said reaction medium's temperature;
  adjusting pressure of said reaction;
  adding solvent to said reaction medium; and
  adding one or more chemical agent(s) to said reaction medium.

Further provided is the process wherein the polymer-bound chain transfer catalyst comprises a central moiety CAT and one or more substituents Poly positioned on CAT to form $CAT\text{-}(Poly)_x$ wherein said Poly substituents are linear or branched polymer radicals with an average chain length equal to or greater than 20 atoms;
  x is an integer greater than or equal to 1; and
  wherein said moiety CAT is defined such that the compound $CAT\text{-}(R^1)_x,$ is a chain transfer catalyst, wherein $R^1$ is independently an H or $CH_3$ radical.

Most preferably, the central moiety CAT represents a metal centered catalyst.

Catalyst compositions and the ligands associated therewith as described above, and macromonomers/oligomers/polymers produced by the forgoing process are also described herein. Coatings made with the macromonomers/oligomers/polymers as well as articles comprising these coatings are also described herein.

DETAILED DESCRIPTION

The present disclosure relates to processes for polymerization of, for example, styrenes and acrylics including methacrylates employing a suitable metal containing catalyst as a chain transfer agent, wherein the metals are cobalt (II and III), and iron (II and III). As described herein, the catalyst is rendered recoverable by being covalently bound to or coordinatively associated with one or more polymer tethers. When employed for polymerization, these catalysts allow for controlled molecular weights and reduced color of the macromonomers, homopolymers and copolymers produced.

Polymer or copolymer produced by the present process contains one or more unsaturated end group(s). Such polymer or copolymer is referred to herein as "macromonomer". It has been found that macromonomers prepared in accordance with the disclosure herein can be polymerized or copolymerized to form polymer or copolymer with desirable physical properties, such as high tensile strength, low viscosity, improved crystallinity and clarity. Macromonomers having from 2 to about 1,000 monomer units are preferred as intermediates for making polymers and copolymers for paints and finishes, and most preferably, from 2 to about 200 monomer units. These macromonomers can also be used as chain transfer agents such as described in U.S. Pat. No. 5,362,826 of Berge et al., or where a high degree of branching is desired such as in U.S. Pat. No. 5,847,060 of Gridnev et al.

The recoverable catalyst described herein may be removed by a number of separation techniques depending on the polymer tether selected, the solvent system selected, and the temperature and pressure of the polymerization reaction. The polymer-tethered catalyst composition is selected to be soluble under the polymerization reaction conditions. Typically each system is designed so that alteration of conditions upon completion of the polymerization causes the catalytic material to be substantially in one phase of a biphasic mixture (either liquid or solid) and the polymeric products to be substantially in the other phase.

One aspect of the embodiments disclosed herein is to initiate the phase separation of the tethered catalyst from the polymerization mixture by altering the temperature. This may result in the formation of liquid/liquid or liquid/solid biphasic mixtures, wherein the initiation temperature may be either lower or higher than the reaction temperature. The removal of the catalyst can then be effected by extraction, decantation, precipitation, filtration, centrifugation, and other methods known to the skilled artisan.

If the polymerization reaction is conducted in a sealed vessel under pressure, phase separation of the polymer-tethered catalyst from the reaction medium as described above may also be initiated by changing, e.g., reducing, the pressure. The catalyst may then be removed from the polymer mixture using the techniques described above.

Separation of the catalyst may also be facilitated by the addition of solvent and/or a chemical agent to produce a biphasic mixture, after which the catalyst can then be removed by the techniques described above. Examples of a liquid-liquid biphasic catalyst separation technique are known to those skilled in the art. As used herein, chemical agent is water, salt, or a polymer-bound ligand, said ligand being selected from the group consisting of pyridines, imidazoles, phosphines, phosphites, and arsines. As used herein, any convenient salt may be used, with lithium chloride, sodium chloride, potassium chloride, lithium sulfate, sodium sulfate, and potassium sulfate most commonly used.

The catalysts described herein are generally comprised of any homogeneous chain transfer catalyst CAT that has been modified by the addition of soluble polymer chains (Poly "tethers") in such a way that the resultant modified catalysts can be separated and recovered at the end of the polymerization reaction, and optionally recycled. These novel catalysts can be represented by a central moiety CAT and one or more substituents Poly positioned on CAT to form CAT-(Poly)x wherein said Poly radicals are linear or branched polymers with an average chain length equal to or greater than 20 atoms;

x is an integer greater than or equal to 1; and wherein the said moiety CAT is defined such that the compound CAT-($R^1$)x is a chain transfer catalyst, wherein $R^1$ is independently H or $CH_3$.

CAT-($R^1$)x is a conventional chain transfer catalyst that cannot be easily removed from the product of a chain transfer catalyzed polymerization. CAT-($R^1$)x is preferably a metal-centered homogeneous chain transfer catalyst. For example, when complexed with either Cobalt (II) or Cobalt (III), soluble porphyrins, aza-porphyrins, hemiporphyrazines, phthalocyanines, napthapthalocyanines, dipyrrole bis(nitromethylidenes), and oximes, are known to be effective homogeneous chain transfer catalysts. However, these homogeneous catalysts are very difficult to remove from the reaction product.

The catalysts described herein are generally comprised of a metal atom coordinated to one or more ligands, and having one or more polymeric chains (Poly "tethers") covalently bound to at least one of the ligands. By "ligand" as the term is used herein is meant any atom, radical or molecule which can bind to a characteristic or central element of a complex. Ligands that comprise two or more binding sites that can coordinate to the same metal are also referred to as chelates.

The polymer-tethered catalysts can be made by a variety of techniques. One approach to synthesize the polymer-tethered catalysts described herein is to attach the polymer tether by covalent linkage to the chelating ligands. Suitable chelating ligands include but are not limited to porphyrins, aza-porphyrins, hemiporphyrazines, phthalocyanines, napthapthalocyanines, dipyrrole bis(nitromethylidenes), and oximes. The polymer tether (Poly) attached to these chelating ligands are functionalized low molecular weight polymers such as, but not limited to, polyethylene, ethylene/alpha-olefin copolymer, linear or branched polyether, fluoropolymer, oxyalkylated polyethylene polymer, linear polystyrenes, poly(isopropylacrylamide), polyisobutylene and copolymers thereof, having an average chain length of greater than 20 atoms, preferably 30 to 150. These atom chain lengths generally translate to an average $M_n$ of the polymer being generally between 280 and 7000 Daltons, preferably 300 and 2000 Daltons.

Once the polymer-tethered ligands are formed, treatment with suitable metal salts lead to the recoverable polymer-tethered catalysts. The recoverable polymer-tethered catalysts can also be prepared in situ by adding an appropriate metal salt and tethered ligand, as separate components, to a mixture of solvents and monomer mix used to form the macromonomers, prior to running the reaction. The reaction conditions will then be chosen such that conditions are sufficient to form the desired metal centered ligand catalyst complex in situ and polymerize the monomers to form the macromonomers.

One embodiment herein is to provide a thermomorphic polymer-tethered catalyst based on low molecular weight polyethylene-based materials. By "thermomorphic" is meant herein a catalyst that is homogeneous at the reaction temperature, but undergoes a phase partition at the separation temperature to facilitate recovery of the catalyst from the reaction medium. The tether(s) (Poly group) of this embodiment consist of low molecular weight polyethylene, ethylene/α-olefin copolymer or oxyalkylated polyethylene, covalently linked to chelating ligands, including porphyrins, aza-porphyrins, hemiporphyrazines, phthalocyanines, napthapthalocyanines, dipyrrole bis(nitromethylidenes), and oximes. These polymer tethers offer a number of practical advantages as the tethers are chemically inert and, although soluble under the reaction conditions, the resulting metal catalysts precipitate from the reaction medium upon cooling. The solid catalyst is then recovered by filtration, centrifugation, or by other methods known to the skilled artisan. The recovered polymer-tethered catalyst may optionally be recycled.

Another embodiment is to provide recoverable chain transfer catalysts through attachment of the catalyst to lipophilic polymers wherein Poly is selected from the group of linear polystyrenes, poly(isopropylacrylamide), polyisobutylene and copolymers of such, covalently linked to chelating ligands, including porphyrins, aza-porphyrins, hemiporphyrazines, phthalocyanines, napthapthalocyanines, dipyrrole bis(nitromethylidenes), and oximes. These polymers impart lipophilicity to the catalyst (i.e. solubility in non-polar organic solvents). While the chain transfer catalysts of this embodiment can be thermomorphic in nature, upon completion of a polymerization process, these polymer-tethered catalysts are typically separated from the homogeneous product mixture after perturbation to form a liquid/liquid biphasic state. The more polar phase will contain the reaction products while the less polar phase will contain the polymer-tethered catalyst in solution. The catalyst-containing liquid phase may then be removed through decantation, extraction or through other methods known to a skilled artisan.

Another embodiment is to provide recoverable chain transfer catalysts through attachment of the catalyst wherein Poly are poly(ethylene glycol)tethers, covalently linked to chelating ligands, including porphyrins, aza-porphyrins, hemiporphyrazines, phthalocyanines, napthapthalocyanines, dipyrrole bis(nitromethylidenes), and oximes. Upon completion of the polymerization reaction, these catalysts can be recovered and reused by addition of ether solvents which precipitate out the catalyst. Alternatively, poly(ethylene glycol)-tethered catalysts may optionally be recovered through addition of a suitable polar solvent such as, but not limited to, water, ethanol, N,N-dimethylformamide. The more polar phase will contain the polymer-tethered catalyst while the less polar phase will contain the reaction products. The catalyst-containing liquid phase may then be removed through decantation, extraction or through other methods known to a skilled artisan.

The biphasic state may be initiated by altering the temperature (a thermomorphic system), through addition of a small amount of a solvent (e.g. water, ether), through addition of a chemical agent (such as a salt) or a combination of any or all of these methods. The catalyst phase may optionally be dissolved in a fresh mix of solvents and monomer(s) and the reaction cycle repeated.

The general structure of the polymer-tethered catalysts as described herein appears in Structure IV.

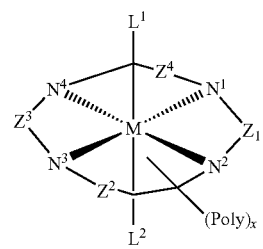

IV wherein structure IV is comprised of a central metal atom M, coordinated by four nitrogen atoms, $N^1$, $N^2$, $N^3$, $N^4$ wherein at least 3 of the said nitrogen atoms are independently linked by the bridging groups $Z^1$, $Z^2$, $Z^3$ and $Z^4$;

wherein at least two bridging groups are independently selected from a group of two or three atom segments wherein the atoms in said segment are independently chosen from C, N, B and O;

wherein said two or three atom segments may optionally be part of a ring structure; and wherein optionally $Z^2$ and $Z^4$ or $Z^1$ and $Z^3$ may each independently be an O—H—O, N—H—O or N—H—N hydrogen bridging group;

and wherein at least two of said nitrogen atoms $N^1$, $N^2$, $N^3$, and $N^4$ is independently chosen to be a member of an azomethine or diazamethine moiety of the general structure —N=C or —N=N or optionally a part of a 5 or 6 membered heterocyclic ring system;

and wherein said azomethine or diazamethine moieties are a part of 1 or more of the bridging group $Z^1$, $Z^2$, $Z^3$ and $Z^4$; wherein x=1-8 and each Poly is independently chosen to be connected to the group composed of $N^1$, $N^2$, $N^3$, $N^4$, $Z^1$, $Z^2$, $Z^3$, $Z^4$, M, $L^1$, and $L^2$ wherein $L^1$ and $L^2$ represent optional axial ligands coordinated to the metal M and are each independently selected from the group of water, alcohols, ethers, thioethers, amines, pyridines, imidazoles, phosphines, phosphites, arsines, isonitriles, carbonyl or carboxylate; and wherein one of the ligands, either $L^1$ or $L^2$, may optionally be selected from a group consisting of halide, hydride, substituted or unsubstituted alkyl, aryl, heteroaryl radicals.

A preferred embodiment is wherein Poly represents a linear or branched polymer radical with an average chain length greater than or equal to 20 atoms and where $(Poly)_x$ is derived from Poly-H, and Poly-H is characterized as being soluble in the reaction medium during the polymerization process. A more preferred embodiment is wherein Poly is a moiety comprising a polymer selected from the group consisting of polyethylene, ethylene/alpha-olefin copolymer, linear or branched polyether, fluoropolymer, oxyalkylated polyethylene polymer, linear polystyrenes, poly(isopropylacrylamide), polyisobutylene and copolymers thereof, said polymer having an average chain length equal to or greater than 20 atoms.

A preferred embodiment is wherein at least three of the four bridging groups $Z^1$, $Z^2$, $Z^3$ and $Z^4$ of structure IV is independently chosen from the group of $(R^2)C$—$C(R^3)$=$C(R^4)$ and $(R^5)C$—$N$=$C(R^6)$; and where $R^2$, $R^3$, $R^4$, $R^5$, $R^6$ is a radical independently chosen from the group of hydrogen, substituted or unsubstituted aliphatic, aromatic and heteroaromatic radicals and can optionally be part of a cyclic system and where the fourth bridging group is optional. Examples of these catalysts include but are not limited to those represented below:

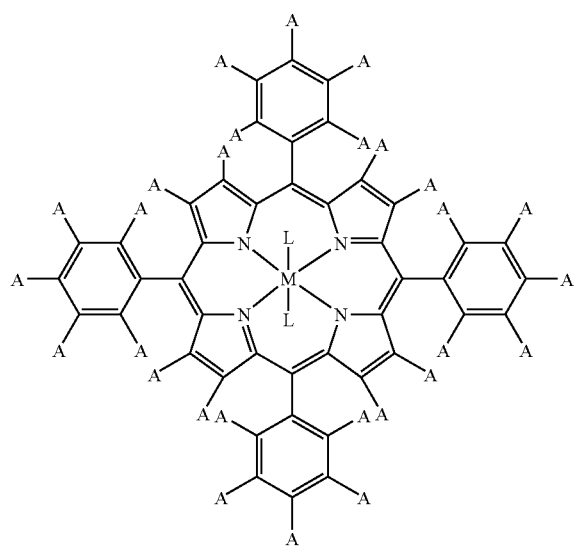

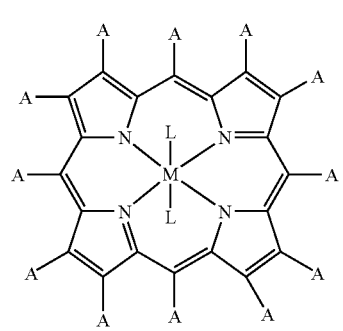

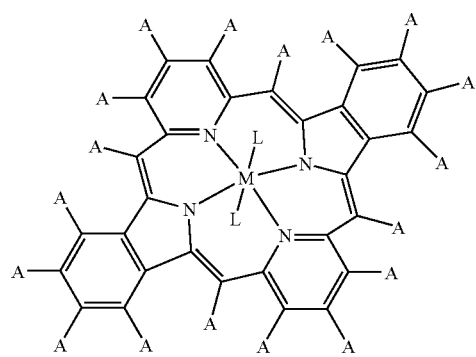

-continued

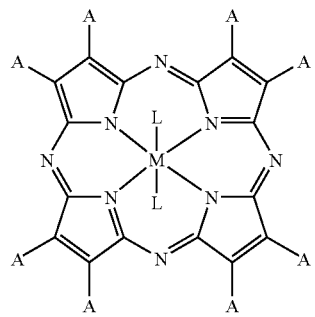

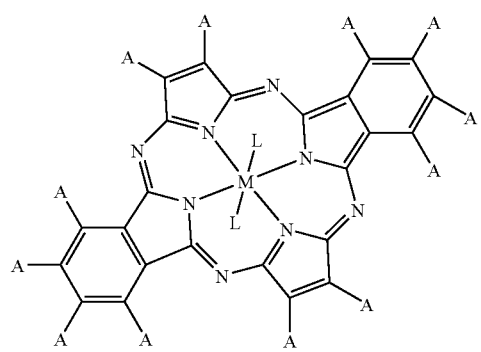

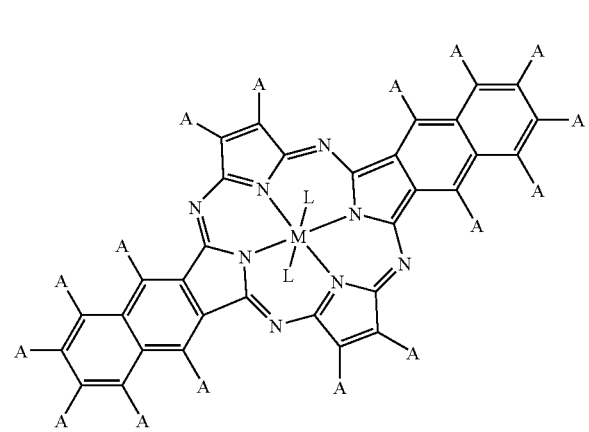

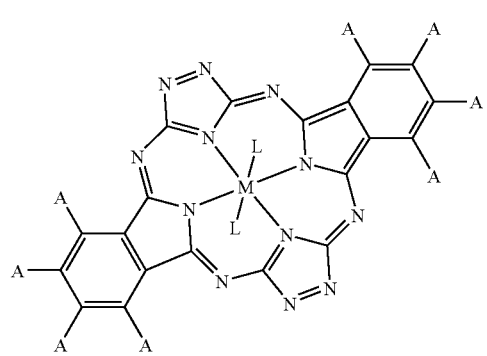

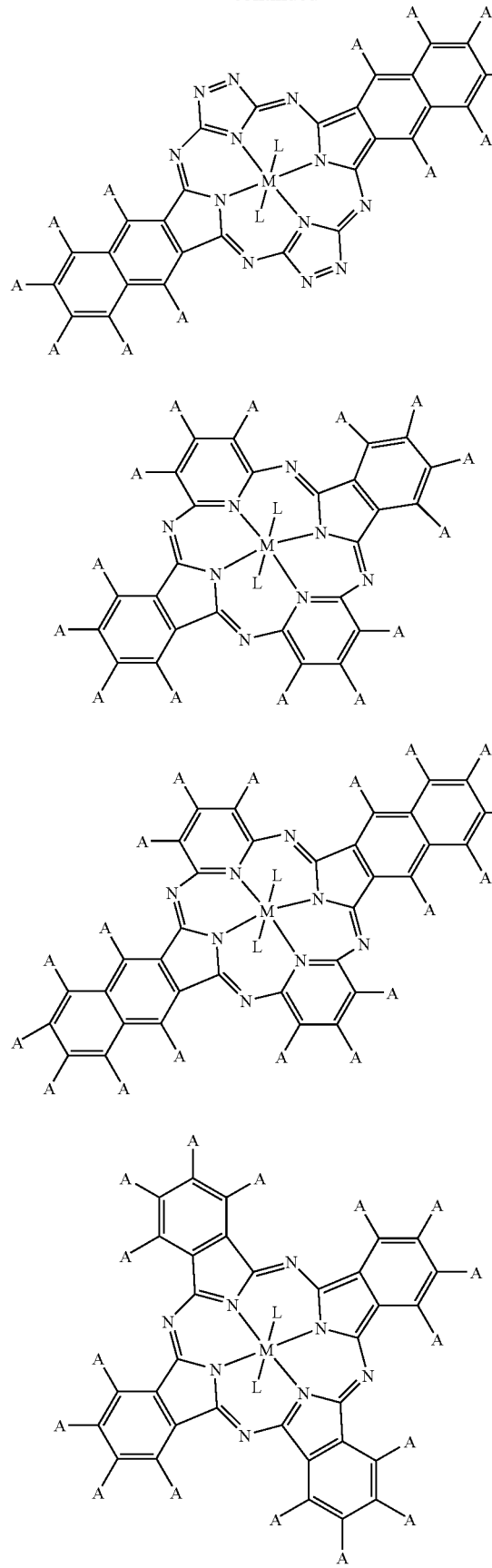

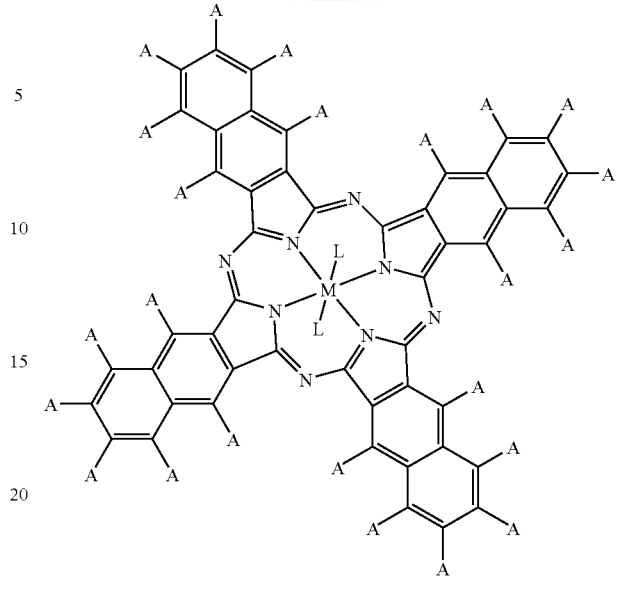

wherein M represents a cobalt (II), cobalt (III), iron (II) or iron (III) metal atom;

wherein each A independently chosen from $R^{51}$, $OR^{52}$ and Y-Poly and wherein at least one A is Y-Poly;

wherein $R^{51}$ is independently chosen from hydrogen, halide, a substituted or unsubstituted alkyl, aryl, heteroaryl radical;

wherein $R^{52}$ is independently chosen from a substituted or unsubstituted alkyl, aryl, heteroaryl radical;

wherein Poly represents a linear or branched polymer radical with an average chain length greater than or equal to 20 atoms and where Poly-H is characterized as being soluble in the reaction medium during the polymerization process wherein Y represents a linker moiety selected from the group of diradicals consisting of unsubstituted and substituted alkyl, unsubstituted and substituted aryl, unsubstituted and substituted heteroaromatic, —O—, —C(O)O—, —OC(O)—, —S—, —C(S)O—, —N($R^{53}$)C(O)—, —C(O)N($R^{54}$)—, —S(O)$_2$O—, —S(O)$_2$N($R^{55}$)—, —OS(O)$_2$, —N($R^{56}$)S(O)$_2$—, —CH$_2$—, —OC(O)O—, —OC(O)N($R^{57}$)—, —N($R^{58}$)— and —N($R^{59}$)C(O)O—, wherein $R^{53}$, $R^{54}$, $R^{55}$, $R^{56}$, $R^{57}$, $R^{58}$, $R^{59}$ is independently chosen from hydrogen, a substituted or unsubstituted alkyl, aryl, heteroaryl radical;

and wherein foresaid catalysts may optionally contain one or two ligands L coordinated to the metal M where L is independently selected from the group of water, alcohols, ethers, thioethers, amines, pyridines, imidazoles, phosphines, phosphites, arsines, isonitriles, carbonyl or carboxylate;

and wherein one ligand L may optionally be selected from a group consisting of halide, hydride, substituted or unsubstituted alkyl, aryl, heteroaryl radicals.

Cobalt (II), cobalt (III), iron (II), and iron (III) complexes containing porphyrins, aza-porphyrins, hemiporphyrazines, phthalocyanines, napthapthalocyanines, dipyrrole bis(nitromethylidenes), pydienes and oximes without attachment of polymer tethers are known in the prior art. The methods for the preparation of suitable derivatives thereof, such as those bearing labile axial ligands have also been described in the chemical literature. Any conventional or suitable method of making the transition metal complexes for use in the present embodiments may be used.

As indicated above, the polymer-tethered catalysts may be prepared by a variety of techniques. One general method of preparing the novel soluble polymer-tethered cobalt catalysts is to covalently link a polymer tether to a chelating ligand. In this method, the ligand is attached to the polymer(s) by treatment of a homogeneous ligand or ligand precursor containing one or more reactive functional groups (such as alcohol, carboxylic acid, sulfonic acid, amines, halides (chloride, bromide, iodide) and vinyl substituents or derivatives of such groups), with soluble polymers end-functionalized with complementary reactive groups (including alcohol, halides (chloride, bromine, iodide), amines, olefins, carboxylic acid, sulfonic acid or derivatives of such groups such as carboxylic acid halides, sulfonate esters, and amides) so that the polymer becomes covalently linked to the ligand. The average size of the soluble linear or branched polymer (polyethylene, ethylene/alpha-olefin copolymer, linear or branched polyether, fluoropolymer, oxyalkylated polyethylene polymer, linear polystyrenes, poly(isopropylacrylamide), polyisobutylene and copolymers thereof) is generally $C_{20}$-$C_{500}$.

Subsequently, the catalysts are prepared by treating a hot solution of the polymer-tethered ligand with an iron or cobalt salt, preferentially cobalt (II) or cobalt (III), according to methods known to those skilled in the art. Non-limiting examples of these cobalt salts are generally selected from cobalt(II) acetate, cobalt(II) acetylacetonate, cobalt(II) benzoylacetonate, cobalt(II) oxalate, cobalt(II) bromide, cobalt (II) chloride, cobalt(II) iodide, cobalt(II) carbonate and cobalt (II) sulfate, cobalt(II) nitrate, cobalt(II) perchlorate, cobalt (II) fluoroborate, cobalt(II) hexafluorophosphate, or cobalt (II) hexafluoroantimonate, either as the hydrate or anhydrous. Alternatively, the cobalt(II) source could be an alkanoate ($C_2$-$C_8$). For this purpose, the polymer-tethered free ligand need not be either isolated or purified. Therefore, the ligand attachment and metallation can be carried out in a one-pot reaction.

One such example is tetrakis(4-polyethyleneoxyphenyl) porphyrin, which was prepared according to the scheme below:

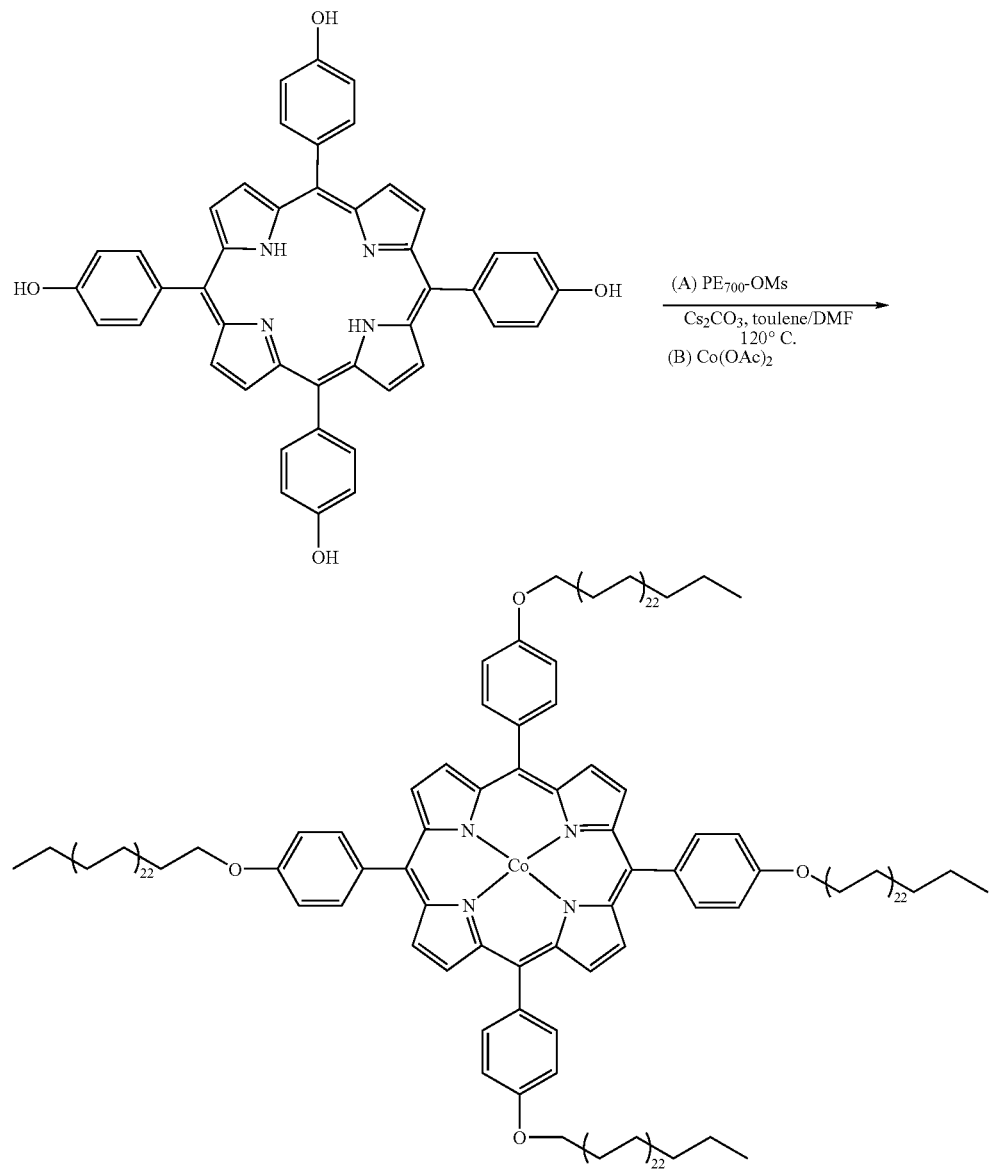

As used herein, $PE_{num}$ represents polyethylene of average molecular weight represented by the number. For example, $PE_{700}$ represents polyethylene having a molecular weight of 700. The reactive groups in this scheme are phenolic alcohols and the complementary reactive groups are methyl sulfonic esters. The Poly group is linked to the ligand by an oxygen atom (Y).

A second approach to prepare a polymer-tethered chelating ligand that is covalently linked is to synthesize a polymer-tethered ligand precursor, and then assemble the metal catalyst using modifications of known procedures. Tetrakis(polyethyleneoxy)phthalocyanine cobalt (II) was constructed according to such an approach. The polymer-tethered phthalonitrile precursor was first prepared, followed by a base-catalyzed condensation to the phthalocyanine ligand in the presence of a cobalt salt to yield the polymer-tethered catalyst. The cobalt sources are described above.

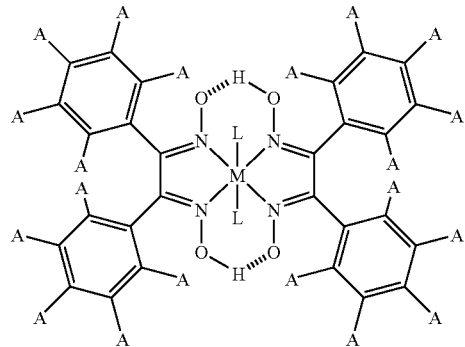

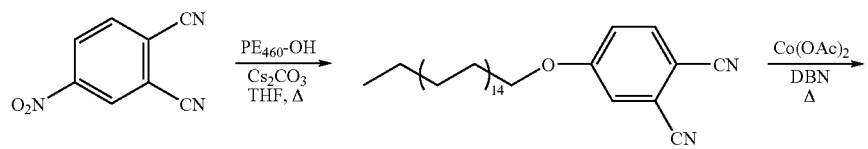

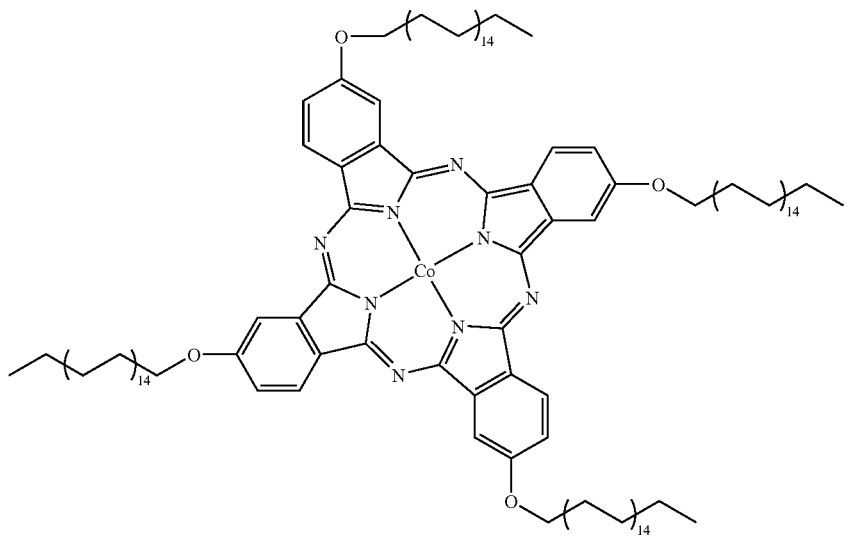

Another preferred embodiment is wherein $Z^1$ and $Z^3$ of structure IV is independently chosen from $(R^7)C-C(R8)$ or $(R^9)C-C(R^{10})=C(R^{11})$; and where $Z^2$ and $Z^4$ are independently chosen from the group of O—H—O; N—H—O; N—H—N; O—B$(OR^{12})(OR^{13})$—O; O—B$(Br_2)$—O; O—B$(Cl_2)$—O; O—B$(F_2)$—O; O—B$(R^{14}_2)$—O; $(R^{15})$C=C $(R^{16})$; $(R^{17})$C(H)—C(H)$(R^{18})$; $R^{19}$C(H)—C$(R^{20}_2)$—C(H) $(R^{21})$; $(R^{22})$C—C$(R^{23})$, and where each of $R^7$, $R^8$, $R^9$, $R^{10}$, $R^{11}$, $R^{15}$, $R^{16}$, $R^{17}$, $R^{18}$, $R^{19}$, $R^{20}$, $R^{21}$, $R^{22}$, $R^{23}$ is a radical independently chosen from the group of hydrogen, substituted or unsubstituted aliphatic, aromatic and heteroaromatic radicals and may optionally be part of a cyclic system; and where $R^{12}$, $R^{13}$, $R^{14}$, is a radical independently chosen from the group of substituted or unsubstituted aliphatic, aromatic and heteroaromatic radicals and may optionally be part of a cyclic system. Some examples that are included, but not limited to, are represented by the structures:

-continued

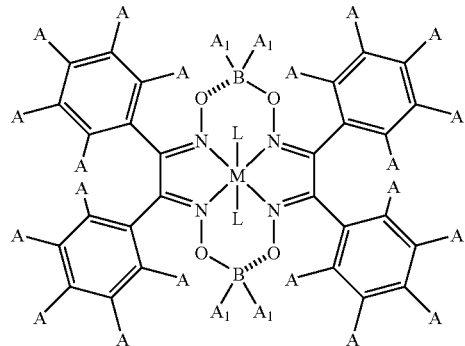

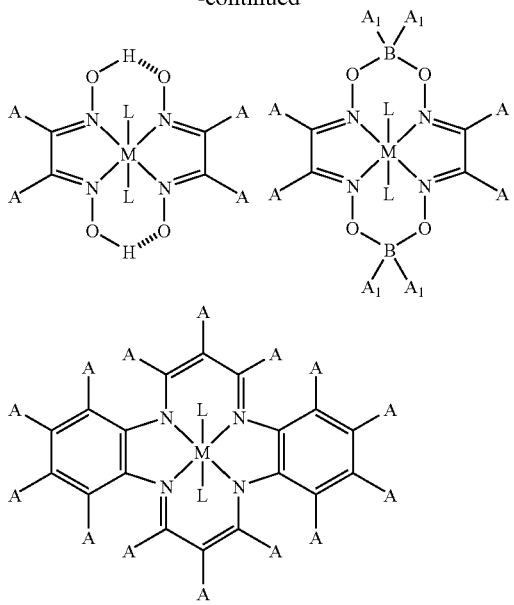

wherein M represents a cobalt (II) or cobalt (III), metal atom;

wherein each A is independently chosen from $R^{60}$, $OR^{61}$ and Y-Poly;

wherein each $A^1$ is independently chosen from $R^{62}$, $OR^{63}$, F, Cl, Br, and Y-Poly;

wherein $R^{60}$ is independently chosen from hydrogen, halide, a substituted or unsubstituted, alkyl, aryl, heteroaryl radical;

wherein each $R^{61}$, $R^{62}$, $R^{63}$ is independently chosen from a substituted or unsubstituted, alkyl, aryl, heteroaryl radical;

wherein Poly represents a linear or branched polymer radical with an average chain length greater than or equal to 20 atoms and where Poly-H is characterized as being soluble in the reaction medium during the polymerization process;

wherein Y represents a linker moiety selected from the group of diradicals consisting of unsubstituted and substituted alkyl, unsubstituted and substituted aryl, unsubstituted and substituted heteroaromatic —O—, —C(O)O—, —OC(O)—, —S—, —C(S)O—, —N($R^{64}$)C(O)—, —C(O)N($R^{65}$)—, —S(O)$_2$O—, —S(O)$_2$N($R^{66}$)—, —OS(O)$_2$—, —N($R^{67}$)S(O)$_2$—, —CH$_2$—, —OC(O)O—, —OC(O)N($R^{68}$)—, —N($R^{69}$)— and —N($R^{70}$)C(O)O—, wherein $R^{64}$, $R^{65}$, $R^{66}$, $R^{67}$, $R^{68}$, $R^{69}$, $R^{70}$ is independently chosen from hydrogen, a substituted or unsubstituted alkyl, aryl, heteroaryl radical;

and wherein foresaid catalysts may optionally contain one or two ligands L coordinated to the metal M where L is independently selected from the group of water, alcohols, ethers, thioethers, amines, pyridines, imidazoles, phosphines, phosphites, arsines, isonitriles, carbonyl or carboxylate and where said L may optionally be substituted with Y-Poly;

and wherein there is at least one Y-Poly substituent;

and wherein one ligand L may optionally be selected from a group consisting of halide, hydride, substituted or unsubstituted alkyl, aryl, heteroaryl radicals.

A polymer-tethered oxime ligand may be formed from a polymer-tethered dione by known chemical methods, followed by treatment with a cobalt metal salt to generate the desired glyoxime cobalt complex: Treatment of the polymer-tethered oximes with cobalt (II) salts in the presence of L lead to the formation of cobalt(II) oxime L complexes.

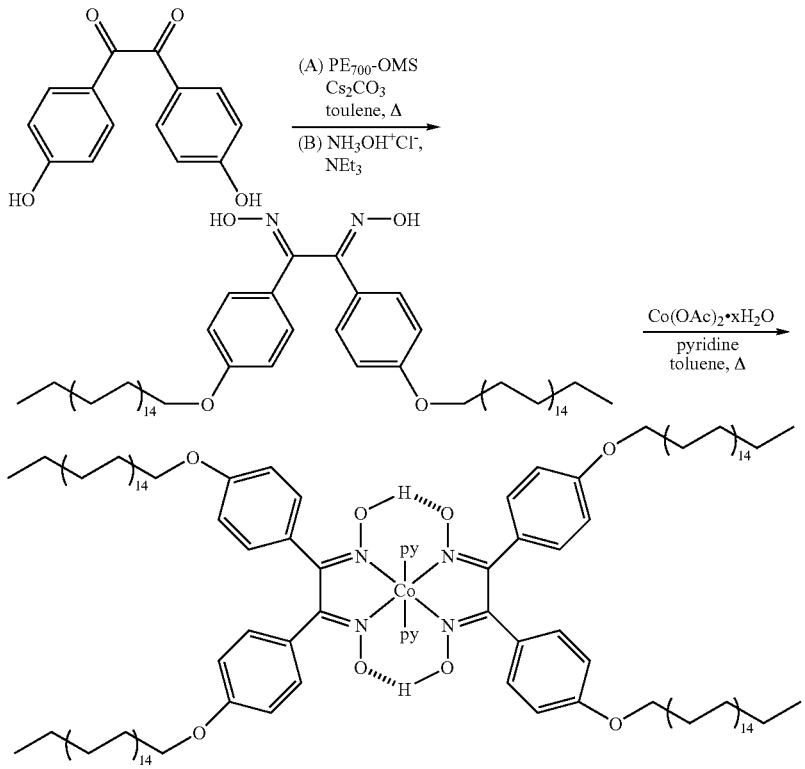

A further aspect of this embodiment is to provide thermomorphic polymer-tethered catalysts through axial coordination of a polymer-tethered Lewis base to a suitable homogeneous metal-centered chain transfer catalyst, CAT-($R^1$)x and recoverable chain transfer catalyst, CAT-(Poly)x and combination thereof. The tether(s) consist of low molecular weight polyethylene, ethylene/α-olefin copolymer or oxyalkylated polyethylene, covalently linked to Lewis basic ligands such as, but not limited to, amines, pyridines, phosphines, phosphites, imidazoles, and arsines. The desired axially-coordinated thermomorphic catalyst may be prepared and isolated in advance, then added as the polymer-tethered metal complex. It is, however, preferred to add the polymer-tethered Lewis base and the homogeneous metal chelate to the macromonomer reaction mixture as separate components prior to initiation of the polymerization reaction in order to form the desired thermomorphic catalyst in-situ. Alternatively, the polymer-tethered Lewis base may be added near the end of the metal-catalyzed polymerization process, as a chemical agent to facilitate separation of the catalyst upon cooling of the reaction medium. The resulting solid catalyst may then be removed from the product mixture using the techniques described previously. The recovered thermomorphic catalyst may optionally be recycled for multiple reaction cycles.

Polymer-tethered axial ligand can be attached by coordination to the metal center of the catalyst (either CAT-($R^1$)x or CAT-(Poly)x or combination thereof) to form a recoverable polymer-tethered catalyst as described herein. For example, treatment of a homogeneous oxime catalyst with >2 equivalents of polymer-tethered diphenylphosphine results in the formation of a polymer-tethered cobalt complex:

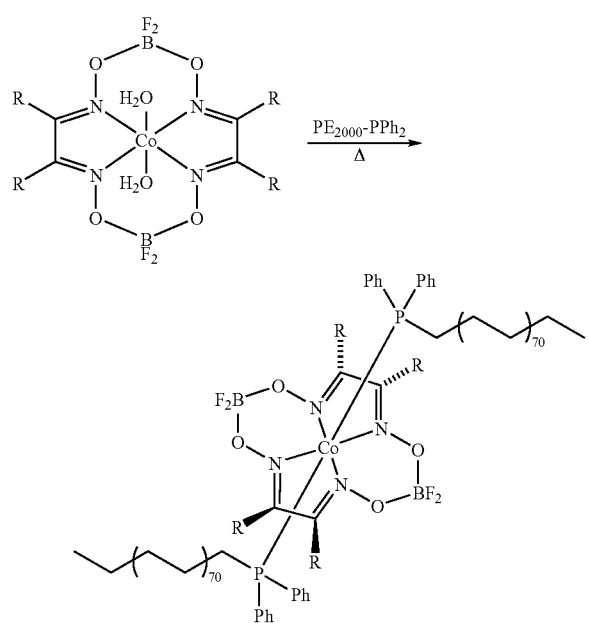

Another embodiment is wherein $Z^1$ and $Z^3$ of structure IV is independently chosen from ($R^{24}$)C—C($R^{25}$)=C($R^{26}$) or ($R^{27}$)C=N—C($R^{28}$) or ($R^{30}$)C—C($R^{31}$), and $Z^2$ is ($R^{30}$)C=C($R^{31}$), ($R^{32}$)C(H)—C(H)($R^{33}$); $R^{34}$C(H)—C($R^{35}{}_2$)—C(H)($R^{36}$); ($R^{37}$)C—C($R^{38}$); and where $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$ is a radical independently chosen from the group of hydrogen, substituted or unsubstituted aliphatic, aromatic and heteroaromatic radicals and can optionally be part of a cyclic system. Examples include but not limited to those structures represented below:

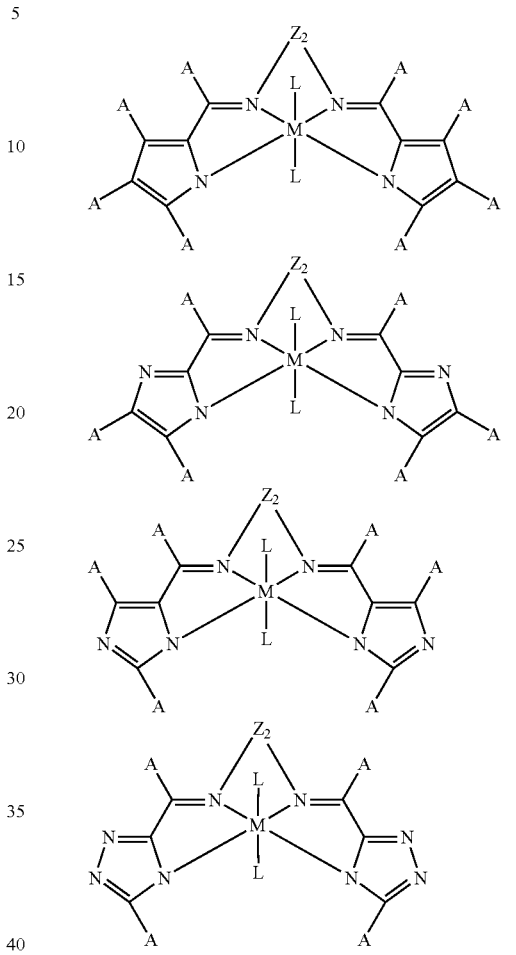

wherein M represents a cobalt (II) or cobalt (III) metal atom;

wherein each A is independently chosen from $R^{71}$, $OR^{72}$, and Y-Poly and wherein at least one A is Y-Poly;

wherein $R^{71}$ is independently chosen from hydrogen, halide, a substituted or unsubstituted, alkyl, aryl, heteroaryl radical;

wherein $R^{72}$ is independently chosen from a substituted or unsubstituted, alkyl, aryl, heteroaryl radical;

wherein Poly represents a linear or branched polymer radical with an average chain length greater than or equal to 20 atoms and where Poly-H is characterized as being soluble in the reaction medium during the polymerization process;

wherein Y represents a linker moiety selected from the group consisting of diradicals consisting of unsubstituted and substituted alkyl, unsubstituted and substituted aryl, unsubstituted and substituted heteroaromatic —O—, —C(O)O—, —OC(O)—, —S—, —C(S)O—, —N($R^{73}$)C(O)—, —C(O)N($R^{74}$)—, —S(O)$_2$O—, —S(O)$_2$N($R^{75}$)—, —OS(O)$_2$—, —N($R^{76}$)S(O)$_2$—, —CH$_2$—, —OC(O)O—, —OC(O)N($R^{77}$)—, —N($R^{78}$)— and —N($R^{79}$)C(O)O—, wherein $R^{73}$, $R^{74}$, $R^{75}$, $R^{76}$, $R^{77}$, $R^{78}$, $R^{79}$ is independently chosen from hydrogen, a substituted or unsubstituted alkyl, aryl, heteroaryl radical;

wherein $Z_2$ is a diradical selected from the group of —(C($R^{80}$)$_2$)$_n$— where n equals 1, 2, 3, 4, 5, 6, 7 or 8, and structures:

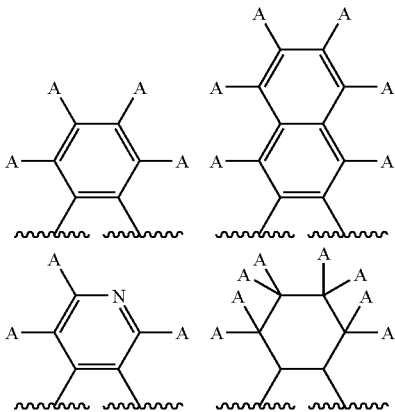

and wherein foresaid catalysts may optionally contain one or two ligands L coordinated to the metal M where L is independently selected from the group of water, alcohols, ethers, thioethers, amines, pyridines, imidazoles, phosphines, phosphites, arsines, isonitriles, carbonyl or carboxylate;

wherein $R^{80}$ is independently chosen from hydrogen and alkyl;

and wherein one ligand L may optionally be selected from a group consisting of halide, hydride, substituted or unsubstituted alkyl, aryl, heteroaryl, or vinyl radicals.

Another embodiment as disclosed herein is the composition of the catalyst of structure IV wherein $Z^1$ and $Z^2$ are ($R^{39}$)C—C=C($R^{40}$)($R^{41}$) or ($R^{42}$)C—C($R^{43}$): and $Z^3$ and $Z^4$ are ($R^{42}$)C=C($R^{43}$); ($R^{44}$)C(H)—C(H)($R^{45}$); ($R^{46}$)C(H)—C($R^{47}_2$)—C(H)($R^{48}$); ($R^{49}$)C—C($R^{50}$), or (C($R^{90}$)$_2$)$_n$, wherein (C($R^{90}$)$_2$)$_n$ represents an aliphatic diradical where n equals 1, 2, 3, 4, 5, 6, 7 or 8; wherein $R^{90}$ is selected from the group consisting of hydrogen and alkyl radical; and wherein $R^{39}$, $R^{40}$, $R^{41}$, $R^{42}$, $R^{43}$ $R^{44}$, $R^{45}$, $R^{46}$, $R^{47}$, $R^{48}$, $R^{49}$, $R^{50}$ is a radical independently chosen from the group of hydrogen, substituted or unsubstituted aliphatic, aromatic and heteroaromatic radicals and can optionally be part of a cyclic system. Examples include but not limited by structures represented below:

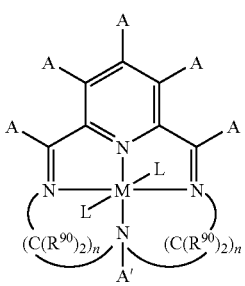

D wherein M represents a cobalt (II) or cobalt (III) metal atom;

wherein each A and A' is independently chosen from $R^{81}$, $OR^{82}$ and Y-Poly and wherein at least one A is Y-Poly;

wherein $R^{81}$ is independently chosen from hydrogen, halide, a substituted or unsubstituted alkyl, aryl, heteroaryl radical;

wherein $R^{82}$ is independently chosen from a substituted or unsubstituted alkyl, aryl, heteroaryl radical;

wherein Poly represents a linear or branched polymer radical with an average chain length greater than or equal to 20 atoms and where Poly-H is characterized as being soluble in the reaction medium during the polymerization process;

wherein Y represents a linker moiety selected from the group of diradicals consisting of unsubstituted and substituted alkyl, unsubstituted and substituted aryl, unsubstituted and substituted heteroaromatic —O—, —C(O)O—, —OC(O)—, —S—, —C(S)O—, —N($R^{83}$)C(O)—, —C(O)N($R^{84}$)—, —S(O)$_2$O—, —S(O)$_2$N($R^{85}$)—, —OS(O)$_2$—, —N($R^{86}$)S(O)$_2$—, —CH$_2$—, —OC(O)O—, —OC(O)N($R^{87}$)—, —N($R^{88}$)— and —N($R^{89}$)C(O)O—, wherein $R^{83}$, $R^{84}$, $R^{85}$, $R^{86}$, $R^{87}$, $R^{88}$, $R^{89}$ is independently chosen from hydrogen, a substituted or unsubstituted alkyl, aryl, heteroaryl radical;

wherein (C($R^{90}$)$_2$)$_n$ represents an aliphatic diradical where n equals 1, 2, 3, 4, 5, 6, 7 or 8;

wherein $R^{90}$ is independently chosen from hydrogen and alkyl radical;

and wherein foresaid catalysts may optionally contain one or two ligands L coordinated to the metal M where L is independently selected from the group of water, alcohols, ethers, thioethers, amines, pyridines, imidazoles, phosphines, phosphites, arsines, isonitriles, carbonyl or carboxylate;

wherein D is a divalent anion or two monovalent anions selected from the group consisting of $NO_3^-$, $Cl^-$, $Br^-$, $I^-$, $N_3^-$, $CN^-$, $OH^-$, $C_2O_4$, $BF_4^-$, $PF_6^-$, $SbF_6^-$, $ClO_4^-$, $NCS^-$, $SO_4^{2-}$, $CO_3^-$.

and $R^{91}CO_2^-$, where $R^{91}$ is a C1 to C12 alkyl.

It is to be understood that D will be present with a valency sufficient to make a charge-neutral complex.

The analogous polymer-tethered cobalt(III) complexes can be used in the process disclosed herein if the cobalt(III) can be readily reduced to cobalt(II) during the polymerization process. This permits the in situ production of the polymer-bound cobalt(II) complexes described herein. These cobalt(III) complexes may be prepared by reaction of the polymer-bound cobalt(II) complex with alkenes, alkynes, alkyl halides (chloride, bromide, iodide) and epoxides in the presence of organic radicals derived from azo initiators.

In the case when the polymer-tethered catalyst is isolated before being employed in the polymerization, proper purification of the polymer-supported catalysts is preferred to improve color control of the polymerization reactions. Purification techniques that have been found to be useful include extraction and washing of the crude catalyst with suitable solvents until colorless solutions are obtained. Some suitable solvents include but are not limited to tetrahydrofuran, toluene, xylenes, heptane, methyl ethyl ketone, methanol, isopropanol, n-propanol, and n-butanol but the solvent choice will be dependent on the polymers used. Alternatively, multiple recrystallizations may be used to remove any remaining room-temperature soluble material. Purification may also remove some polymer-containing impurities. Typically, the final catalytic material will comprise the polymer-tethered metal complex and optionally polymer that is not covalently linked to either a ligand or metal complex. The catalytic material may then be analyzed by routine analytical methods such as proton NMR and elemental analysis to confirm its structure and composition.

Both lengthening the polymer tether and varying the number of such tethers attached to the ligand can modify the solubility characteristics of the polymer-supported catalysts. The polymer tether covalently linked to the ligand generally consists of low molecular weight polyethylene, ethylene/alpha-olefin copolymer, linear or branched polyether, fluoropolymer, oxyalkylated polyethylene polymer, linear polystyrenes, poly(isopropylacrylamide), polyisobutylene and copolymers thereof, the number average molecular weight of the tether being generally between 300 and 7000 Daltons. The polymer tether preferably has an average or mean molecular weight of 460 to 2000 Daltons. Several polymer tethers may be bound to a single ligand or metal chelate. A ligand or metal complex may have a varying number of polymer tethers attached. The catalyst may optionally consist of a mixture of regio- or stereoisomers where such a possibility exists. The polymer tethers may be identical or differ from one another. If several polymer tethers are bound to the metal complex, the sum of the molecular weight of the oligomers is preferably from 1500 to 8000 Daltons.

Description of Polymerization Reactions: The process described herein is generally carried out in accordance with techniques which are well known to one skilled in the art, including batch, semi-batch and continuous processes. As a demonstration of a batch process, the reactor can be charged with solvent, monomer (or a mixture of comonomers) and catalyst, with the mixture being stirred under an inert atmosphere (such as nitrogen, argon or helium), at room temperature, for example, for a minimum of one-half hour to ensure deaeration, that is, the substantial removal of oxygen. Many common organic solvents are suitable as polymerization media. These include aromatic hydrocarbons such as benzene, toluene and the xylenes; ethers, such as tetrahydrofuran, diethyl ether and the commonly available ethylene glycol and polyethylene glycol monoalkyl and dialkyl ethers, including the Cellosolves and Carbitols; alkyl esters of acetic, propionic and butyric acids; and mixed ester-ethers such as monoalkyl ether-monoalkanoate esters of ethylene glycol; ketones, such as acetone, butanone, pentanone and hexanone; and alcohols, such as methanol, ethanol, propanol and butanol. In some instances, it may be advantageous to use mixtures of two or more solvents. The preferred solvents are those in which the polymer-tethered catalyst is soluble at reaction temperatures. The mixture can be heated to dissolve the catalyst then the requisite amount of initiator can be added, typically such that monomer to initiator molar ratio (M/I) is 100 to 200.

Any of the known initiators which produce carbon-centered radicals, sufficiently mild not to destroy the metal chelate chain transfer catalyst, can be used. Suitable initiators are azo compounds having the requisite solubility and appropriate half life, including azocumene; 2,2'-azobis(2-methyl)-butanenitrile; 2,2'-azobis(isobutyronitrile)(AIBN); 4,4'-azobis(4-cyanovaleric acid); 2-(t-butylazo)-2-cyanopropane, and other initiators known to those skilled in the art. Non-azo initiators such as hydrogen gas can also be employed as described in co-owned U.S. patent application Ser. No. 11/330,014 and U.S. Pat. No. 7,022,792. The polymerization reaction is generally conducted in the range 50°-150° C. with the preferred range of 65°-110° C., for the requisite time, usually one-half hour to six hours.

Upon completion of polymerization, effecting the phase partition of the chain transfer catalyst and separating said chain transfer catalyst from said macromonomer/oligomer/polymer is performed. The catalyst is recovered by filtration, extraction, centrifugation, or by other methods mentioned above. Other methods known to the skilled artisan for catalyst recovery from biphasic systems can be applied. Macromonomers having from about 2 to about 1,000 monomer units are preferred as intermediates for making polymers and copolymers for paints and finishes, and most preferably, from about 2 to about 200 monomer units. The products from the polymerization reaction (macromonomer, oligomer and polymer) can be isolated by removing solvent, by distillation, extraction or by precipitation with a nonsolvent. Alternatively, the polymer solution can be used as such if appropriate to its application. The final solution after removal of the polymer-bound tethered catalyst containing the polymerized monomer (or comonomers) are lighter in color than solutions derived from polymerization using the analogous homogeneous catalyst under the same polymerization conditions. The final polymer product has preferably an APHA value less than about 50 and a Chroma value of less than 1. If a water-white product is desired, residual color may optionally be removed by subsequent treatment with activated charcoal, or other methods known to those skilled in the art.

Optionally, the recovered catalyst can be recycled back into the polymerization process.

The process as described herein is carried out most effectively with styrene and methacrylate ester monomers, but acrylate esters can be included as comonomers with the methacrylic esters and/or styrene, without diminution of the advantages of the described process. Methacrylates which are useful include branched alkyl or n-alkyl esters of $C_{1-12}$ alcohols and methacrylic acid. Examples of suitable methacrylate esters include but are not restricted to, methyl(meth)acrylate, ethyl (meth)acrylate, propyl(meth)acrylate, n-butyl(meth)acrylate, 2-ethylhexyl (meth)acrylate, isobutyl(meth)acrylate, isobornyl(meth)acrylate, benzyl (meth)acrylate, phenyl (meth)acrylate; glycidyl meth)acrylate, stearyl (meth)acrylate, 2-hydroxyethyl(meth)acrylate, 2-hydroxypropyl (meth)acrylate, 3-hydroxypropyl(meth)acrylate, hydroxybutyl (meth)acrylate, diethylaminoethyl(meth)acrylate, triethyleneglycol (meth)acrylate, diethylaminoethyl(meth)acrylate, triethyleneglycol (meth)acrylate. Comonomers include, but are not restricted to itaconic acid, vinyl benzoic acid, alphamethylvinyl benzoic acid, para-vinyl benzene sulfonic acid, (meth)acrylonitrile, sytrene, alpha methyl styrene, diethylamino styrene, diethylamino alphamethylstyrene, para-methylstyrene; methacrylamide, N-tert-butyl methacrylamide, N-n-butyl methacrylamide, N-methylol methacrylamide, N-ethylol methacrylamide, N-tert-butyl acrylamide, N-n-butyl acrylamide, N-methylol acrylamide, N-ethylol acrylamide; trimethoxysilylpropyl(meth)acrylate, triethoxysilylpropyl(meth)acrylate, tributoxysilylpropyl(meth)acrylate, dimethoxymethylsilylpropyl(meth)acrylate, diethoxymethylsilylpropyl (meth)acrylate, dibutoxymethylsilylpropyl(meth)acrylate, diisopropoxymethylsilylpropyl (meth)acrylate, dimethoxysilylpropyl (meth)acrylate, diethoxysilylpropyl(meth)acrylate, dibutoxysilylpropyl (meth)acrylate, and diisopropoxysilylpropyl(meth)acrylate; vinyl silane, vinyl acetate, vinyl butyrate, vinyl chloride, vinyl fluoride, and vinyl bromide.

The macromonomers/oligomers/polymers embodied herein may be included in a coating composition. The coating composition may be used as a base coat or as a pigmented monocoat topcoat. Both of these compositions require the presence of pigments. Typically, a pigment-to-binder ratio of 0.1/100 to 200/100 is used depending on the color and type of pigment used. The pigments are formulated into mill bases by conventional procedures, such as, grinding, sand milling, and high speed mixing. Generally, the mill base comprises pigment and a dispersant in an aqueous medium. The mill base is added in an appropriate amount to the coating composition with mixing to form a pigmented coating composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like and extender pigments can be used. It may be desirable to add flow control additives.

The novel coating composition may be used as a primer in which case typical pigments used in primers would be added, such as, carbon black, barytes, silica, iron oxide and other pigments that are commonly used in primers in a pigment-to-binder ratio of 150/100 to 300/100.

The coating composition can be applied by conventional techniques, such as, spraying, electrostatic spraying, dipping, brushing, and flow coating.

The coating composition is particularly useful for the repair and refinish of automobile bodies and truck bodies and parts as a clear coat, pigmented base coat, or as a primer. The novel composition has uses for coating any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, large commercial aircraft and small pleasure aircraft, pleasure vehicles, such as, snow mobiles, all terrain vehicles, personal watercraft, motorcycles, and boats. The novel composition also can be used as a coating for industrial and commercial new construction and maintenance thereof; cement and wood floors; walls of commercial and residential structures, such as, office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signs; fiberglass structures; sporting goods; and sporting equipment.

This makes these coatings particularly useful for repainting of transportation vehicles in the field. For whatever uses they are put to, the compositions, and the materials used in the processes described herein may contain other materials which are conventionally used in such uses. For example, for use as encapsulants and sealants the composition may contain fillers, pigments, and/or antioxidants.

For coatings there may be a myriad of other ingredients present, some of which are described below. Representative of the functionalized oligomers that can be employed as components or potential cross-linking agents of the coatings are the following:

Acid Oligomers: The reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like.

Hydroxyl Oligomers: The above acid oligomers further reacted with monofunctional epoxies such as butylene oxide, propylene oxide, and the like.

Anhydride Oligomers: The above acid oligomers further reacted with ketene.

Silane Oligomers: The above hydroxyl oligomers further reacted with isocyanato propyltrimethoxy silane.

Epoxy Oligomers: The diglycidyl ester of cyclohexane dicarboxylic acid, such as Araldite® CY-184 from Ciba Geigy, and cycloaliphatic epoxies, such as ERL®-4221, and the like from Union Carbide.

Aldimine Oligomers: The reaction product of isobutyraldehyde with diamines such as isophorone diamine, and the like.

Ketimine Oligomers: The reaction product of methyl isobutyl ketone with diamines such as isophorone diamine.

Melamine Oligomers: Commercially available melamines such as CYMEL® 1168 from Cytec Industries, and the like.

AB-Functionalized Oligomers: Acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-Functionalized Crosslinkers: Epoxy/hydroxyl functional crosslinkers such as the polyglycidyl ether of Sorbitol DCE-358® from Dixie Chemical or blends of the hydroxyl oligomers and epoxy crosslinkers mentioned above or any other blend as depicted above.

The compositions embodied herein may additionally contain a binder of a noncyclic oligomer, i.e., one that is linear or aromatic. Such noncyclic oligomers can include, for instance, succinic anhydride- or phthalic anhydride-derived moieties in the Acid Oligomers: such as described above.

The coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions can also contain a binder of an acrylic polymer of weight average molecular weight greater than 3,000, or a conventional polyester such as SCD®-1040 from Etna Product Inc. for improved appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or gamma methacrylylpropyl trimethoxysilane and the like.

The coating compositions can also contain a binder of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 microns. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

The coating compositions can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The coating compositions are typically applied to a substrate by conventional techniques such as spraying, electrostatic spraying, roller coating, dipping or brushing. As mentioned above atmospheric moisture may "diffuse" into the coating and cause curing, or alternatively just before the coating is applied it is mixed with an appropriate amount of water, as in a mixing spray head. Under these latter conditions it is important to apply the coating before it crosslinks. The present formulations are particularly useful as a clear coating for outdoor articles, such as automobile and other vehicle body parts. The substrate is generally prepared with a primer and or a color coat or other surface preparation prior to coating with the present compositions.

A layer of a coating composition is cured under ambient conditions in the range of 30 minutes to 24 hours, preferably in the range of 30 minutes to 3 hours to form a coating on the substrate having the desired coating properties. It is understood that the actual curing time depends upon the thickness of the applied layer and on any additional mechanical aids, such as, fans that assist in continuously flowing air over the coated substrate to accelerate the cure rate. If desired, the cure rate may be further accelerated by baking the coated substrate at temperatures generally in the range of from about 60° C. to 150° C. for a period of about 15 to 90 minutes. The foregoing baking step is particularly useful under OEM (Original Equipment Manufacture) conditions.

Unless otherwise stated, all chemicals and reagents were used as received from Aldrich Chemical Co., Milwaukee, Wis.

Color Measurement Procedures:

The color of the products produced in the examples below is based on the CIE (Commission International de l'Eclairage) and ASTM standard for converting spectral data to the XYZ tristimulus values. The calculation that was used is described in ASTM standard E308-1 (Standard Practice for Computing the Colors of objects by using the CIE System) with the standard observer and illuminant D65. A yellowness index, YI, was then calculated from these values according to ASTM E313-00 (Standard Practice for Calculating Yellowness and Whiteness Indices from Instrumentally Measured Color Coordinates). The yellowness index was converted to the APHA scale by a calibration against a set of APHA Platinum-Cobalt standards as described in ASTM D5386-93B (Standard Test Method for Color of Liquids Using Tristimulus Colorimetry.) Also determined, according to the CIE Lab 1976 calculation, were the parameters hue (the color of the sample, measured in degrees) and C (the Chroma or intensity of the color). These are all standard parameters with well-defined meanings.

A water reference sample had a Chroma value of close to zero (water was set as the achromatic point). For yellow samples an APHA value of 500 corresponded to a Chroma of ~14.5. In general, most of the resin samples from the novel polymer-tethered catalysts had a Chroma value less than 10, with the preferred catalysts having Chroma values less than 1.

Source of Commercial Chemical Reagents Listed:

N,N-dimethylformamide, anhydrous (Aldrich) [CAS #68-12-2]
Toluene, anhydrous (Aldrich) [CAS #108-88-3]
Xylenes (Aldrich) [CAS #1330-20-7]
Methyl ethyl ketone (Aldrich) [CAS #78-93-3]
Isopropyl Acetate (Aldrich)[CAS #108-21-4]
Heptane (Aldrich) [CAS #142-82-5]
Cesium carbonate, anhydrous (Aldrich) [CAS #534-17-8]
Potassium carbonate, anhydrous (Aldrich) [CAS #584-08-7]
5,10,15,20-Tetrakis(4-hydroxyphenyl)-21H,23H-porphine (Aldrich) [CAS #51094-17-8]
Polyethylene monoalcohol (Aldrich) [71750-71-5] [CAS #71750-71-5], Average $M_n$ ca. 700 (15-20% unreacted hydrocarbons).
Polyethylene monoalcohol (Baker Petrolite) [CAS #71750-71-5] Average $M_n$ Ca. 2000 (15-20% unreacted hydrocarbons).
Cobalt acetate (Aldrich) [CAS #71-48-7]
Cobalt acetate tetrahydrate (Aldrich) [CAS #6147-53-1]
Iodomethane (Aldrich) [CAS #74-88-4]
Methyl methacrylate (Aldrich) [CAS #80-62-6]
n-Butyl methacrylate (Aldrich) [CAS #97-88-1]

2,2'-Azobis(2-methylbutyronitrile) (Vazo 67) from DuPont Company [CAS #13472-08-7]
Tributylamine (Aldrich) [CAS #102-82-9]

Preparation of Non-Commercial Materials 5,10,15,20-Tetrakis[4-(chlorocarbonyl)phenyl]porphyrin was prepared according to a literature procedure: Wamser, C. C.; Bard, R. R.; Senthilathipan, V.; Anderson, V. C.; Yates, J. A.; Lonsdale H. K.; Rayfield, G. W.; Friesen, D. T.; Lorenz, D. A.; Stangle, G. C., van Eikeren P.; Baer, D. R.; Ransdell, R. A.; Golbeck, J. H.; Babcock, W. C.; Sandberg, J. J.; Clarke, S. E. *J. Am. Chem. Soc.* 1989, 111, 8485-8491.

Polyethylene methylsulfonic esters and polyethylene diphenylphosphine (polyethylene 700 or 2000 Daltons) were prepared from the corresponding polyethylene monoalcohols according to the literature procedure: Bergbreiter, D. E.; Blanton, J. R.; Chandran, R.; Hein, M. D.; Huang, K.-J.; Treadwell, D. R.; Walker, S. A. *Journal of Polymer Science: Part A* 1989, 27, 4205.

Catalyst Screening

Screening Protocol: A 100 mL stock solution of degassed methyl methacrylate (MMA)/n-butyl methacrylates (n-BMA)/methyl ethyl ketone (MEK) (33 g: 33 g: 35 g) and 1.5 g butyl acetate (internal GC standard) was prepared prior to the run and stored in the freezer until required. In the drybox, each 20 mL vial was charged with the appropriate amount of catalyst, a magnetic stir-bar and 5.0 g of the stock solution then added. The vials were sealed with phenolic screwcaps equipped with silicone/PFTE septa and placed into a hot block reactor. The vials were preheated at 100° C. for at least 5 minutes before adding 0.5 mL of a stock solution of 2,2'azobis(2-methyl)butanenitrile (30 mg/mL of methyl ethyl ketone) via syringe through the septa. The polymerization reactions were stirred at this temperature for 1 hour before removing the vials from the block reactor. Upon cooling to room temperature a sample was removed from each vial via pipette for both size exclusion chromatography (SEC) and gas chromatography (GC) analysis. An integrated multide-tector SEC system, Waters 150CV™ model with two online detectors, differential refractometer (DR) and capillary viscometer (CV) was used to determine $M_N$, $M_W$ and polydispersity (PDI). Two SEC columns, PL Gel Mixed C and PL Gel 500A columns from Polymer Laboratories were used for separation in tetrahydrofuran (THF) stabilized with BHT. The remaining sample was then filtered using syringe filters (25 mm Acrodisc® with PFTE membrane, 0.2 μL pore size) to remove any precipitated material. The sample was diluted to 7.0 g using methyl ethyl ketone and the resulting solution analyzed by a spectrophotometer (Varian Cary50 UV/Visible Spectrophotometer) to determine the APHA color value, hue and chroma value of the product resin.

EXAMPLES

Example 1

Synthesis of 5,10,15,20-Tetrakis(4-(polyethyleneoxy)phenyl)) porphyrin [(PE$_{700}$-OPh)$_4$-Por]

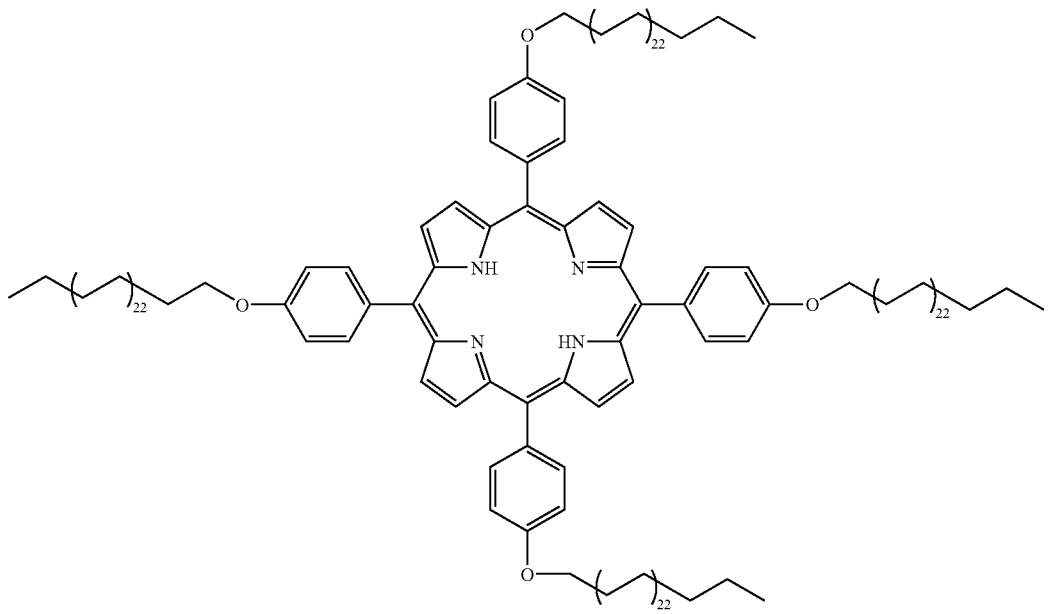

In dry-box, a suspension of polyethylene methylsulfonic ester (PE-OMs) (20.0 g, 69% functionalized, $M_n$ ~780 Daltons) and anhydrous cesium carbonate (9.05 g, 27 mmol) in dry toluene (75 mL) was prepared in a round-bottom flask equipped with a magnetic stirring bar. To this mixture a purple solution of 5,10,15,20-tetrakis(4-hydroxyphenyl)-21H,23H-porphine (2.9 g, 4.27 mmol) in 75 mL N,N-dimethylformamide was added. The reaction mixture was warmed to 95° C. with stirring for ~18 hours under a constant flow of argon, then the temperature increased to 130° C. for a further 5 hours before cooling to ambient temperature. The purple-brown solid that precipitated was collected by filtration, washed thoroughly with methanol and dried under vacuum to yield 21 g of the crude ligand. $^1$H NMR (toluene-d$_8$, 80° C., 55% product, 15% byproducts, 30% unfunctionalized hydrocarbon): δ 8.96 (s), 8.10 (d), 7.22 (d), 4.05 (t), 1.88 (quin.), 1.58 (quin.), 1.31 (br. s), 0.88 (t).

Example 2

Synthesis of 5,10,15,20-Tetrakis(4-(polyethyleneoxy)phenyl) porphyrin Cobalt (II) [(PE$_{700}$-OPh)$_4$-Por.Co(II)]

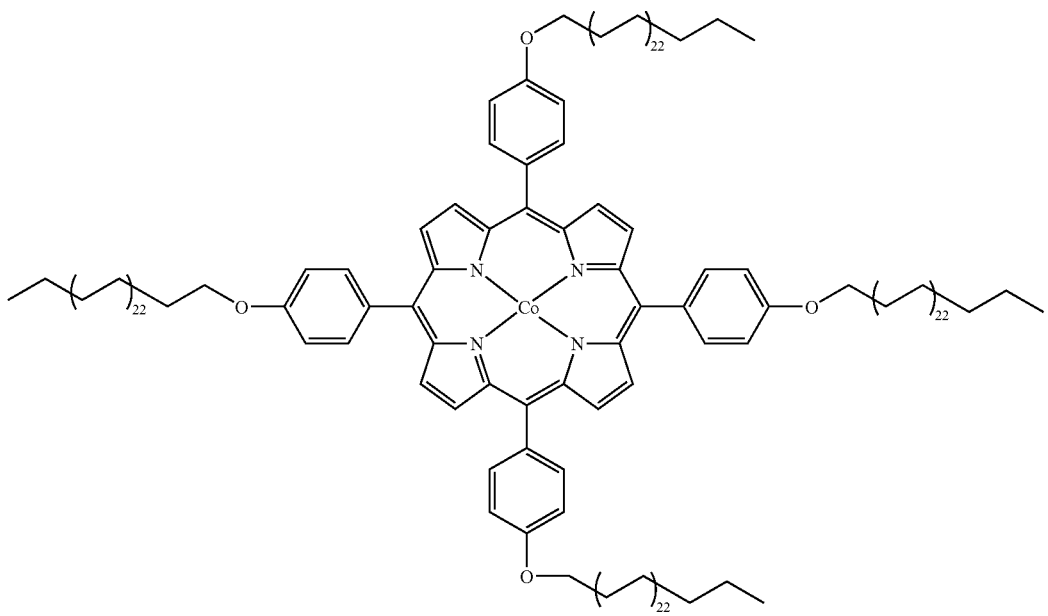

A suspension of 21 g tetrakis(4-(polyethyleneoxy)phenyl)) porphyrin as prepared according to Example 1 in 100 mL of a 1:1 mixture of N,N-dimethylformamide and toluene was prepared in a round bottom flask equipped with a magnetic stir-bar. Cobalt (II) acetate tetrahydrate (1.72 g, 6.9 mmol) was then added and the reaction warmed to 120° C. under a constant argon flow. After stirring at this temperature for 5 hours, the reaction mixture was cooled to room temperature. The red-brown precipitate was collected by filtration and then thoroughly washed with methanol, water, and finally acetone. The crude product was subsequently dried under vacuum to yield 21.43 g of an orange powder. Crude tetrakis(4-(polyethyleneoxy)-phenyl)porphyrin cobalt complex (21.43 g) was transferred to a jacketed Soxhlet apparatus and washed with methyl ethyl ketone until the washings were completely colorless. The Soxhlet thimble containing the washed cobalt complex was then dried under vacuum overnight. The dried product was then extracted using hot xylenes in a jacketed Soxhlet apparatus and the red solution cooled to room temperature. The precipitate was collected by filtration and dried under vacuum, and the orange powder transferred to a jacketed Soxhlet apparatus and washed a second time with methyl ethyl ketone until washings were colorless. The Soxhlet thimble containing the cobalt complex was then dried under vacuum overnight, giving a final weight of 13.4 g of an orange-red powder. $^1$H NMR (toluene-d$_8$, 80° C., 65% product, 7% byproducts, 28% unfunctionalized hydrocarbon): δ 14.93 (v. br. S), 12.51 (br. S), 9.16 (s), 5.22 (s), 2.66 (s), 2.27 (s), 1.97 (s), 1.84 (s), 1.32 (br. S), 0.86 (t). Elemental analysis: 1.24% cobalt.

Example 3

Screening Results for 5,10,15,20-Tetrakis(4-(polyethyleneoxy)phenyl) porphyrin cobalt (II) [(PE$_{700}$-Oph)$_4$-Por].Co(II)] as Prepared According to Example 2

| Catalyst (ppm) | $M_N$ | PDI | Color | APHA | Hue | Chroma |
|---|---|---|---|---|---|---|
| 6.0 × 10$^2$ | 2526 | 2.05 | colorless | 19 | 101.06 | 0.708 |
| 20 × 10$^2$ | 1209 | 1.61 | colorless | 25 | 100.11 | 0.894 |
| 50 × 10$^2$ | 852 | 1.46 | colorless | 23 | 100.74 | 0.833 |
| 100 × 10$^2$ | 591 | 1.27 | colorless | 24 | 99.50 | 0.831 |
| 200 × 10$^2$ | 482 | 1.19 | colorless | 23 | 100.41 | 0.835 |

Example 4

5,10,15,20-Tetrakis(4-(polyethyleneoxycarbonyl)phenyl) porphyrin [(PE$_{700}$-OC(O)Ph)$_4$-Por]

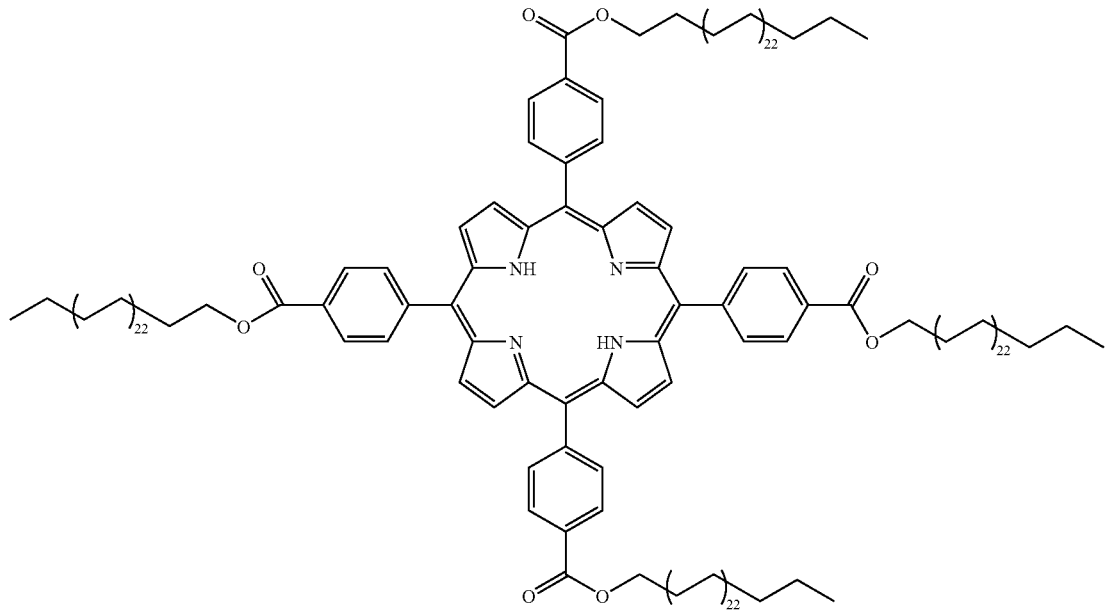

A suspension of polyethylene monoalcohol (PE$_{700}$-OH) (1.0 g, M$_n$ ~700 Daltons, ~80% functionalized) and triethylamine (0.15 mL) in 10 mL toluene was prepared in a vial equipped with a magnetic stir-bar under a N$_2$ atmosphere. 5,10,15,20-Tetrakis(4-(carbonylchloride)phenyl)porphryin (0.24 g, 0.28 mmol) was then added. The sealed vial was then placed in a hot block reactor, previously heated to 100° C., and stirred at that temperature for 16 hours. The vial was then cooled to room temperature, and 3 mL methanol added. The precipitate was collected by filtration and washed first with methanol, then chloroform until the washings were colorless. The product was then dried under vacuum to yield 1.30 g of a dark purple solid. $^1$H NMR (toluene-d$_8$, 80° C., 60% product, ~30% unfunctionalized hydrocarbon): δ 8.7 (br. s), 8.5 (d), 8.1 (d), 4.4 (s), 1.8 (quin.), 1.32 (br. s, polyethylene —CH$_2$), 0.86 (t).

Example 5

5,10,15,20-Tetrakis(4-(polyethyleneoxycarbonyl)phenyl) porphyrin cobalt (II) [(PE$_{700}$-OC(O)Ph)$_4$-Por.Co(II)]

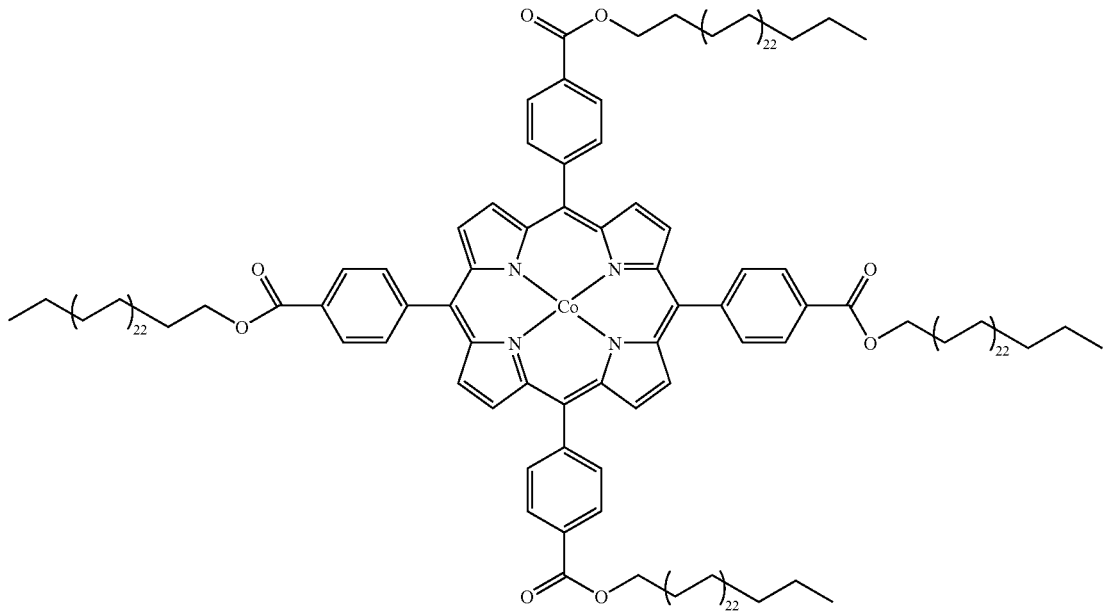

A suspension of 1.25 g tetrakis(4-(polyethyleneoxycarbonyl)phenyl) porphyrin as prepared according to Example 4 in 10 mL of a 1:1 mixture of N,N-dimethylformamide and toluene was prepared in a vial equipped with a magnetic stir-bar. Cobalt (II) acetate (0.072 g, 3.1 mmol) was then added and the sealed vial transferred to a hot block reactor heated to 125° C. After stirring at this temperature for 16 hours, the reaction mixture was cooled to room temperature and methanol (5 mL) added. The red-brown precipitate was collected by filtration, washed thoroughly with methanol, then dried under vacuum to yield 1.28 g of the crude cobalt porphyrin. The cobalt complex was then transferred to a jacketed Soxhlet apparatus and washed with hot methyl ethyl ketone until the washings were completely colorless. The Soxhlet thimble containing the washed cobalt complex was dried under vacuum then extracted using hot toluene in a jacketed Soxhlet apparatus. The red solution was cooled to room temperature and the precipitate collected by filtration. The cobalt compound was transferred to a jacketed Soxhlet apparatus and washed a second time with methyl ethyl ketone. The Soxhlet thimble containing the cobalt complex was then dried under vacuum, giving a final weight of 1.15 g of an orange-red powder (58% product by $^1$H NMR analysis: ~30% unfunctionalized hydrocarbon, 12% polyethylene-containing byproducts). $^1$H NMR (toluene-$d_8$, 80° C.): δ 14.6 (v. br. s), 12.4 (v. br. s), 10.3 (br. s), 5.1 (br. s), 2.4 (quin.), 1.8 (quin.), 1.7 (quin.), 1.6 (quin.), 1.33 (br. s, polyethylene —$CH_2$—), 0.88 (t). Elemental analysis: 1.71% cobalt.

Example 6

Screening Results for 5,10,15,20-Tetrakis(4-(polyethyleneoxycarbonyl)phenyl) porphyrin cobalt (II) [($PE_{700}$-OC(O)Ph)$_4$-Por.Co(II)] as Prepared According to Example 5

| Catalyst (ppm) | $M_N$ | PDI | Color | APHA | Hue | Chroma |
|---|---|---|---|---|---|---|
| $6.0 \times 10^2$ | 3313 | 2.11 | colorless | 21 | 106.08 | 0.81 |
| $20 \times 10^2$ | 1547 | 1.79 | colorless | 27 | 107.71 | 1.05 |
| $50 \times 10^2$ | 869 | 1.53 | colorless | 32 | 108.13 | 1.25 |
| $100 \times 10^2$ | 623 | 1.38 | colorless | 43 | 106.56 | 1.60 |
| $200 \times 10^2$ | 501 | 1.27 | colorless | 59 | 107.41 | 2.21 |

Example 7

Synthesis of 5,15-Bis(4-(polyethyleneoxy)phenyl)-10,20-bis(4-hydroxyphenyl) porphyrin [($PE_{2000}$-OPh)$_2$-Por(PhOH)$_2$]

In dry-box, a suspension of polyethylene methylsulfonic ester ($PE_{2000}$-OMs) (0.8 g, 62% functionalized, $M_n$ ~2080 Daltons) in dry toluene (3 mL) was prepared in a round-bottom flask equipped with a magnetic stirring bar. To this mixture a purple solution of 5,10,15,20-tetrakis(4-hydroxyphenyl)-21H,23H-porphine (0.10 g, 0.15 mmol) and anhydrous cesium carbonate (0.16 g, 0.49 mmol) in 3 mL N-methyl pyrrolidine was added. The reaction mixture was warmed to 110° C. with stirring for 20 hours under a constant flow of argon before cooling to ambient temperature. The brown solid that precipitated was collected by filtration, washed thoroughly with methanol and dried under vacuum to yield 0.835 g of the crude ligand. Analysis by spectroscopic methods indicated an average of two polyethylene tethers per porphyrin center (47% product, ~40% unfunctionalized hydrocarbon, 13% polyethylene-containing byproducts). $^1$H NMR (toluene-$d_8$, 80° C.): δ 8.90 (m), 8.07 (m), 7.91 (d), 7.22 (d), 4.06 (br. s), 1.88 (br. s), 1.58 (br. s), 1.34 (br. s, polyethylene —$CH_2$—), 0.89 (t, 3H, $CH_3$).

Example 8

Synthesis of 5,15-Bis(4-(polyethyleneoxy)phenyl)-10,20-bis(4-methoxyphenyl) porphyrin [($PE_{2000}$-OPh)$_2$-Por(PhOMe)$_2$]

A suspension of 1.0 g of crude of 5,15-bis(4-(polyethyleneoxy)phenyl)-10,20-bis(4-hydroxyphenyl) porphyrin as prepared according to Example 7 in 10 mL of a 1:1 mixture of N,N-dimethylformamide and toluene was prepared in a 20 mL vial equipped with a magnetic stir-bar. Dried potassium carbonate (0.09 g, 0.65 mmol) was then added, followed by iodomethane (0.06 mL, 0.96 mmol). The vial was sealed and placed in a hot block reactor set at 120° C. to stir for 24 hours. Afterwards the precipitate that formed upon cooling was collected by filtration and washed with methanol, water and acetone before drying under vacuum to yield 1.03 g of brown powder. Analysis by spectroscopic methods indicated an average of two polythylene tethers per porphyrin center (45% product, ~40% unfunctionalized hydrocarbon). $^1$H NMR (toluene-$d_8$, 80° C.): δ 8.90 (m), 8.06 (m), 7.91 (d), 7.18 (d), 4.08 (br. s), 3.68, (s), 1.95 (br. s), 1.56 (br. s), 1.33 (br. s, polyethylene —$CH_2$), 0.89 (t, 3H, $CH_3$).

Example 9

Synthesis of 5,15-Bis(4-(polyethyleneoxy)phenyl)-10,20-bis(4-methoxyphenyl) porphyrin cobalt (II) [($PE_{2000}$-OPh)$_2$-Por(PhOMe)$_2$].Co(II)

A suspension of 1.0 g of crude of 5,15-bis(4-(polyethyleneoxy) phenyl)-10,20-bis(4-hydroxyphenyl) porphyrin as prepared according to Example 7 in 8 mL of a 1:1 mixture of N,N-dimethylformamide and toluene was prepared in a 20 mL vial equipped with a magnetic stir-bar. Anhydrous cobalt (II) acetate (0.05 g, 0.28 mmol) was then added and the vial sealed and placed in a hot block reactor set at 120° C., and stirred at this temperature for 18 hours. Afterwards the precipitate that formed upon cooling was collected by filtration and washed with methanol, water and acetone before drying under vacuum to yield 1.10 g of the crude product. The cobalt complex was then transferred to a jacketed Soxhlet apparatus and washed with hot methyl ethyl ketone until the washings were completely colorless. The Soxhlet thimble containing the washed cobalt complex was dried then the product extracted using hot xylene in a jacketed Soxhlet apparatus. The red solution was cooled to room temperature and the precipitate that formed collected by filtration. The cobalt compound was subsequently transferred to a jacketed Soxhlet apparatus and washed a second time with methyl ethyl ketone. The final material was then dried, yielding 1.0 g of a brick-red powder. Analysis by spectroscopic methods indicated an average of two polyethylene tethers per porphyrin center (45% product, ~40% unfunctionalized hydrocarbon). $^1$H NMR (toluene-$d_8$, 80° C.): δ 14.92 (br. s), 12.49 (br. s), 9.12 (br. d), 5.21 (br. s), 4.76 (br. s), 2.70 (br. s), 1.34 (br. s, polyethylene —$CH_2$), 0.89 (br. s, 3H, $CH_3$). Elemental analysis: 0.77% cobalt.

Example 10

Screening Results for 5,15-Bis(4-(polyethyleneoxy)phenyl)-10,20-bis(4-methoxyphenyl) porphyrin cobalt (II) [(PE$_{2000}$-OPh)$_2$-Por(PhOMe)$_2$.Co(II)] as Prepared According to Example 9

| Catalyst (ppm) | M$_N$ | PDI | Color | APHA | Hue | Chroma |
|---|---|---|---|---|---|---|
| 6.0 × 10$^2$ | 6811 | 1.97 | Colorless | 81 | 104.71 | 2.89 |
| 20 × 10$^2$ | 2978 | 1.89 | pale yellow | 195 | 107.71 | 7.03 |
| 50 × 10$^2$ | 1707 | 1.63 | trace yellow | 136 | 106.43 | 4.87 |
| 100 × 10$^2$ | 1318 | 1.57 | trace yellow | 159 | 107.78 | 5.77 |
| 200 × 10$^2$ | 944 | 1.50 | pale yellow | 191 | 108.46 | 6.97 |

Example 11

Synthesis of 4-Polyethylenoxybenzaldehyde (PE$_{700}$-OPh-CHO)

A suspension of polyethylene methylsulfonic ester (PE$_{700}$-OMs) (5.0 g, 80% functionalized, M$_n$ ~780 Daltons) in dry toluene (30 mL) was prepared in a round-bottom flask equipped with a magnetic stirring bar. Cesium carbonate (3.34 g, 10.0 mmol), 4-hydroxybenzaldehyde (0.826 g, 6.8 mmol) and 15 mL anhydrous N,N-dimethylformamide were then added. The reaction was then warmed to reflux temperatures for 18-20 hours before cooling back to ambient temperature. The precipitate was then collected and washed with methanol and acetone before drying the product under vacuum to yield 5.1 g of an off-white powder. $^1$H NMR (toluene-d$_8$, 80° C., 66% purity, 9% byproducts, 25% unfunctionalized hydrocarbon): δ 9.69 (s, 1H), 7.55 (d, 2H), 6.70 (d, 2H), 3.68 (t, 2H), 1.60 (quin., 2H), 1.33 (br. s, 110 H, polyethylene CH$_2$), 0.89 (t, CH$_3$).

Example 12

Synthesis of 5,10,15,20-Tetrakis(4-(polyethyleneoxy)phenyl) porphyrin cobalt (II) [(PE$_{700}$-OPh)$_4$-Por.Co(II)]

A 5 mL microwave vial was charged with 4-polyethylenoxybenzaldehyde as prepared according to Example 11 (1.0 g, 0.85 mmol), pyrrole (0.065 mL, 0.94 mmol), p-nitrobenzene (0.20 mL) and propionic acid (1.3 mL). The vial was sealed and loaded into a Biotage Initiator microwave reactor system. The reaction mixture was then irradiated at 190° C. (power setting at Normal) for 30 minutes with stirring. Upon cooling to room temperature, the black precipitate was collected and washed with toluene, then acetone until the washings were colorless. This material was then dried under vacuum overnight. A suspension of the crude porphyrin was then prepared in a 1:1 mixture of toluene and N,N-dimethylformamide, and cobalt acetate tetrahydrate (0.1 g, 0.4 mmol) added and the reaction mixture warmed to 110° C. for 16-18 hours. Upon cooling to room temperature, the black precipitate was collected and washed thoroughly with methanol and acetone before drying the final product under vacuum. This material was used without further purification.

Example 13

Screening Results for 5,10,15,20-Tetrakis(4-(polyethyleneoxy)phenyl) porphyrin cobalt (II) [(PE$_{700}$-OPh)$_4$-Por.Co(II)] prepared from Condensation Synthetic Route According to Example 12

| Catalyst (ppm) | M$_N$ | PDI | Color | APHA | Hue | Chroma |
|---|---|---|---|---|---|---|
| 6.0 × 10$^2$ | 7082 | 2.50 | trace yellow | 81 | 91.31 | 2.501 |
| 20 × 10$^2$ | 2890 | 2.10 | Colorless | 25 | 105.56 | 0.937 |
| 50 × 10$^2$ | 1529 | 1.77 | Colorless | 33 | 103.01 | 1.193 |
| 100 × 10$^2$ | 996 | 1.56 | Colorless | 28 | 102.14 | 1.011 |
| 200 × 10$^2$ | 698 | 1.39 | Colorless | 44 | 103.45 | 1.589 |

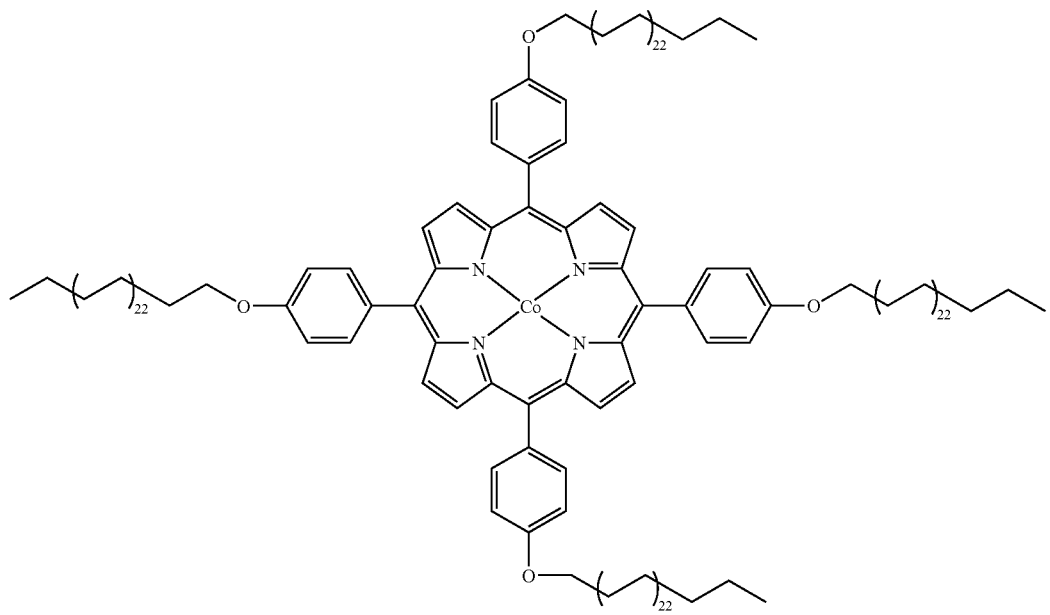

Example 14

Polyethylene-block-poly(ethylene glycol)methylsulfonic ester (PE-PEG-OMs)

A suspension of polyethylene-block-polyethylene glycol) (5.0 g, $M_n$ ~875 Daltons, ethylene oxide 20 wt. %, ~80% functionalized, Aldrich #458996) in anhydrous toluene (100 mL) and triethylamine (3.85 mL, 27.4 mmol) was prepared in a round bottom flask equipped with a magnetic stirring bar and an addition funnel. The suspension was warmed to 65° C. with stirring until the solid polymer was completely dissolved. Methanesulfonyl chloride (2.12 mL, 27.4 mmol) was then added over a period of 5 minutes. The reaction mixture was stirred at this temperature for 3.5 hours, then cooled to 40° C. before adding 50 mL methanol dropwise over 30 minutes. The off-white solid that precipitated was collected by filtration and washed thoroughly with methanol (300 mL) and acetone (50 mL) before drying the final product under vacuum. Final weight of recovered material was 4.9 g. $^1$H NMR (toluene-$d_8$, 80° C., 68% product, ~30% unfunctionalized hydrocarbon): δ 3.95 (m, 2H, PE-C$\underline{H}_3$OPEG-), 3.49-3.37 (br. s, —OC$\underline{H}_2$C$\underline{H}_2$O—), 3.29 (s, 3H, —OMs), 1.55 (m, 2H), 1.44 (m, 2H), 1.34(br. s, 96H, polyethylene CH$_2$), 0.87 (t, C$\underline{H}_3$).

Example 15

Synthesis of 5,10,15,20-Tetrakis(4-(polyethylene-block-poly(ethylene glycol))phenyl) porphyrin [(PE-PEG-OPh)$_4$-Por]

In dry-box, a suspension of polyethylene block-poly(ethylene glycol) methylsulfonic ester (PE-PEG-OMs, prepared according to Example 14) (1.0 g, $M_n$ ~956 Daltons) in dry toluene (3 mL) was prepared in a round-bottom flask equipped with a magnetic stirring bar. To this mixture a purple solution of 5,10,15,20-tetrakis(4-hydroxyphenyl)-21H,23H-porphine (0.124 g, 0.18 mmol) and anhydrous cesium carbonate (0.28 g, 0.86 mmol) in 3 mL N,N-dimethylformamide was added. The reaction mixture was warmed to 110° C. with stirring for 48 hours under a constant flow of argon before cooling to ambient temperature. The brown solid that precipitated was collected by filtration, washed thoroughly with methanol and acetone then dried under vacuum to yield 0.93 g of the crude ligand. $^1$H NMR (toluene-$d_8$, 80° C., 54% product, ~38% unfunctionalized hydrocarbon): δ 8.92 (br. s, 8H), 8.06 (d, 8H), 7.19 (br. s), 4.19 (br. s), 3.84 (br. s, 8H), 3.70-3.30 (m, 48H, —OC$\underline{H}_2$C$\underline{H}_2$O—), 1.54 (m, 8H), 1.58 (br. s), 1.34 (br. s, polyethylene —CH$_2$—), 0.89 (br. s, CH$_3$).

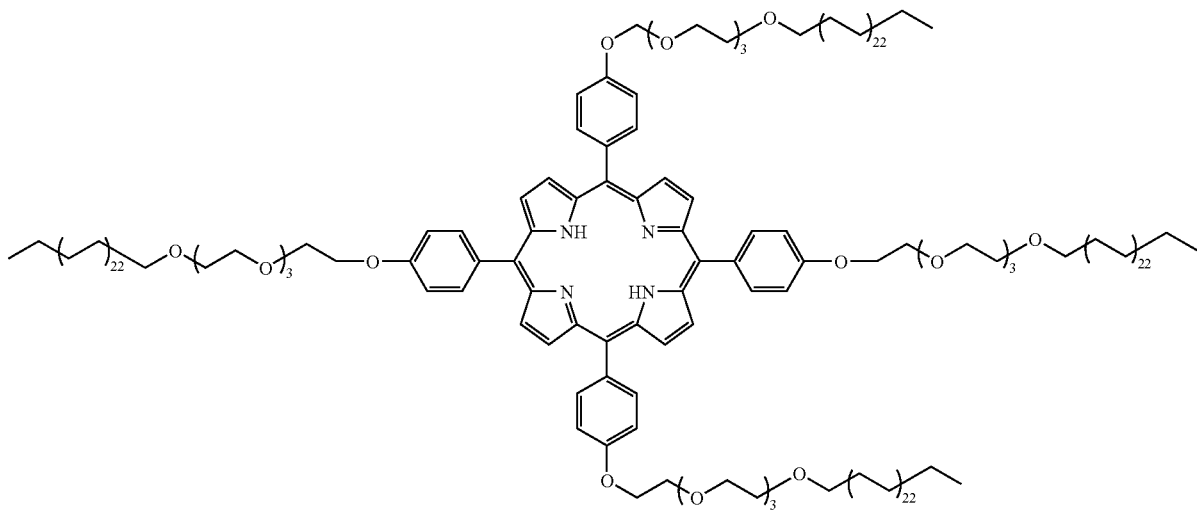

Example 16

Synthesis of 5,10,15,20-Tetrakis(4-(polyethylene-block-poly(ethylene glycol))phenyl) porphyrin cobalt (II) [(PE-PEG-OPh)$_4$-Por].Co(II)

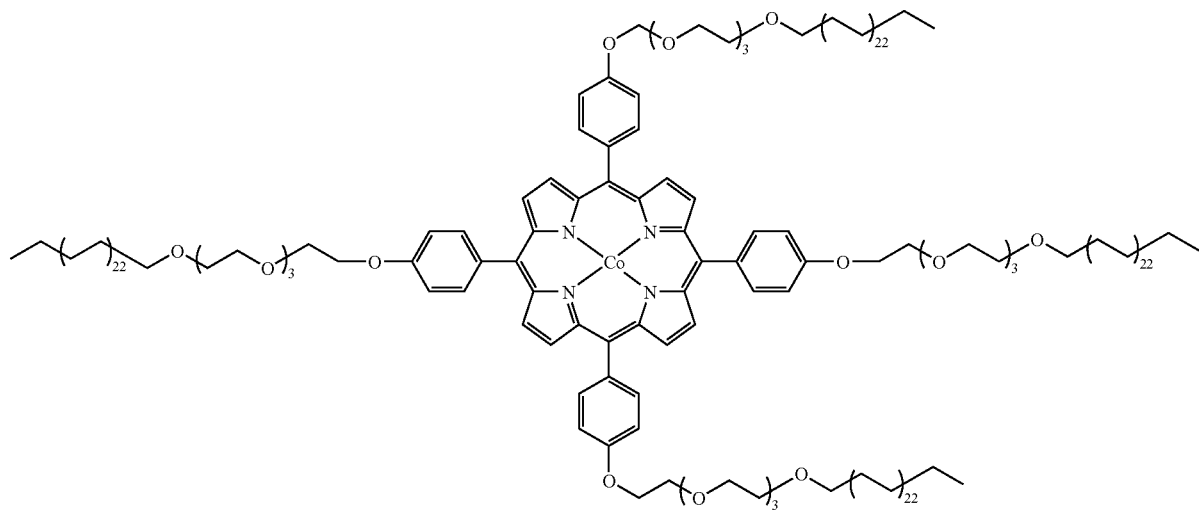

A suspension of 0.9 g of crude of 5,10,15,20-tetrakis(4-(polyethylene-block-poly(ethylene glycol))phenyl) porphyrin as prepared according to Example 15 in 8 mL of a 1:1 mixture of N,N-dimethylformamide and toluene was prepared in a 20 mL vial equipped with a magnetic stir-bar. Anhydrous cobalt (II) acetate (0.05 g, 0.28 mmol) was then added and the vial sealed and placed in a hot block reactor set at 115° C., and stirred at this temperature for 18 hours. The precipitate that formed upon subsequent cooling was collected by filtration and washed with methanol and acetone before drying under vacuum to yield a brick-red powder (used without further purification). $^1$H NMR (toluene-d$_8$, 80° C., 46% product, ~40% unfunctionalized hydrocarbon): δ 14.93 (v. br. s, 8H), 12.50 (br. s, 8H), 9.15 (s, 8H), 5.33 (s, 8H), 4.64 (s, 8H), 4.26 (s, 8H), 4.11 (s, 8H), 3.98 (s, 8H), 3.91 (s, 8H), 3.80 (s, 8H), 3.72-3.35 (m, —OCH$_2$CH$_2$O—), 1.55 (s, 8H), 1.32 (br. s, polyethylene —CH$_2$—), 0.89 (s, CH$_3$). Elemental analysis: 0.73% cobalt.

Example 17

Screening Results for 5,10,15,20-Tetrakis(4-(polyethylene-block-poly(ethylene glycol))phenyl) porphyrin cobalt (II) [(PE-PEG-OPh)$_4$-Por].Co(II) as Prepared According to Example 16

| Catalyst (ppm) | $M_N$ | PDI | Color | APHA | Hue | Chroma |
|---|---|---|---|---|---|---|
| $6.0 \times 10^2$ | 6093 | 1.84 | Colorless | 23 | 103.90 | 0.87 |
| $20 \times 10^2$ | 1822 | 1.87 | Colorless | 37 | 107.10 | 1.40 |
| $50 \times 10^2$ | 1010 | 1.58 | Colorless | 36 | 107.09 | 1.37 |
| $100 \times 10^2$ | 734 | 1.45 | Colorless | 44 | 107.53 | 1.67 |
| $200 \times 10^2$ | 515 | 1.28 | Colorless | 45 | 108.24 | 1.72 |

Example 18

Synthesis of 460 Mw Polyethylene-Tethered Phthalonitirle

Polyethylene monoalcohol (~460 Daltons, 85% functionalized) in pellet form (15.0 g, 32.6 mmol) and anhydrous tetrahydrofuran (75 ml) were added to a round bottom flask equipped with a magnetic stirring bar. This was allowed to stir at room temperature for 2 hours. 4-Nitrophthalonitrile (5.82 g, 33.6 mmol) was added to the mixture and the suspension was heated to reflux under a nitrogen purge. After reflux temperature was reached, the cesium carbonate (15.74 g, 48.9 mmol) was added in three equal portions over 2 hours. After 18 hours the reaction was cooled to 50° C. then poured into 500 mL of water with stirring. The precipitate was filtered and washed thoroughly with water until pH neutral. The product was then rinsed with methanol and then toluene and dried under vacuum. The yield of material was 10.2 g (87% mass balance). $^1$H NMR (toluene-d$_8$, 100° C.): δ 6.87 (d), 6.61 (s), 6.42 (m), 3.43 (t), 3.37 (t), 1.31 (s), 0.88 (s).

Example 19

Synthesis of Tetrakis(polyethyleneoxy) pthalocyanine Cobalt (II)

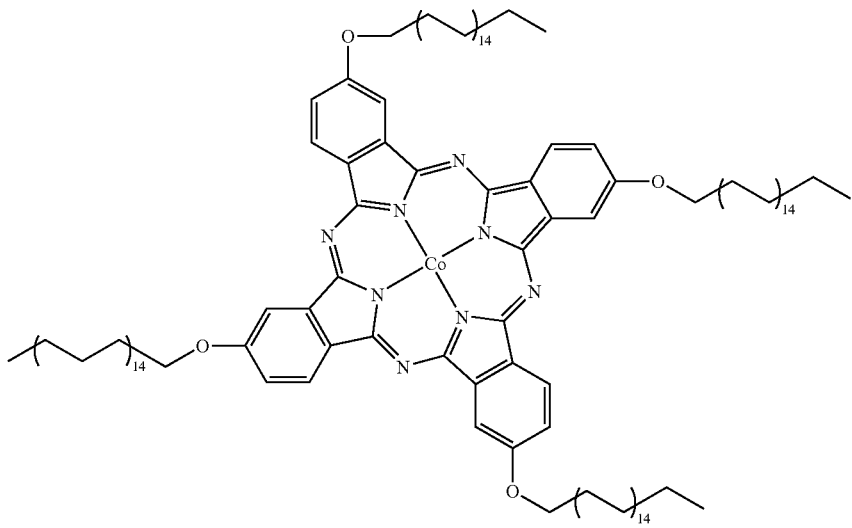

The polyethylene-tethered phthalonitrile (0.60 g, 1.0 mmol, prepared according to Example 18), 1,5-Diazabicyclo [4.3.0]non-5-ene (0.062 g, 0.50 mmol) and cobalt acetate (0.044 g, 0.25 mmol) were added to a reaction vial equipped with a magnetic stir bar. The reaction was then heated to 175° C. for 2 hours before reducing the temperature to 95° C. and adding toluene. The reaction mixture was poured into methanol, filtered, and the solid washed with methanol. The collected product is dried under vacuum to yield 0.60 g.

Example 20

Screening Results for Tetra(polyethyleneoxy) pthalocyanine cobalt (II) Prepared According to Example 19

Screening protocol: [MMA/n-BMA/toluene, 70% solids, 1 gram scale, 100° C. for 1 hour]. A reaction vial containing toluene (0.33 g), monomers (0.33 g MMA, 0.33 g n-BMA) and measured catalyst was preheated to 100° C. for a minimum of 5 minutes before adding 0.1 mL of a stock solution of 2,2'azobis(2-methyl)butanenitrile (30 mg/mL of toluene) via syringe. After 1 hour the reaction was cooled to room temperature and a sample was removed for GPC analysis. The remaining sample was filtered using syringe filters (PFTE membrane, 0.2 μL pore size) to remove any precipitated material and the color of the filtrate analyzed.

| Catalyst (ppm) | $M_N$ | PDI | APHA | Hue | Chroma |
|---|---|---|---|---|---|
| $18.9 \times 10^2$ | 973 | 1.8 | 94 | 98 | 3.07 |
| $18.8 \times 10^2$ | 1063 | 1.8 | 44 | 97 | 1.48 |

Example 21

Synthesis of 700 Mw Polyethylene-Tethered Phthalonitirle

Polyethylene monoalcohol (~700 Daltons, 80% functionalized) in pellet form (6.0 g, 8.0 mmol) and anhydrous tetrahydrofuran (62 mL) were added to a round bottom flask equipped with a magnetic stirring bar. This was allowed to stir at room temperature for 2 hours before 4-nitrophthalonitrile (2.25 g, 13.0 mmol) was added to the mixture and the suspension was heated to reflux under a nitrogen purge. After the polymer had dissolved the cesium carbonate (4.22 g, 13.0 mmol) was added in three equal portions over 3 hours. After 24 hours the reaction was cooled to 60° C. then poured into 500 mL of water with stirring. The precipitate was filtered and washed thoroughly with water until pH neutral. The product was then rinsed with N,N-dimethylformamide, tetrahydrofuran and then dried under vacuum. The yield of material was 5.03 g. $^1$H NMR (toluene-$d_8$, 100° C., 71% conversion): δ 6.86 (d), 6.59 (s), 6.41 (m), 3.41 (t), 3.37 (t), 1.31 (s), 0.88 (s).

Example 22

Synthesis of Tetrakis (polyethyleneoxy) pthalocyanine cobalt (II)

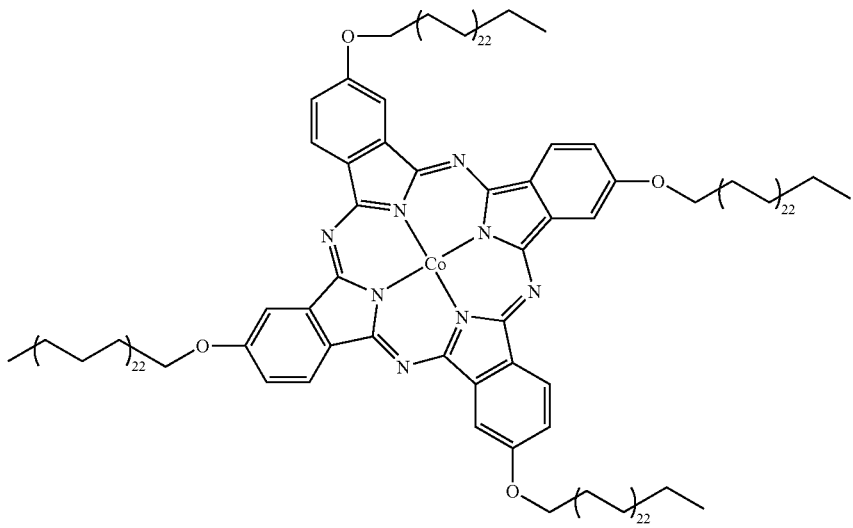

The 700 Mw polyethylene-tethered phthalonitrile (0.827 g, 1.0 mmol, prepared according to Example 21), 1,5-Diazabicyclo[4.3.0]non-5-ene (0.062 g, 0.50 mmol) and cobalt acetate (0.044 g, 0.25 mmol) were added to a reaction vial equipped with a magnetic stir bar. The reaction was then heated to 175° C. for 2 hours before reducing the temperature to 95° C. and adding toluene. The reaction mixture was then poured into methanol, filtered, and the solid washed further with methanol. The collected product is then dried under vacuum to yield 0.62 g.

Example 23

Screening Results for Tetra (polyethyleneoxy) pthalocyanine cobalt (II) Prepared According to Example 22

Screening protocol: [MMA/n-BMA/toluene, 70% solids, 1 gram scale, 100° C. for 1 hour]. A reaction vial containing toluene (0.33 g), monomers (0.33 g MMA, 0.33 g n-BMA) and measured catalyst was preheated to 100° C. for a minimum of 5 minutes before adding 0.1 mL of a stock solution of 2,2'azobis(2-methyl)butanenitrile (30 mg/mL of toluene) via syringe. After 1 hour the reaction was cooled to room temperature and a sample was removed for GPC analysis. The remaining sample was filtered using syringe filters (PFTE membrane, 0.2 µL pore size) to remove any precipitated material and the color of the filtrate analyzed.

| Catalyst (ppm) | $M_N$ | PDI | APHA | Hue | Chroma |
|---|---|---|---|---|---|
| 24.5 × 10² | 901 | 1.87 | 20 | 82.4 | 0.62 |
| 20.7 × 10² | 1101 | 2.00 | 19 | 101.6 | 0.71 |

Example 24

Synthesis of 1,2-bis(4-polyethyleneoxy phenyl)ethane-1,2-dione

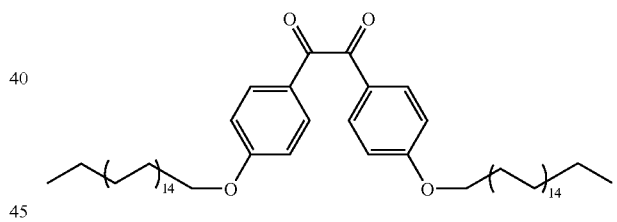

In drybox, a suspension of 2.0 g polyethylene methylsulfonic ester (~80% functionalized, $M_n$ ~540 Daltons) in 20 mL toluene was prepared in a round-bottom flask equipped with a magnetic stirring bar. To this mixture a solution of 1,2-bis (4-hydroxy phenyl)ethane-1,2-dione (0.36 g, 1.48 mmol) and anhydrous cesium carbonate (1.4 g, 4.4 mmol) in 10 mL N,N-dimethylformamide was added. The reaction mixture was warmed to 110° C. with stirring for ~16 hours under a constant flow of argon, before cooling to room temperature. The precipitate was collected by filtration, washed thoroughly with methanol and dried under vacuum to yield 1.96 g of off-white powder. ¹H NMR (toluene-$d_8$, 80° C., 72% product, 20% unfunctionalized hydrocarbon): δ 7.96 (d), 6.68 (d), 3.68 (t), 1.59 (quin.), 1.31 (br. s), 0.88 (t).

Example 25

Synthesis of 1,2-bis(4-polyethyleneoxy phenyl)ethane-1,2-dione dioxime

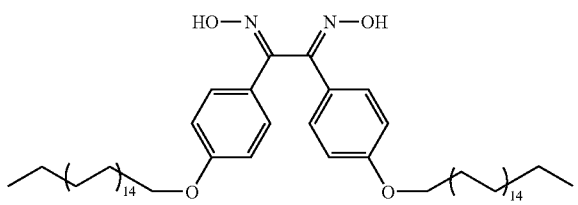

In drybox, a suspension of 1,2-bis(4-polyethyleneoxy phenyl)ethane-1,2-dione (1.0 g, 0.62 mmol prepared according to Example 24) and hydroxylamine hydrochloride (0.36 g, 5.2 mmol) in 20 mL of a 1:1 toluene/isopropanol solution was prepared in a reaction vial equipped with a magnetic stirring bar. Triethylamine (0.72 mL 5.2 mmol) was then added via syringe and the reaction vial sealed and removed to a hot block preheated to 80° C. Reaction mixture was stirred at this temperature for 48 hours before cooling to room temperature. The precipitate that formed was collected by filtration, washed with de-ionized water and methanol, and then dried under vacuum to yield 0.95 g of a tan powder. $^1$H NMR (toluene-$d_8$, 80° C., ~70% product, ~22% unfunctionalized hydrocarbon): δ 7.96 (d), 7.65 (d), 6.73 (d), 6.72 (d), 3.73-3.68 (two overlapping triplets), 1.62 (quin.), 1.31 (br. s), 0.89 (t).

Example 26

Preparation of Cobalt(II) Catalyst with 1,2-bis(4-polyethyleneoxy phenyl)ethane-1,2-dione dioxime In drybox, a 40 mL vial with a stir bar was charged with 0.100 g of 1,2-bis(4-polyethyleneoxy phenyl)ethane-1,2-dione dioxime (prepared according to Example 25), 8 mg of cobalt acetate tetrahydrate, 13.29 g of pyridine and 1.2 mL of toluene. The mixture was heated in a 100° C. hot block for four days. The reaction mixture was cooled to room temperature, filtered, and then washed with toluene to yield 0.101 g of a brown-orange solid. A 1.0 g scale polymerization reaction [MMA/n-BMA/MEK, 70% solids, 1 gram scale, 100° C. for 1 hour] was performed with 20 mg of this catalyst to give Mn 381, Mw 433 (with a PDI of 1.137). The catalyst was then removed by filtration through a syringe filter. To the filtrate was added 2 mL MEK; APHA of this resin solution was determined to be 27.

Example 27

5,10,15-Tris(4-poly(ethylene glycol))phenyl)-20-(4-hydroxy-phenyl)porphyrin

A mixture of polyethylene glycol) methylsulfonic ester (MeO-PEG-OMs) (0.837 g, 0.419 mmol), 5,10,15,20-tetrakis(4-hydroxyphenyl)-21H,23H-porphine (0.082 g, 0.12 mmol) and anhydrous cesium carbonate (0.196 g, 0.602 mmol) in 60 mL of a 1:1 mixture of N,N-dimethylformamide and toluene was prepared in a round-bottom flask equipped with a magnetic stirring bar. The reaction mixture was warmed to 120° C. for 48 hours under an argon atmosphere then cooled to room temperature. The solvent was removed under vacuum and the solid dissolved in chloroform. This chloroform solution was washed with 10% aqueous HCl (chloroform solution turns bright green) followed by saturated NaHCO$_3$ solution (turns dark purple). The organic phase was then collected, dried with MgSO$_4$, and solvent removed under vacuum to yield 0.72 g of a dark purple solid. Analysis by spectroscopic methods indicated an average of three poly(ethylene glycol)tethers per porphyrin center. $^1$H NMR (THF-$d_8$): δ 8.85 (br. s, 8H), 8.69 (s, 1H, —OH), 8.11 (d, 6H), 8.00 (d, 2H), 7.36 (m, 6H), 7.17 (m, 2H), 4.41 (t, 6H, PEGCH$_2$CH$_2$O-Por), 4.01 (t, 6H, PEGCH$_2$CH$_2$O-Por), 3.77 (t, 6H), 3.65-3.38 (poly(ethylene glycol) peak), 3.27 (s, 3H, MeO-PEG).

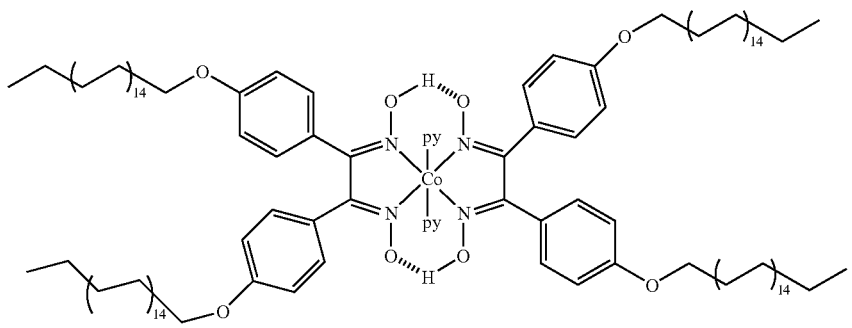

Example 28

5,10,15-Tris(4-poly(ethylene glycol))phenyl)-20-(4-hydroxy-phenyl)porphyrin Cobalt (II)

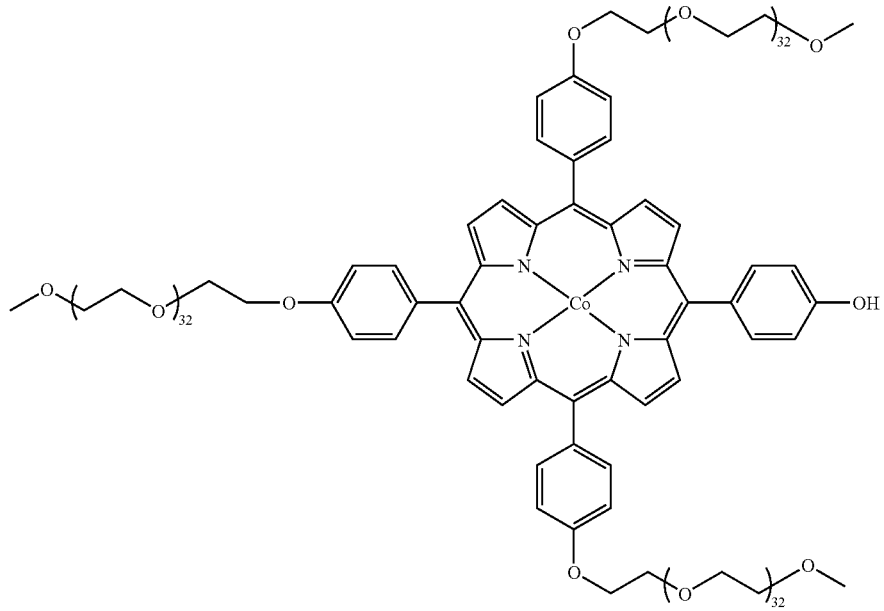

A solution of 0.72 g tris(4-(poly(ethylene glycol)phenyl)-20-(4-hydroxyphenyl) porphyrin (prepared according to Example 27) in 10 mL of N,N-dimethylformamide was prepared in a round bottom flask equipped with a magnetic stir-bar. Cobalt (II) acetate (0.021 g, 0.118 mmol) was then added and the reaction warmed to 70° C. under a constant nitrogen flow. After stirring at this temperature for 72 hours, the reaction mixture was cooled to room temperature and the solvent removed by evaporation under vacuum. The solid residue was dissolved in a minimum of methanol then isopropanol added to precipitate the product. This material was collected by filtration and dried under vacuum to yield 0.70 g (97%) of a reddish-brown crystalline powder. Analysis by spectroscopic methods indicated an average of three polyethylene tethers per porphyrin center UV/vis (toluene, 5 cm path, 0.0102 g/L): $\lambda_{max}$ 418 nm. $^1$H NMR (THF-$d_8$): δ 13.1 (v br. s, 8H), 9.70 (v br. s, 8H), 9.12 (s, 1H), 8.22 (br. s, 6H), 8.09 (br. s, 2H), 4.90 (br. s, 6H, PEGCH$_2$CH$_2$O-Por), 4.32 (br. s, 6H, PEGCH$_2$CH$_2$O-Por), 4.02 (br. s, 6H), 3.91 (br. s, 6H), 3.82 (br. s, 6H), 3.79 (br. s, 6H), (3.72-3.38 (poly(ethylene glycol) peak), 3.27 (s, 3H, MeO-PEG). Cobalt analysis: 1.08%.

Example 29

Screening Results for 5,10,15-Tris(4-poly(ethylene glycol))phenyl)-20-(4-hydroxy-phenyl)porphyrin Cobalt (II) [(MeO-PEG$_{2000}$-OPh)$_3$-Por(PhOH).Co(II)] Prepared According to Example 28

Screening Protocol A: [MMA/nBMA, 1 gram scale, 100° C. for 6 hours] A stock solution of degassed MMA/nBMA/solvent (1:1:1.06 by weight) was prepared immediately prior to the run. In the drybox, each 4 mL vial was charged with the appropriate amount of catalyst and a magnetic stir-bar and 1.0 g of the stock solution added. 2,2'azobis(2-methyl)butanenitrile (3 mg) was then added to each vial and the vials sealed and placed into a hot block reactor at 100° C. The polymerization reactions were stirred for 6 hours before removing the vials from the reactor. Upon cooling to room temperature a sample was removed via pipette from each vial for GPC analysis. The remaining sample was filtered using syringe filters (PFTE membrane, 0.2 μL pore size) to remove any precipitated material and the appearance of the filtrate recorded.

| Catalyst (ppm) | Solvent | $M_N$ | PDI | Filtrate |
|---|---|---|---|---|
| 310 × 10$^2$ | MEK | 325 | 1.33 | red (soluble) |
| 60 × 10$^2$ | MEK | 858 | 1.80 | red (soluble) |
| 54 × 10$^2$ | nBu$_2$O | 913 | 1.67 | colorless |
| 30 × 10$^2$ | nBu$_2$O | 2091 | 1.84 | very pale yellow |
| 58 × 10$^2$ | IPA | 923 | 1.88 | red (soluble) |

Screening Protocol B:
[MMA/n-BMA/MEK, 70% solids, 1 gram scale, 100° C. for 1 hour]. Similar to above except reaction was maintained at 100° C. for 1 hour only. Catalyst removal from resin: Dark red resin from the polymerization reaction was diluted with 9 mL diethyl ether and the cloudy suspension filtered through a small alumina pipette column (ICN Activity I adsorption chromatography grade alumina, ~4 cm).

| Catalyst (ppm) | $M_N$ | PDI | Resin | decolor. |
|---|---|---|---|---|
| 10 × 10$^2$ | 3174 | 2.29 | Dark yellow | — |
| 20 × 10$^2$ | 1567 | 1.95 | Dark yellow | — |
| 50 × 10$^2$ | 1075 | 1.89 | Red | — |
| 109 × 10$^2$ | 768 | 1.82 | Red | pale yellow |
| 202 × 10$^2$ | 813 | 2.67 | Dark red | pale yellow |

Example 30

Production of i-BMA Macromonomer

A batch of I-BMA macromonomer was produced using the following conditions.

| i-BMA Macromer | |
| --- | --- |
| Batch Size (grams) | 1200 |
| Monomer Fraction | 35.0 |
| % of Monomer on 1st Drop | 0.0 |
| % of Initiator on 1st Drop | 0.0 |
| % Init on Mon | 1.00 |
| ppm catalyst on Monomer | 20000 |
| mon feed time (min) | 180 |
| init feed time (min) | 180 |
| ibma | 100 |
| solv in pot | 70 |
| solv w/mon omer | 5 |
| solv w/init | 25 |

Initial Charge

Add to reactor, bubble nitrogen and then heat to 100° C.

| Name | S— | Xw | grams |
| --- | --- | --- | --- |
| Aromatic HC | 2 | 0.4477 | 537.2 |
| thermomorphic catalyst prepared according to Example 2 | 1 | 7E−03 | 8.400 |

Monomer Feed

Load to flask and bubble with nitrogen.

Feed with Part II feed over 180 minutes.

| Name | S— | Xw | grams | rate |
| --- | --- | --- | --- | --- |
| Aromatic HC | 2 | 0.0320 | 38.4 | 2.55 g/min |
| Ibma | 3 | 0.3500 | 420.0 | |

Initiator Feed

Add to flask, mix until dissolved, and bubble nitrogen.

Feed cocurrent with monomer over 180 minutes

| Name | S— | Xw | grams | rate |
| --- | --- | --- | --- | --- |
| Aromatic HC | 2 | 0.1599 | 191.9 | 1.09 g/min |
| Vazo 52 | 4 | 0.0035 | 4.200 | |

Hold at 100° C. for 2 hours. Cool Down.

Filter, dry and recover catalyst. Record weight of recovered catalyst.

Submit for low mw gpc, solids, free monomer and apha color.

| | | |
| --- | --- | --- |
| Totals | 1.0000 | 1200.0 |

The resulting product was filtered through 2-3 nominal micron polyester paper, aka C paper (bleached wood pulp 0.059 inch thick) and the resulting color was an apha value of 20. The sample molecular weight was run on a column calibrated for low molecular weight using pmma standards and the resulting molecular weight distribution can be characterized as multi-modal with Mn 471, Mw 529, Mp 472, Mz 609, Mz+1 712 and Mw/Mn 1.12279. Over 60% of the macromonomer distribution was less than tetramer per the gpc trace. A 2nd batch was made under identical conditions and filtered through 20-25 nominal micron polyester paper, aka A paper and the resulting color was an alpha value of 200. 1% by batch weight of activated carbon, Calgon ADP, was added to the macromonomer solution, stirred for 5 minutes and allowed to sit for ½ hour and then filtered through a paper again. The resulting apha color was 20.

Example 31

Diphenylglyoxime Cobalt(II)—Catalyzed MMA/n-BMA Polymerization in Presence of Polyethylene-Tethered Diphenylphosphine In the drybox, each 20 mL vial was charged with a measured amount of diphenylglyoxime cobalt catalyst (DPG) catalyst, polyethylene-tethered diphenylphosphine ($PE_{2000}$-$PPh_2$) and a magnetic stir-bar and 5.0 g of the MMA/n-BMA stock solution then added. The vials were sealed and placed into a hot block reactor. The vials were preheated at 100° C. for 5 minutes before adding 0.5 mL of a stock solution of 2,2'azobis(2-methyl)butanenitrile (30 mg/mL of methyl ethyl ketone). The polymerization reactions were stirred at this temperature for 1 hour before removing the vials from the block reactor. Upon cooling to room temperature a small sample was removed from each vial for GPC analysis. The remaining material was then filtered using syringe filters (0.2 μL pore size) to remove green precipitated material. The filtrate was diluted to 7.0 g using methyl ethyl ketone and the sample analyzed to determine the APHA color value, hue and chroma value of the polymer solution.

| DPG (ppm) | $PE_{2000}PPh_2$ | $M_N$ | PDI | Color | APHA | Hue | Chroma |
| --- | --- | --- | --- | --- | --- | --- | --- |
| $8 \times 10^2$ | 0 | 297 | 1.14 | Orange | >7000* | 69.3 | 106.36 |
| $8 \times 10^2$ | $160 \times 10^2$ | 285 | 1.09 | Pale orange | 776 | 72.4 | 18.31 |
| $8 \times 10^2$ | $320 \times 10^2$ | 331 | 1.12 | Pale orange | 780 | 70.2 | 18.30 |

*Outside calibration range of color determination method.

Example 32

Dipyrrole Chelates

Dipyrrole chelates can be made according to the following procedure.

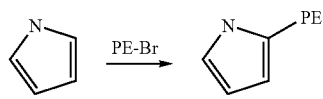

eq. 1

-continued eq. 2

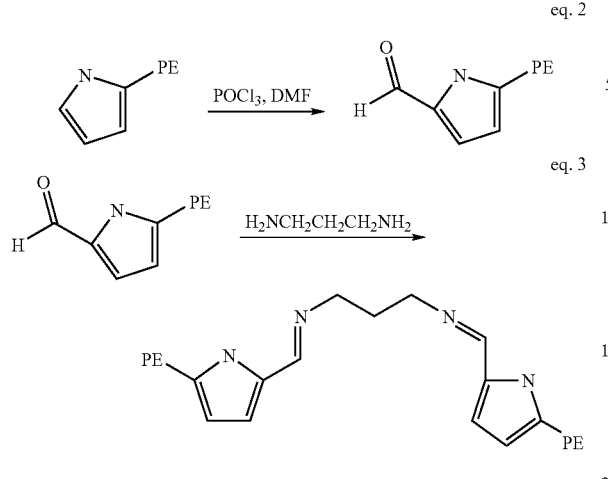

eq. 3

The polyethylene-tethered 2,2'-trimethylene bis(nitromethylidyne)dipyrrole ligand is made in a step-wise fashion as described in the synthetic route listed above. The first step is the reaction of pyrrole and PE-Br, which is carried out in a procedure similar to that described in Organic Letters, 2005, 1231-1234. PE-Br or PE-mesylate can be used for this reaction in an ionic liquid (1-n-butyl-3-methylimidazolium hexafluoroantimonate, for example) with potassium carbonate. Typically, 1 mmol of PE-Br or PE-mesylate is combined with 10 equivalents of pyrrole, 0.8 mmoles of potassium carbonate and 2.4 mL of the ionic liquid in acetonitrile (0.6 mL). The mixture is then heated for 44 hours at 115° C. The aldehyde product is then washed repeatedly with diethyl ether to remove excess pyrrole, and then the desired material is extracted with hot toluene.

The second step uses a procedure similar to that described in J. Medicinal Chemistry, 2004, 4054-4059. Equal molar (41 mmol) of N,N-dimethylformamide and phosphorus oxychloride are mixed at 0° C. and stirred at room temperature for 15 minutes. To this is added 18 mL of 1,2-dichloroethane added at 0° C. and 37 mmoles of the substituted pyrrole from step 1 (chlorobenzene is used instead of dichloroethane for PE>500 Daltons) added. The resulting mixture is refluxed and then cooled. Sodium acetate (203 mmol) and 45 mL of water are added to the reaction mixture and refluxed for 20 minutes. The aqueous phase is removed from the reaction mixture before cooling to room temperature. The precipitated product is then collected via filtration.

The third step is carried out in a procedure similar to that described in J. Organic Chemistry 689 (2004) 947-952. The compound formed in step 2 (13 mmol) is mixed with 6.6 mmol of 1,3-diaminopropane and catalytic acetic acid in 10 mL toluene and heated to reflux. The ligand product should precipitate out of the solution upon cooling to room temperature.

The fourth step uses a procedure similar to that described in U.S. Pat. No. 4,680,354. The ligand formed in step 3 is mixed with cobalt (II) chloride hydrate, pyridine, potassium hydroxide/methanol and methyl isobutyl ketone (MIBK). The mixture is heated to dissolve the polyethylene-tethered ligand. When the solution is cooled to room temperature, the thermomorphic catalyst formed is then collected by any convenient method, generally filtration.

Example 33

Dipyrroles

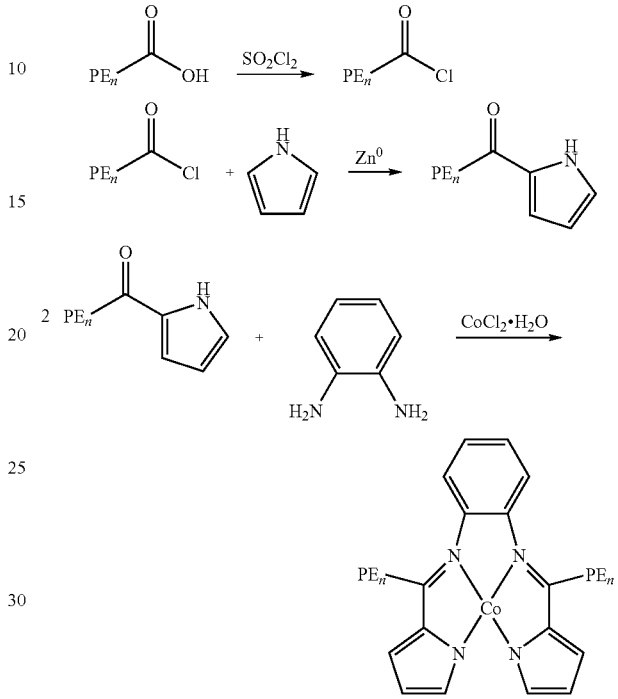

Preparation of chlorocarbonyl terminated ethylene oligomers has been described previously (see Bergbreiter et al., J. Polymer Science: Part A, 1989, 4205-4226). In the first step, the carboxylic acid (0.1 mmol) is dissolved in 30 mL toluene by stirring at 100° C., then 3 mL of thionyl chloride is added. The reaction mixture is heated to reflux for 16 hours then solvent and excess thionyl chloride is removed via distillation. The solid product may be used without further purification.

The zinc-mediated acylation of pyrrole is carried out similarly to the procedure described in Tetrahedron Lett. 2002, 43, 8133-8135. In the second step, the acid chloride prepared in step 1 is suspended in toluene and warmed at 100° C. until completely dissolved, and the solution cooled back to 70° C. Excess pyrrole (0.5 mmol) and the activated zinc powder (1.0 mmol) is added. The reaction mixture is kept stirring at this temperature until reaction is complete. Upon cooling, the polyethylene-tethered material precipitates and is collected by filtration. Solid is washed with aqueous solution of sodium bicarbonate, followed by distilled water and then methanol.

In the third step, a suspension of the polyethylene-tethered pyrrole from step 2 is prepared in toluene and 0.5 equivalent of o-phenylenediamine is added. The mixture is heated to reflux with azeotropic removal of water. Once condensation reaction is complete, a solution of cobalt (II) chloride, (0.6 equiv), potassium hydroxide (1.0 equiv) in N,N-dimethylformamide is added to the warm reaction mixture. The mixture is heated for several hours, then cooled, and the precipitated cobalt complex is then filtered off.

Example 34

Pydiene

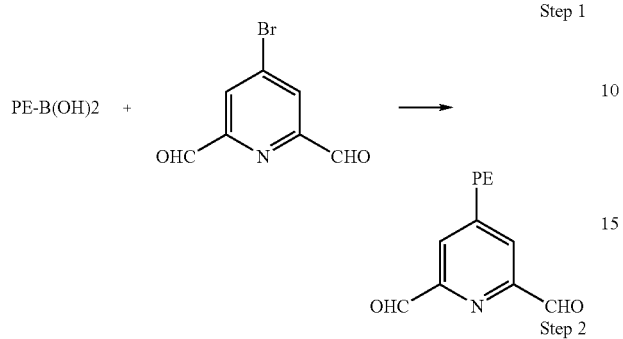

The polyethylene-tethered tetradentate, macrocyclic ligand, tetraazabicyclo[11.3.1]heptadeca-1(17),2,11,13,15-pentaene is formed in a step-wise fashion as described in the synthetic route listed above. Coupling of alkylboronic acids and aryl bromides is known to be catalyzed by palladium complexes. See generally Chem. Eur. J. 2003, 9, 3216-3227. Coupling of 4-bromo-2,6-diformylpyridine with 4-acetoxymethylphenyl boronic acid to give 4-(4-acetoxymethylphenyl)-2,6-diformylpyridine is known (see generally J. Org. Chem. 2005, 70, 7956-7962). Decyldihydroxyborane can be prepared from dibromoborane and 1-decene in refluxing methylene chloride (see generally J. Org. Chem. 68, 2003, 3405). PE-B(OH)$_2$ can be prepared similarly.

In the first step, for example, PE-CH=CH$_2$ in dichloroethane is treated with dibromoborane; the mixture is heated to dissolve the olefin so that the reaction can take place. Water is added at 0° C. and then the mixture is heated. After cooling to room temperature, the solvent is decanted and the solid residue is recrystallized from hot toluene or octane. Coupling of PE-B(OH)$_2$ (15 mmol), 4-bromo-2,6-diformylpyridine (10 mmol), palladium acetate (0.5 mol % Pd) and PCy3 (1 mol %), K$_3$PO$_4$ (20 mmoles), 1,4-dioxane (30 mL), 100° C. for 18 hours gives the desired polymer-tethered pyridine.

The procedure for step 2 and preparing the Co catalyst is similar to the procedure described for the reaction of diacetyl pyridine with 3,3' diaminodiproplyamine in the presence of cobalt bromide as described by D. H. Busch and K. M. Long in Inorganic Chemistry 9(3) (1970) 511 (see also U.S. Pat. No. 5,602,220). The substituted diacetylpyrine from step 1 (0.1 mol) is dissolved in 150 mL of hot toluene. A solution 0.10 mole of cobalt (II) bromide in N,N-dimethylformamide is added. The resulting mixture is heated until a homogeneous solution is formed and 3,3'-diaminodipropylamine (0.1 moles) added. Four mL of glacial acetic acid is added and the mixture heated to 65-75° C. for several hours. Upon cooling, the cobalt complex precipitates out and is collected.

Example 35

Pydiene

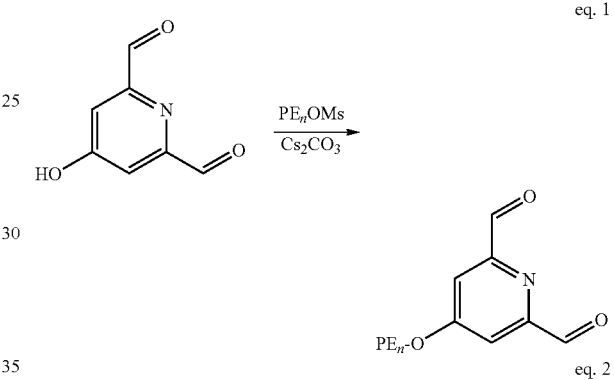

In the first step, 3-Hydroxy-2,6-diformylpyridine is prepared from 3-hydroxypyridine as described in WO 89/11868. A suspension of polyethylene mesylate, cesium carbonate (1.2 equiv) and the functionalized pyridine is prepared in a 1:1 mixture of N,N-dimethylformamide and toluene and the reaction is heated to 100° C. for several hours. Upon cooling, the product is collected via filtration and washed with water and methanol.

In the second step, a suspension of the polyethylene-substituted diformylpyridine from step 1 is prepared in toluene and warmed until solution is homogeneous before adding a solution of anhydrous cobalt bromide (1 equiv) in N,N-dimethylformamide, followed by 2,2'-diaminodiethylamine (1 equiv). The reaction mixture is then heated to reflux for several hours. Upon cooling, the cobalt complex is collected via filtration and washed with water and methanol.

What is claimed is:

1. A process for the polymerization and co-polymerization of olefinic monomers employing a polymer-bound chain transfer catalyst to produce a molecular weight-controlled macronomer, said process comprising:
    (i) forming a polymerization medium comprising said olefinic monomers and said chain transfer catalyst, and optionally solvent(s), and
    (ii) polymerizing said olefinic monomers;
    (iii) effecting a phase partition of the chain transfer catalyst; and
    (iv) separating said chain transfer catalyst from said macromonomer, wherein said chain transfer catalyst is represented by a central moiety CAT and one or more substituents Poly positioned on CAT to form CAT-(Poly)x wherein said Poly radicals are linear or branched polymers with an average chain length equal to or greater than 20 atoms;
    wherein x is an integer greater than or equal to 1;
    wherein CAT comprises a metal atom coordinated to one or more ligands;
    and wherein said moiety CAT is defined such that the compound CAT-($R^1$)x is a chain transfer catalyst, wherein $R^1$ is independently H or $CH_3$; and wherein said Poly radicals are covalently bonded to one or more of said ligands.

2. The process of claim 1, further comprising recycling said chain transfer catalyst into the polymerization process after separation.

3. The process of claim 1, wherein said phase partition is controlled by one or more of the following:
    adjusting said reaction medium's temperature;
    adjusting pressure of said reaction;
    adding solvent to said reaction medium; and
    adding one or more chemical agent(s) to said reaction medium.

4. The process of claim 1, wherein the olefinic monomers or comonomers are selected from the group consisting of (meth)acrylic acids, (meth)acrylate esters, acrylic esters, (meth)acrylamides, methacrylonitrile, acrylonitrile, olefinically unsaturated acids, styrenes, esters of vinyl alcohols, vinyl silanes and vinyl halides.

5. The process of claim 4, wherein the olefinic monomers and comonomers are selected from the group consisting of methyl (meth)acrylate, ethyl (meth)acrylate, propyl (meth)acrylate, n-butyl (meth)acrylate, 2-ethylhexyl (meth)acrylate, isobutyl (meth)acrylate, isobornyl (meth)acrylate, benzyl (meth)acrylate, phenyl (meth)acrylate; glycidyl (meth)acrylate, stearyl (meth)acrylate, 2-hydroxyethyl (meth)acrylate, 2-hydroxypropyl (meth)acrylate, 3-hydroxypropyl (meth)acrylate, hydroxybutyl (meth)acrylate, diethylaminoethyl (meth)acrylate, triethyleneglycol (meth)acrylate; (meth)acrylic acid, vinyl benzoic acid, alphamethylvinyl benzoic acid, para-vinyl benzene sulfonic acid; (meth)acrylonitrile; styrene, alpha methyl styrene, diethylamino styrene, diethylamino alphamethylstyrene, para-methylstyrene; methacrylamide, N-tert-butyl methacrylamide, N-n-butyl methacrylamide, N-methylol methacrylamide, N-ethylol methacrylamide, N-tert-butyl acrylamide, N-n-butyl acrylamide, N-methylol acrylamide, N-ethylol acrylamide; trimethoxysilylpropyl (meth)acrylate, triethoxysilylpropyl (meth)acrylate, tributoxysilylpropyl (meth)acrylate, dimethoxymethylsilylpropyl (meth)acrylate, diethoxymethylsilylpropyl (meth)acrylate, dibutoxymethylsilylpropyl (meth)acrylate, diisopropoxymethylsilylpropyl (meth)acrylate, dimethoxysilylpropyl (meth)acrylate, diethoxysilylpropyl (meth)acrylate, dibutoxysilylpropyl (meth)acrylate, and diisopropoxysilylpropyl (meth)acrylate; itaconic acid; vinyl silane, vinyl acetate, vinyl butyrate, vinyl chloride, vinyl fluoride, and vinyl bromide.

6. The process of claim 1, wherein CAT-(Poly)$_x$ is represented by Structure IV, and comprises a charge neutral compound or a monocation or a dication,

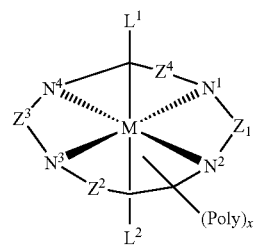

IV wherein Structure IV is comprised of a central metal atom M, coordinated by four nitrogen atoms, $N^1$, $N^2$, $N^3$, $N^4$ wherein at least 3 of the said nitrogen atoms are independently linked by the bridging groups $Z^1$, $Z^2$, $Z^3$ and $Z^4$;

wherein at least two bridging groups are independently selected from a group of two or three atom segments wherein the atoms in said segment are independently chosen from C, N, B or O;

wherein said two or three atom segments may optionally be part of a ring structure; and wherein optionally $Z^2$ and $Z^4$ or $Z^1$ and $Z^3$ may each independently be an O—H—O, N—H—O or N—H—N hydrogen bridging group;

wherein at least two of said nitrogen atoms $N^1$, $N^2$, $N^3$, and $N^4$ are independently chosen to be a member of an azomethine or diazamethine moiety of the general structure —N=C or —N=N or optionally a part of a 5 or 6 membered heterocyclic ring system;

wherein said azomethine or diazomethine moieties are a part of one or more of the bridging group $Z^1$, $Z^2$, $Z^3$ and $Z^4$;

wherein x=1-8 and each Poly is independently chosen to be connected to the group consisting of $N^1$, $N^2$, $N^3$, $N^4$, $Z^1$, $Z^2$, $Z^3$, $Z^4$, $L^1$, and $L^2$;

wherein $L^1$ and $L^2$ represent optional axial ligands coordinated to the metal M and are each independently selected from the group consisting of water, alcohols, ethers, thioethers, amines, pyridines, imidazoles, phosphines, phosphites, arsines, isonitriles, carbonyl and carboxylate, and optionally each $L^1$ and $L^2$ may be Poly;

wherein one of the ligands, either $L^1$ or $L^2$, may optionally be selected from the group consisting of halide, hydride, substituted or unsubstituted alkyl, aryl, and heteroaryl radicals.

7. The process of claim 6 wherein Poly represents a linear or branched polymer radical with an average chain length greater than or equal to 20 atoms, wherein (Poly)$_x$ is derived from Poly-H and where Poly-H is characterized as being soluble in the reaction medium during said polymerization process.

8. The process of claim 6 wherein Poly is a moiety comprising a polymer selected from the group consisting of polyethylene, ethylene/alpha-olefin copolymer, linear or branched polyether, fluoropolymer, oxyalkylated polyethylene polymer, linear polystyrenes, poly(isopropylacrylamide), polyisobutylene and copolymers thereof, said polymer having an average chain length equal to or greater than 20 atoms.

9. The process of claim 6 where at least three of the four bridging groups $Z^1$, $Z^2$, $Z^3$ and $Z^4$ are present and are independently selected from the group consisting of $(R^2)C\!=\!C(R^3)\!=\!C(R^4)$ and $(R^5)C\!=\!N\!=\!C(R^6)$; and where $R^2$, $R^3$, $R^4$, $R^5$, $R^6$ is a radical independently selected from the group consisting of hydrogen, substituted or unsubstituted aliphatic, aromatic and heteroaromatic and can optionally be part of a cyclic system.

10. The process of claim 9 wherein the composition of the chain transfer catalyst is represented by the structures:

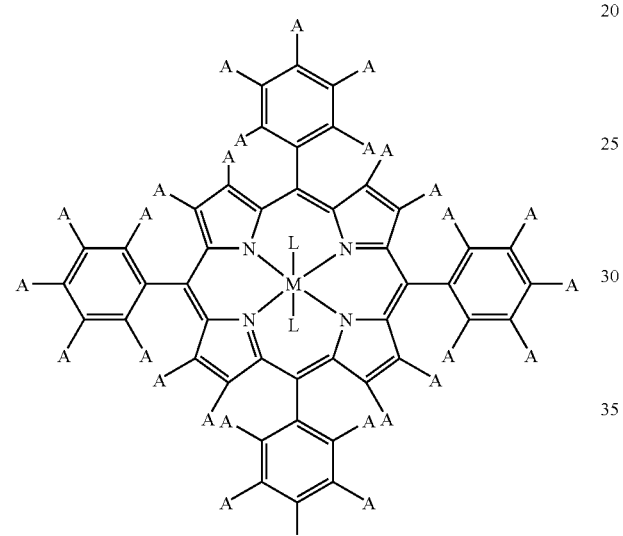

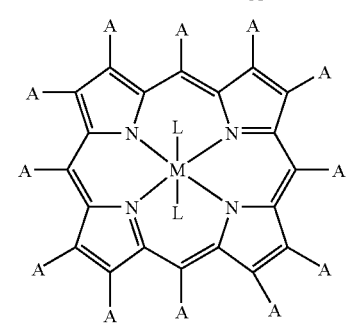

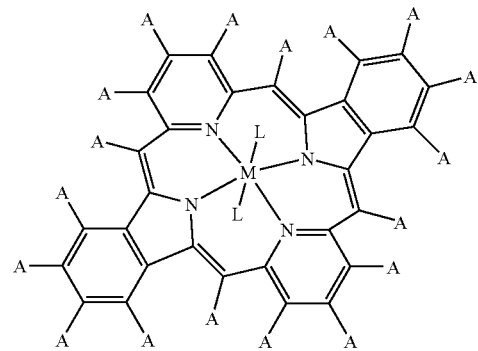

-continued

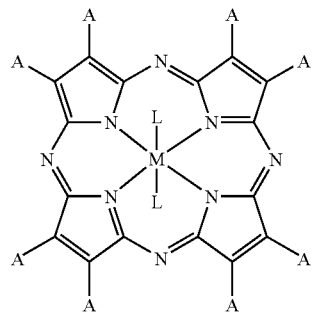

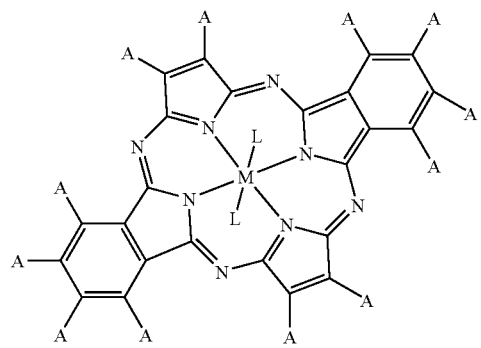

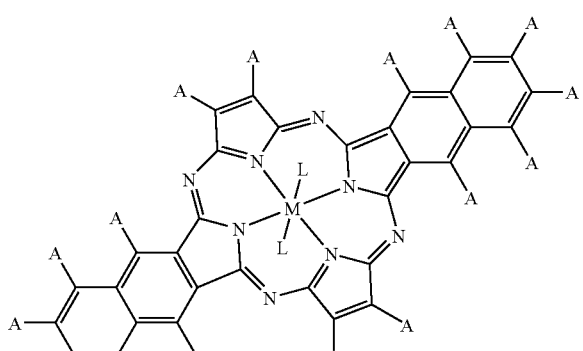

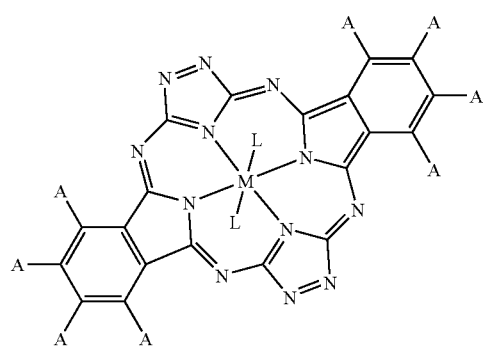

-continued

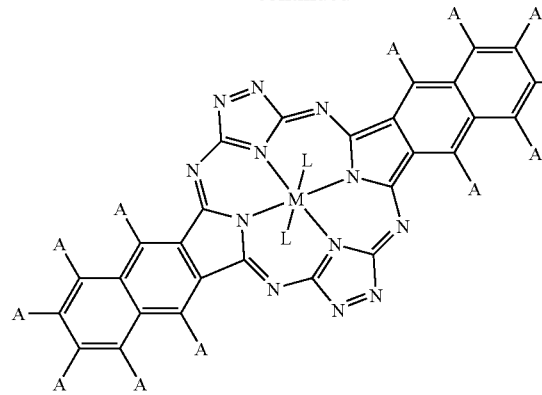

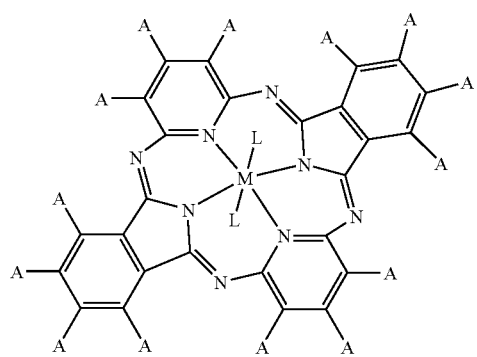

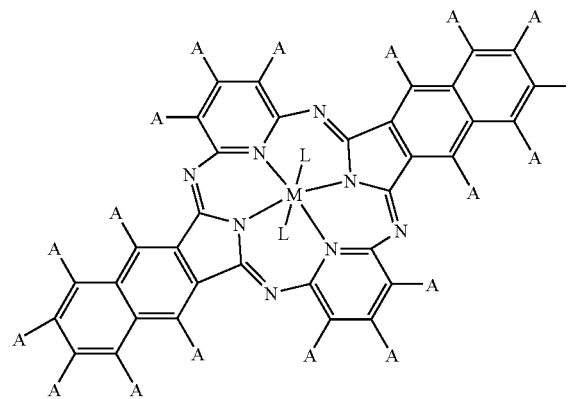

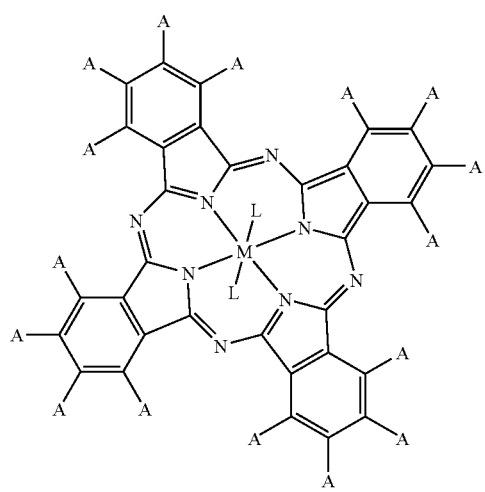

-continued

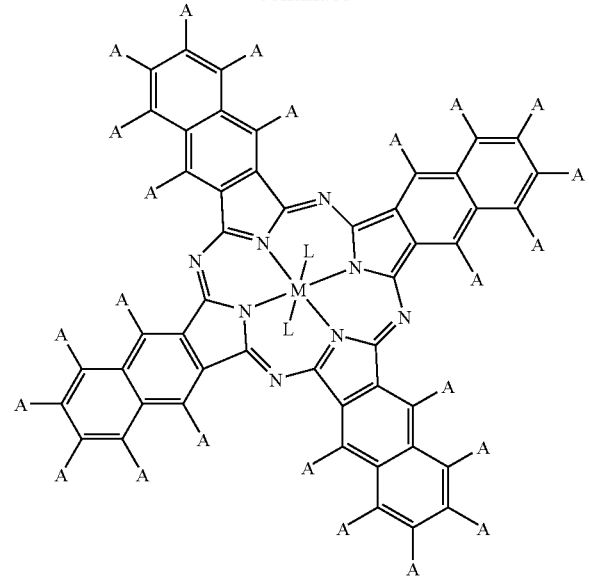

wherein M represents a cobalt (II), cobalt (III), iron (II) or iron (III) metal atom;

wherein each A is independently selected from the group consisting of $R^{51}$, $OR^{52}$ and Y-Poly;

wherein in the range of from 1 to 8 of said A groups is Y-Poly;

wherein $R^{51}$ is independently chosen from hydrogen, halide, a substituted or unsubstituted alkyl, aryl, or heteroaryl radical;

wherein $R^{52}$ is independently chosen from a substituted or unsubstituted alkyl, aryl, or heteroaryl radical;

wherein Y represents a linker moiety selected from the group of diradicals consisting of unsubstituted and substituted alkyl, unsubstituted and substituted aryl, unsubstituted and substituted heteroaromatic, —O—, —C(O)O—, —OC(O)—, —S—, —C(S)O—, —N($R^{53}$)C(O)—, —C(O)N($R^{54}$)—, —S(O)$_2$ $_O$—, —S(O)$_2$N($R^{55}$)—, —OS(O)$_2$—, —N($R^{56}$)S(O)$_2$—, —CH$_2$—, —OC(O)O—, —OC(O)N($R^{57}$)—, —N($R^{58}$)— and —N($R^{59}$)C(O)O—;

wherein each $R^{53}$, $R^{54}$, $R^{55}$, $R^{58}$, $R^{57}$, $R^{58}$, $R^{59}$ is independently selected from the group consisting of hydrogen, substituted or unsubstituted alkyl, aryl, and heteroaryl radical;

and wherein said chain transfer catalyst may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate;

and wherein one ligand L may optionally be selected from the group consisting of halide, hydride, substituted or unsubstituted alkyl, aryl, and heteroaryl radicals.

11. The process of claim 6 where $Z^1$ and $Z^3$ are ($R^7$)C—C($R^8$) or ($R^9$)C—C($R^{10}$)=C($R^{11}$);

where $R^7$, $R^8$, $R^9$, $R^{10}$, $R^{11}$ is a radical independently selected from the group consisting of hydrogen, substituted or unsubstituted aliphatic, aromatic and heteroaromatic and may optionally be part of a cyclic system; and where $Z^2$ and $Z^4$ are independently selected from the group consisting of O—H—O; N—H—O; N—H—N; O—B(OR$^{12}$)(OR$^{13}$)—O; O—B(Br)$_2$—O; O—B(Cl)$_2$—O;

O—B(F)$_2$—O; O—B(R$^{14}$)$_2$—O; (R$^{15}$)C=C(R$^{16}$); (R$^{17}$)C(H)—C(H)(R$^{18}$); (R$^{19}$)C(H)—C(R$^{20}$)$_2$—C(H)(R$^{21}$); and (R$^{22}$)C—C(R$^{23}$), where R$^{12}$, R$^{13}$, and R$^{14}$ are radicals independently selected from the group consisting of substituted or unsubstituted aliphatic, aromatic and heteroaromatic;

where R$^{15}$, R$^{16}$, R$^{17}$, R$^{18}$, R$^{19}$, R$^{20}$, R$^{21}$, R$^{22}$, R$^{23}$ are radicals independently selected from the group consisting of hydrogen, substituted or unsubstituted aliphatic, aromatic and heteroaromatic and may optionally be part of a cyclic system.

12. The process of claim 11 wherein the composition of the chain transfer catalyst is represented by the structures:

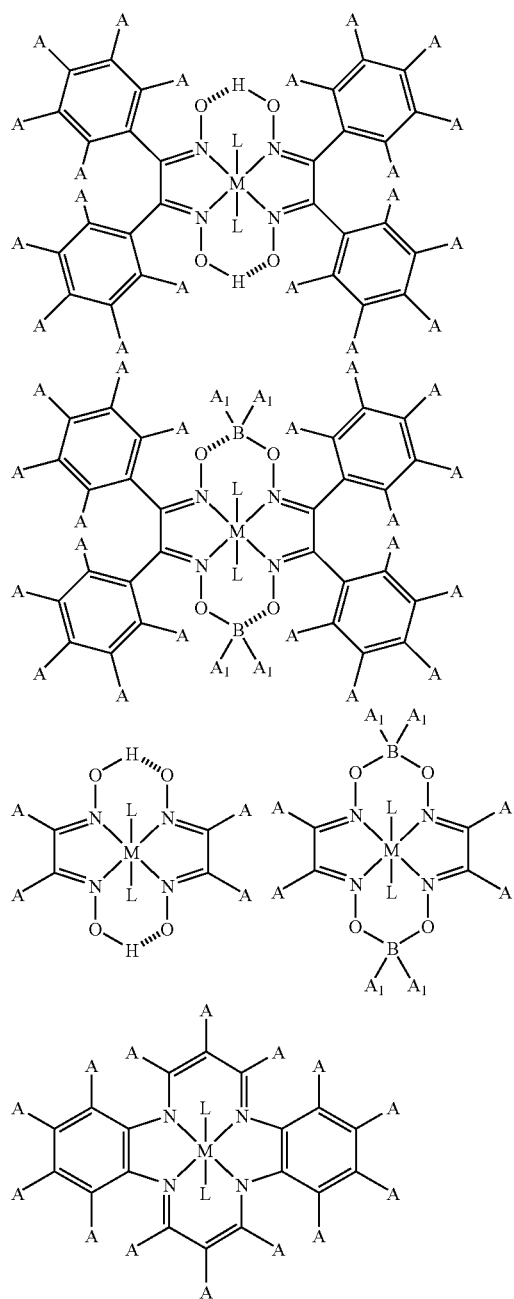

wherein M represents a cobalt (II) or cobalt (III) metal atom;

wherein each A is independently selected from the group consisting of R$^{60}$, OR$^{61}$ and Y-Poly;

wherein each A$_1$ is independently selected from the group consisting of R$^{62}$OR$^{63}$, F, Cl, Br, and Y-Poly; with the proviso that in the range of from 1 to 8 of said A and A$^1$ groups is Y-Poly wherein R$^{60}$ is independently chosen from hydrogen, halide, a substituted or unsubstituted, alkyl, aryl, or heteroaryl radical;

wherein each R$^{61}$, R$^{62}$, R$^{63}$ is independently chosen from a substituted or unsubstituted, alkyl, aryl, or heteroaryl radical;

wherein Y represents a linker moiety selected from the group of diradicals consisting of unsubstituted and substituted alkyl, unsubstituted and substituted aryl, unsubstituted and substituted heteroaromatic, —O—, —C(O)O—, —OC(O)—, —S—, —C(S)O—, —N(R$^{64}$)C(O)—, —C(O)N(R$^{65}$)—, —S(O)$_2$ $_O$—, —$_{S(O)2}$N(R$^{66}$)—, —OS(O)$_2$—, —N(R$^{67}$)S(O)$_2$—, —CH$_2$—, —OC(O)O—, —OC(O)N(R$^{68}$)—, —N(R$^{69}$)— and —N(R$^{70}$)C(O)O—, wherein each R$^{64}$, R$^{65}$, R$^{66}$, R$^{67}$, R$^{68}$, R$^{69}$, R$^{70}$ is independently chosen from hydrogen, a substituted or unsubstituted alkyl, aryl, or heteroaryl radical;

and wherein said chain transfer catalyst may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate and where said L may optionally be substituted with Y-Poly;

and wherein there is at least one Y-Poly substitiuent and wherein one ligand L may optionally be selected from the group consisting of halide, hydride, substituted or unsubstituted alkyl, aryl, and heteroaryl radicals.

13. The process of claim 6 where Z$^1$ and Z$^3$ are C(R$^{24}$)—C(R$^{25}$)=C(R$^{26}$), (R$^{27}$)C=N—C(R$^{28}$) or (R$^{30}$)C—C(R$^{31}$), and Z$^2$ is (R$^{30}$)C=C(R$^{31}$); (R$^{32}$)C(H)—C(H)(R$^{33}$); (R$^{34}$)C(H)—C(R$^{35}$)$_2$—C(H)(R$^{36}$); or (R$^{37}$)C—C(R$^{38}$); and where each of R$^{24}$, R$^{25}$, R$^{26}$, R$^{27}$, R$^{28}$, R$^{30}$, R$^{31}$ R$^{32}$, R$^{33}$, R$^{34}$, R$^{35}$, R$^{36}$, R$^{37}$, R$^{38}$ is a radical independently selected from the group consisting of hydrogen, substituted or unsubstituted aliphatic, aromatic and heteroaromatic radicals and can optionally be part of a cyclic system.

14. The process of claim 6 wherein the composition of said chain transfer catalyst is represented by the structure:

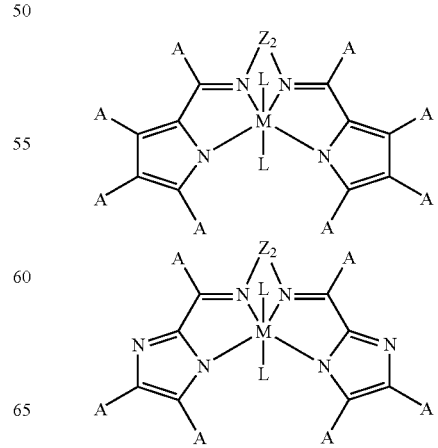

-continued

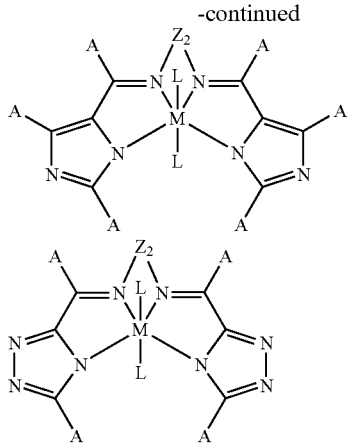

wherein M represents a cobalt (II) or cobalt (III) metal atom;

wherein each A is independently selected from the group consisting of $R^{71}$, $OR^{72}$, and Y-Poly;

wherein $R^{71}$ is independently selected from the group consisting of hydrogen, halide, substituted or unsubstituted, alkyl, aryl, and heteroaryl radical;

wherein $R^{72}$ is independently selected from the group consisting of substituted or unsubstituted, alkyl, aryl, and heteroaryl radical;

wherein Y represents a moiety selected from the group of diradicals consisting of unsubstituted and substituted alkyl, unsubstituted and substituted aryl, unsubstituted and substituted heteroaromatic, —O—, —C(O)O—, —OC(O)—, —S—, —C(S)O—, —N($R^{73}$)C(O)—, —C(O)N($R^{74}$)—, —S(O)$_2$ $_O$—, —$_{S(O)2}$N($R^{75}$)—, —OS(O)$_2$ —N($R^{76}$)S(O)$_2$—, —CH$_2$—, —O C(O)O —, —OC(O)N($R^{77}$)—, —N($R^{78}$)—and —N($R^{79}$)C(O)O—, wherein each $R^{73}$, $R^{74}$, $R^{75}$, $R^{76}$, $R^{77}$, $R^{78}$, $R^{79}$ is selected from the group consisting of hydrogen, a substituted or unsubstituted alkyl, aryl, and heteroaryl radical;

wherein $Z_2$ is a diradical selected from the group consisting of —(C($R^{80}$)$_2$)$_n$— where n equals 1,2,3,4,5,6,7 or 8, and structures:

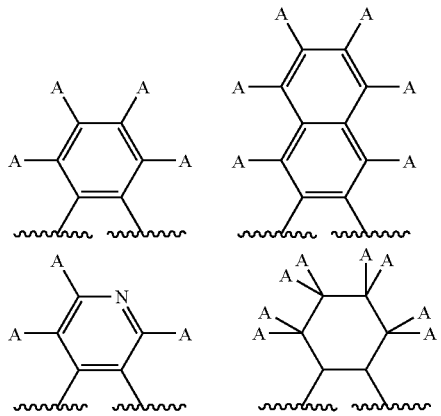

and wherein said chain transfer catalyst may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate;

wherein $R^{80}$ is independently chosen from hydrogen or alkyl;

wherein one ligand L may optionally be selected from the group consisting of halide, hydride, substituted or unsubstituted alkyl, aryl, heteroaryl, and vinyl radicals with the proviso that the total number of said A groups that are chosen to be Y-Poly is in the range of from 1 to 8;

wherein $Z^2$ is ($R^{30}$)C—C($R^{31}$); ($R^{32}$)C(H)—C(H)($R^{33}$); ($R^{34}$)C(H)—C($R^{35}$)$_2$—C(H)($R^{36}$); or ($R^{37}$)C—C($R^{38}$); and where each $R^{30}$, $R^{31}$, $R^{32}$, $R^{33}$, $R^{34}$, $R^{35}$, $R^{36}$, $R^{37}$, and $R^{38}$ is a radical selected from the group consisting of hydrogen, substituted or unsubstituted aliphatic, aromatic and heteroaromatic radicals and can optionally be part of a cyclic system.

15. The process of claim 6 where $Z^1$ and $Z^2$ are $R^{39}$C—C($R^{40}$)=C($R^{41}$) or ($R^{42}$)C—C($R^{43}$); and $Z^3$ and $Z^4$ are ($R^{42}$)C=C($R^{43}$); ($R^{44}$)C(H)—C(H)($R^{45}$); ($R^{46}$)C(H)—C($R^{47}$)$_2$—C(H)($R^{48}$); ($R^{49}$)C—C($R^{50}$) or (C($R^{90}$)$_2$)$_n$, wherein (C($R^{90}$)$_2$)$_n$ represents an aliphatic diradical where n equals 1, 2, 3, 4, 5, 6, 7 or 8; wherein $R^{90}$ is selected from the group consisting of hydrogen and alkyl radical; and wherein $R^{39}$, $R^{40}$, $R^{41}$, $R^{42}$, $R^{43}$ $R^{44}$, $R^{45}$, $R^{46}$, $R^{47}$, $R^{48}$, $R^{49}$, $R^{50}$ is a radical independently selected from the group consisting of hydrogen, substituted or unsubstituted aliphatic, aromatic and heteroaromatic and can optionally be part of a cyclic system.

16. The process of claim 15 wherein the composition of the catalyst is represented by the structure:

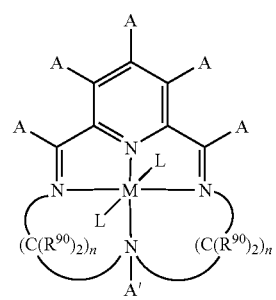

D wherein M represents a cobalt (II) or cobalt (III) metal atom;

wherein each A and A' is independently chosen from $R^{81}$, $OR^{82}$ or Y-Poly and wherein at least one A is Y-Poly;

wherein $R^{81}$ is selected from the group consisting of hydrogen, halide, a substituted or unsubstituted alkyl, aryl, and heteroaryl radical;

wherein $R^{82}$ is selected from the group consisting of substituted or unsubstituted alkyl, aryl, and heteroaryl radical;

wherein Y represents a linker moiety selected from the group of diradicals consisting of unsubstituted and substituted alkyl, unsubstituted and substituted aryl, unsubstituted and substituted heteroaromatic, —O—, —C(O)O—, —OC(O)—, —S—, —C(S)O—, —N($R^{83}$)C(O)—, —C(O)N($R^{84}$)—, —S(O)$_2$O —, —S(O)$_2$N($R^{85}$)—, —OS(O)$_2$, —N($R^{86}$)S(O)$_2$—, —CH$_2$—, —OC(O)O—, —OC(O)N($R^{87}$)—, —N($R^{88}$)—and —N($R^{89}$)C(O)O—, wherein each $R^{83}$, $R^{84}$, $R^{85}$, $R^{86}$, $R^{87}$, $R^{88}$, $R^{89}$ is selected from the group consisting of hydrogen, a substituted or unsubstituted alkyl, aryl, and heteroaryl radical;

wherein (C($R^{90}$)$_2$)$_n$ represents an aliphatic diradical where n equals 1, 2, 3, 4, 5, 6, 7 or 8;

wherein $R^{90}$ is independently hydrogen or alkyl radical;

and wherein said chain transfer catalyst may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate; and wherein D is a divalent anion or two monovalent anions selected from the group consisting of $NO_3^-$, $Cl^-$, $Br^-$, $I^-$, $N_3^-$, $CN^-$, $OH^-$, $C_2O_4^{2-}$, $BF_4^-$, $PF_6^-$, $SbF_6^-$, $ClO_4^-$, $NCS^-$, $SO_4^{2-}$, $CO_3^{2-}$ and $(R^{91})CO_2^-$, where $R^{91}$ is a C1 to C12 alkyl.

17. A polymer product made by the process of claim 1, wherein the color of the polymer product has a lower AHPA yellowness index and a lower chroma (according to the CIE Lab 1976 calculation) when compared to that of a second polymer product produced using a homogeneous catalyst CAT-Rx where R is H or a C1-C19 radical; wherein said polymer product and said second polymer product are produced under the same polymerization conditions.

18. A coating comprising a polymer product made according to any of the processes of claim 17.

19. An article coated with the composition of claim 18.

20. A chain transfer catalyst composition represented by central moiety CAT and one or more substituents Poly positioned on CAT to form CAT-(Poly)x wherein said Poly radicals are linear or branched polymers with an average chain length equal to or greater than 20 atoms;
wherein x is an integer greater than or equal to 1;
wherein CAT comprises a metal atom coordinated to one or more liqands; and
wherein said moiety CAT is defined such that the compound CAT-$(R^1)$x is a chain transfer catalyst,
wherein $R^1$ is independently H or $CH_3$; and
wherein said Poly radicals are covalently bonded to one or more of said liqands.

21. The composition of claim 20, wherein CAT-(Poly)$_x$ is represented by Structure IV, and comprises a charge neutral compound or a monocation or a dication,

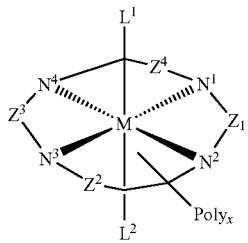

IV wherein Structure IV is comprised of a central metal atom M, coordinated by four nitrogen atoms, $N^1$, $N^2$, $N^3$, $N^4$ wherein at least 3 of the said nitrogen atoms are independently linked by the bridging groups $Z^1$, $Z^2$, $Z^3$ and $Z^4$;
wherein at least two bridging groups are independently selected from a group of two or three atom segments wherein the atoms in said segment are independently chosen from C, N, B or O;
wherein said two or three atom segments may optionally be part of a ring structure; and wherein optionally $Z^2$ and $Z^4$ or $Z^1$ and $Z^3$ may each independently be an O—H—O, N—H—O or N—H—N hydrogen bridging group;
and wherein at least two of said nitrogen atoms $N^i$, $N^2$, $N^3$, and $N^4$ are independently chosen to be a member of an azomethine or diazamethine moiety of the general structure —N=C or —N=N or optionally a part of a 5 or 6 membered heterocyclic ring system;
and wherein said azomethine or diazamethine moieties are a part of 1 or more of the bridging group $Z^1$, $Z^2$, $Z^3$ and $Z^4$;
wherein x=1-8 and each Poly is independently chosen to be connected to the group consisting of $N^1$, $N^2$, $N^3$, $N^4$, $Z^1$, $Z^2$, $Z^3$, $Z^4$, $L^1$, and $L^2$;
wherein $L^1$, and $L^2$ represent optional axial ligands coordinated to the metal M and are each independently selected from the group consisting of water, alcohols, ethers, thioethers, amines, pyridines, imidazoles, phosphines, phosphites, arsines, isonitriles, carbonyl and carboxylate, and optionally each $L^1$ and $L^2$ may be Poly;
wherein one of the ligands, either $L^1$ or $L^2$, may optionally be selected from a group consisting of halide, hydride, substituted or unsubstituted alkyl, aryl, and heteroaryl radicals.

22. The composition of claim 21 wherein Poly is a moiety comprising a polymer selected from the group consisting of polyethylene, ethylene/alpha-olefin copolymer, linear or branched polyether, fluoropolymer, oxyalkylated polyethylene polymer, linear polystyrenes, poly(isopropylacrylamide), polyisobutylene and copolymers thereof, said polymer having an average chain length equal to or greater than 20 atoms.

23. The composition of claim 21 where at least three of the four bridging groups $Z^1$, $Z^2$, $Z^3$ and $Z^4$ are independently selected from the group consisting of $(R^2)C$—$C(R^3)$=$C(R^4)$ and $(R^5)C$—N=$C(R^6)$; and where $R^2$, $R^3$, $R^4$, $R^5$, $R^6$ is a radical independently selected from the group consisting of hydrogen, substituted or unsubstituted aliphatic, aromatic and heteroaromatic and can optionally be part of a cyclic system and where the fourth bridging group is optional.

24. The composition of claim 21 wherein the composition of the catalyst is represented by the structures:

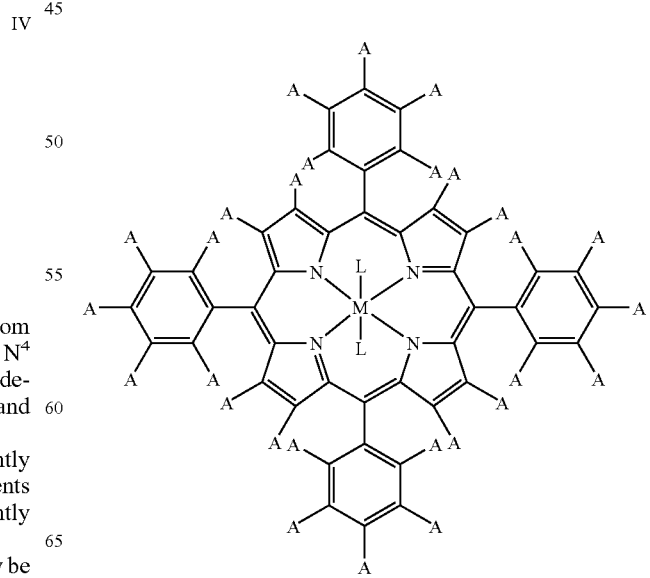

67
-continued
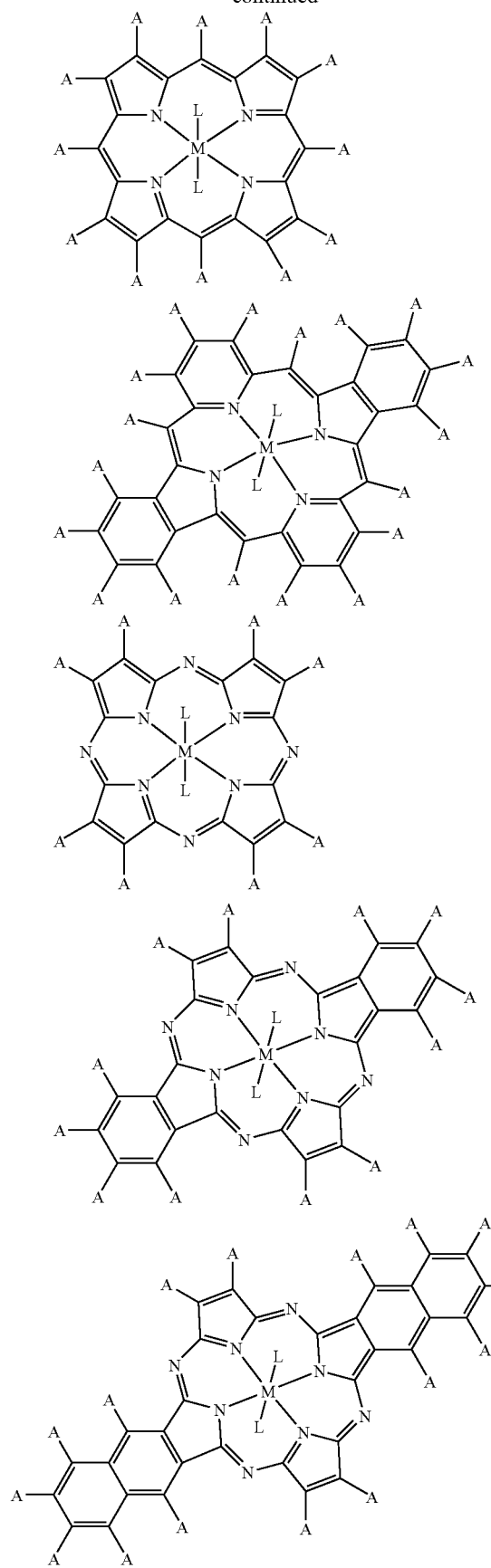
68
-continued
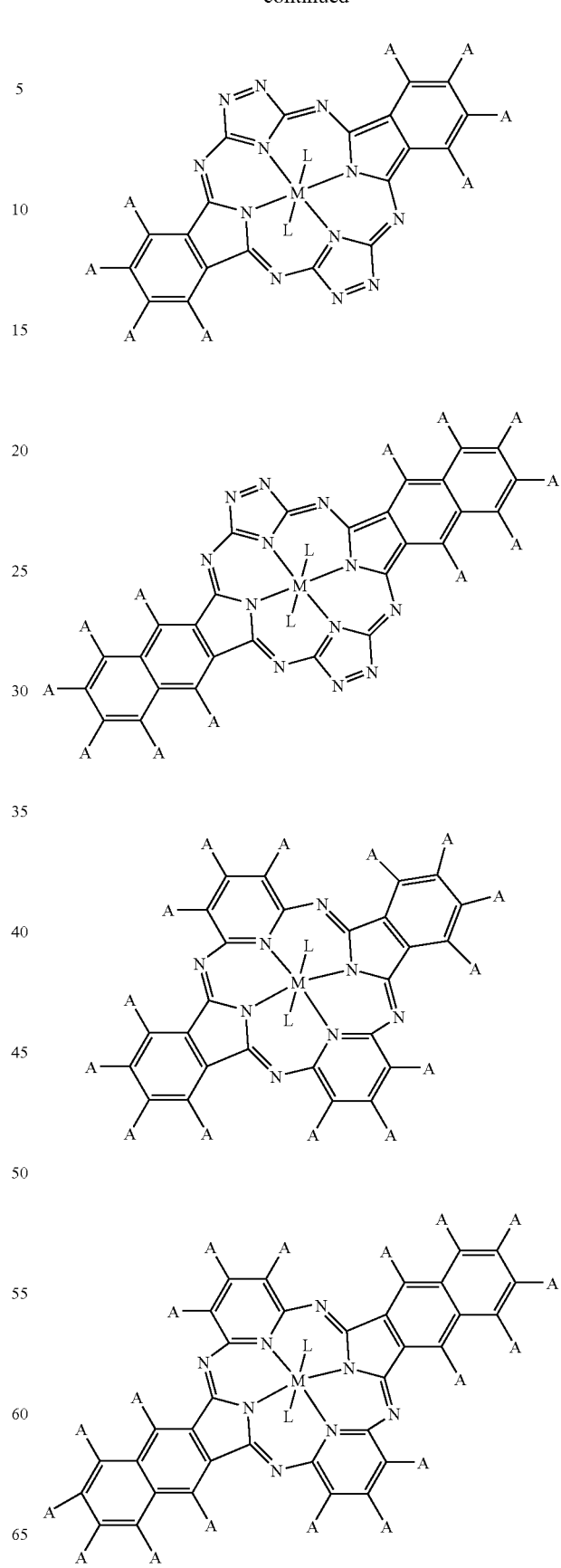

-continued

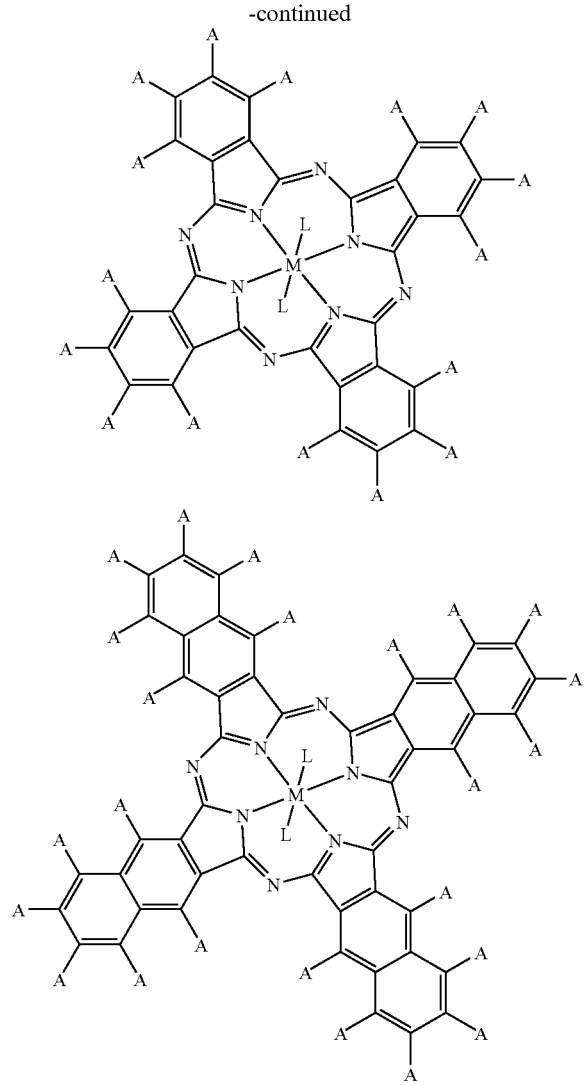

wherein M represents a cobalt (II), cobalt (III), iron (II) or iron (III) metal atom;

wherein each A is independently selected from the group consisting of $R^{51}$, $OR^{52}$ and Y-Poly and wherein in the range of from 1 to 8 of said A groups is Y-Poly;

wherein $R^{51}$ is independently selected from the group consisting of hydrogen, halide, a substituted or unsubstituted alkyl, aryl, and heteroaryl radical;

wherein $R^{52}$ is independently selected from the group consisting of substituted or unsubstituted alkyl, aryl, and heteroaryl radical;

wherein Poly represents a linear or branched polymer radical with an average chain length greater than or equal to 20 atoms and where Poly-H is characterized as being soluble in the reaction medium during the polymerization process;

wherein Y represents a linker moiety selected from the group of diradicals consisting of unsubstituted and substituted alkyl, unsubstituted and substituted aryl, unsubstituted and substituted heteroaromatic, —O—, —C(O) O—, —O C(O)—, —S—, —C(S)O—, —N($R^{53}$)C (O)—, —C(O)N($R^{54}$)—, —S(O)$_2$ O —, —S(O)$_2$N ($R^{55}$)—, —OS(O)$_2$ —, —N($R^{56}$)S(O)$_2$—, —CH$_2$—, —OC(O)O—, —OC(O)N($R^{57}$)—, —N($R^{58}$)—and —N($R^{59}$)C(O)O—, wherein $R^{53}$, $R^{54}$, $R^{55}$, $R^{56}$, $R^{57}$, $R^{58}$, $R^{59}$ is selected from the group consisting of from hydrogen, a substituted or unsubstituted alkyl, aryl, and heteroaryl radical;

and wherein said chain transfer catalyst may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate;

and wherein one ligand L may optionally be selected from the group consisting of halide, hydride, substituted or unsubstituted alkyl, aryl, and heteroaryl radicals.

25. The composition of claim 21 where $Z^1$ and $Z^3$ are ($R^7$)C—C($R^8$) or ($R^9$)C—C($R^{10}$)=C($R^{11}$) where $R^7$, $R^8$, $R^9$, $R^{10}$, $R^{11}$ is a radical independently selected from the group consisting of hydrogen, substituted or unsubstituted aliphatic, and aromatic and heteroaromatic radicals and may optionally be part of a cyclic system, and where $Z^2$ and $Z^4$ are independently selected from the group consisting of O—H—O; N—H—O; N—H—N; O—B($OR^{12}$)($OR^{13}$)—O; O—B(Br)$_2$—O; O—B(Cl)$_2$—O; O—B(F)$_2$—O and; O—B($R^{14}$)$_2$—O; where $R^{12}$, $R^{13}$, $R^{14}$ is a radical independently selected from the group consisting of substituted or unsubstituted aliphatic, aromatic and heteroaromatic; ($R^{15}$)C=C ($R^{16}$); ($R^{17}$)C(H)—C(H)($R^{18}$); ($R^{19}$)C(H)—C($R^{20}$)$_2$—C) (H)($R^{21}$); and ($R^{22}$)C—C($R^{23}$), and where $R^{15}$, $R^{16}$, $R^{17}$, $R^{18}$, $R^{19}$, $R^{20}$, $R^{21}$, $R^{22}$, $R^{23}$ is a radical independently chosen from the group consisting of hydrogen, substituted or unsubstituted aliphatic, and aromatic and heteroaromatic radicals and may optionally be part of a cyclic system.

26. The composition of claim 25, wherein the structure of the catalyst is represented by:

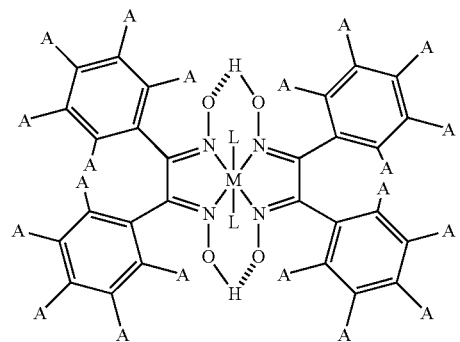

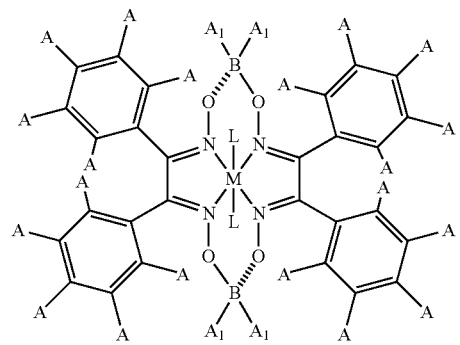

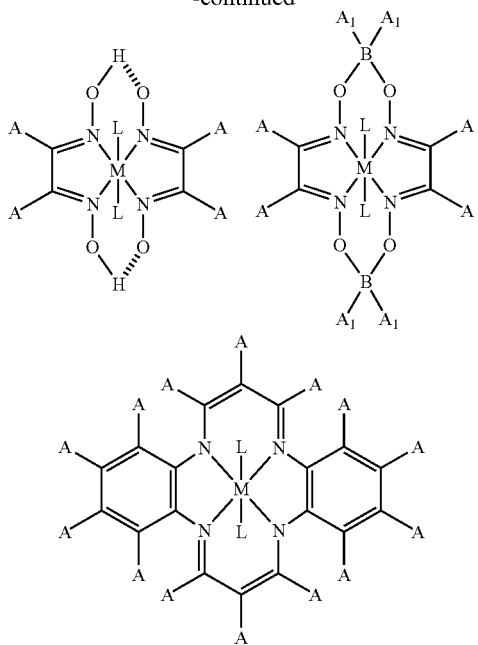

wherein M represents a cobalt (II) or cobalt (III) metal atom;
wherein each A is independently selected from the group consisting of $R^{60}$, $OR^{61}$ and Y-Poly;
wherein each $A^1$ is independently selected from the group consisting of $R^{62}$, $OR^{63}$, F, Cl, Br, and Y-Poly; with the proviso that in the range of from 1 to 8 of said A and $A^1$ groups is Y-Poly;
wherein $R^{60}$ is independently selected from the group consisting of hydrogen, halide, a substituted or unsubstituted, alkyl, aryl, and heteroaryl radical;
wherein each $R^{61}$, $R^{62}$, $R^{63}$ is independently selected from the group consisting of from a substituted or unsubstituted, alkyl, aryl, and heteroaryl radical;
wherein Y represents a linker moiety selected from the group of diradicals consisting of unsubstituted and substituted alkyl, unsubstituted and substituted aryl, unsubstituted and substituted heteroaromatic, —O—, —C(O)O—, —O C(O)—, —S—, —C(S)O—, —N($R^{64}$)C(O)—, —C(O)N($R^{65}$)—, —S(O)$_2$ O —, —S(O)$_2$N($R^{66}$)—, —OS(O)$_2$—, —N($R^{67}$)S(O)$_2$—, —CH$_2$—, —O C(O)O —, —OC(O)N($R^{68}$)—, —N($R^{69}$)— and —N($R^{70}$)C(O)O—, wherein $R^{64}$, $R^{65}$, $R^{66}$, $R^{67}$, $R^{68}$, $R^{69}$, $R^{70}$ is independently chosen from hydrogen, a substituted or unsubstituted alkyl, aryl, or heteroaryl radical;
and wherein said catalysts may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate and where said L may optionally be substituted with Y-Poly;
and wherein there is at least one Y-Poly substituent
and wherein one ligand L may optionally be selected from the group consisting of halide, hydride, substituted or unsubstituted alkyl, aryl, and heteroaryl radicals.

27. The composition of claim 23 where $Z^1$ and $Z^3$ are $R^{24}C$—$C(R^{25})$=$C(R^{26})$ or $(R^{27})C$=N—$C(R^{28})$ or $(R^{30})C$—$C(R^{31})$, and $Z^2$ is$(R^{30})C$=$C(R^{31})$; $(R^{32})C(H)$—$C(H)(R^{33})$; $(R^{34})C(H)$—$C(R^{35})_2$—$C(H)(R^{36})$; $(R^{37})C$—$C(R^{38})$; and where $R^{24}$, $R^{25}$, $R^{26}$, $R^{27}$, $R^{28}$, $R^{30}$, $R^{31}$, $R^{32}$, $R^{33}$, $R^{34}$, $R^{35}$, $R^{36}$, $R^{37}$, $R^{38}$ is a radical independently selected from the group of hydrogen, substituted or unsubstituted aliphatic, aromatic and heteroaromatic radicals and can optionally be part of a cyclic system.

28. The composition of claim 23, wherein the structure of the catalyst is represented by:

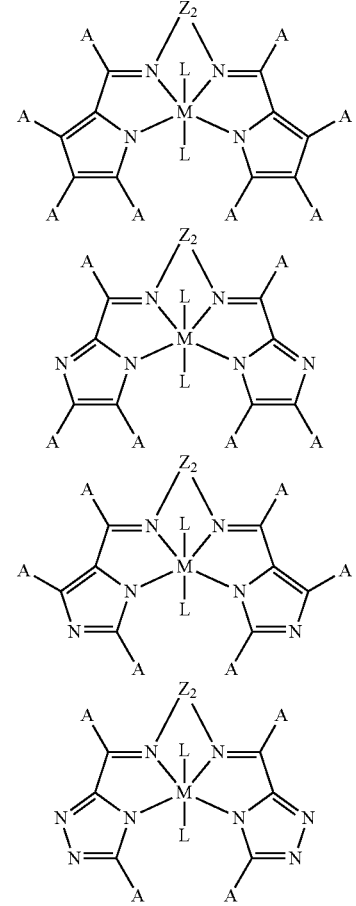

wherein M represents a cobalt (II) or cobalt (III) metal atom;
wherein each A is independently selected from the group consisting of $R^{71}$, $OR^{72}$, and Y-Poly;
wherein $R^{71}$ is independently selected from the group consisting of hydrogen, a substituted or unsubstituted, alkyl, aryl, and heteroaryl radical;
wherein $R^{72}$ is independently selected from the group consisting of substituted or unsubstituted, alkyl, aryl, and heteroaryl radical;
wherein Y represents a linker moiety selected from the group of diradicals consisting of unsubstituted and substituted alkyl, unsubstituted and substituted aryl, unsubstituted and substituted heteroaromatic, —O—, —C(O)O—, —OC(O)—, —S—, —C(S)O—, —N($R^{73}$)C(O)—, —C(O)N($R^{74}$)—, —S(O)$_2$ $_O$ —, —$_{S(O)2}$N($R^{75}$)—, —OS(O)$_2$, —N($R^{76}$)S(O)$_2$—, —CH$_2$—, —OC(O)O—, —OC(O)N($R^{77}$)—, —N($R^{78}$)—and —N($R^{79}$)C(O)O—, wherein $R^{73}$, $R^{74}$, $R^{75}$, $R^{76}$, $R^{77}$, $R^{78}$, $R^{79}$ is independently selected from the group consisting of hydrogen, a substituted or unsubstituted alkyl, aryl, and heteroaryl radical;

wherein $Z_2$ is a diradical selected from the group consisting of —$(CR^{80}_2)_n$— where n equals 1,2,3,4,5,6,7 or 8, and structures:

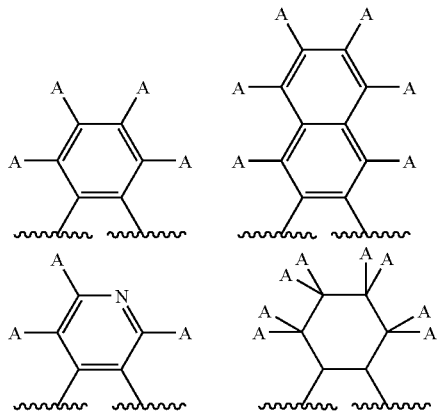

and wherein said chain transfer catalysts may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate;

wherein $R^{80}$ is independently chosen from hydrogen or alkyl;

and wherein one ligand L may optionally be selected from the group consisting of halide, hydride, substituted or unsubstituted alkyl, aryl, heteroaryl, and vinyl radicals; with the proviso that the total number of said A groups that are chosen to be Y-Poly is in the range of from 1 to 8.

29. The composition of claim 23 where $Z^1$ and $Z^2$ are $(R^{39})C$—$C(R^{40})$=$C(R^{41})$ or $(R^{42})C$—$C(R^{43})$; and $Z^3$ and $Z^4$ are $(R^{42})C$=$C(R^{43})$; $(R^{44})C(H)$—$C(H)(R^{45})$; $(R^{46})C(H)$—$C(R^{47})_2$—$C(H)(R^{48})$; $(R^{49})C$—$C(R^{50})$, or $(C(R^{90})_2)_n$, wherein $(C(R^{90})_2)_n$ represents an aliphatic diradical where n equals 1, 2, 3, 4, 5, 6, 7 or 8; wherein $R^{90}$ is selected from the group consisting of hydrogen and alkyl radical, and where $R^{39}$, $R^{40}$, $R^{41}$, $R^{42}$, $R^{43}$ $R^{44}$, $R^{45}$, $R^{46}$, $R^{47}$, $R^{48}$, $R^{49}$, $R^{50}$ is a radical independently selected from the group consisting of hydrogen, substituted or unsubstituted aliphatic, and aromatic and heteroaromatic radicals and can optionally be part of a cyclic system.

30. The catalyst composition of claim 29, wherein the structure of the catalyst is represented by:

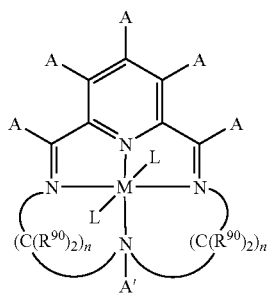

wherein M represents a cobalt (II) or cobalt (III) metal atom;

wherein each A and A' is independently selected from the group consisting of $R^{81}$, $OR^{82}$ and Y-Poly and wherein at least one A is Y-Poly;

wherein $R^{81}$ is independently selected from the group consisting of hydrogen, halide, a substituted or unsubstituted alkyl, aryl, and heteroaryl radical;

wherein $R^{82}$ is independently selected from the group consisting of substituted or unsubstituted alkyl, aryl, and heteroaryl radical;

wherein Y represents a linker moiety selected from the group of diradicals consisting of unsubstituted and substituted alkyl, unsubstituted and substituted aryl, unsubstituted and substituted heteroaromatic, —O—, —C(O)O—, —OC(O)—, —S—, —C(S)O—, —N($R^{83}$)C(O)—, —C(O)N($R^{84}$)—, —S(O)$_2$ O —, —S(O)$_2$N($R^{85}$)—, —OS(O)$_2$—, —N($R^{86}$)S(O)$_2$—, —CH$_2$—, —OC(O)O—, —OC(O)N($R^{87}$)—, —N($R^{88}$)— and —N($R^{90}$)C(O)O —, wherein $R^{83}$, $R^{84}$, $R^{85}$, $R^{86}$, $R^{87}$, $R^{88}$, $R^{89}$ is independently selected from the group consisting of hydrogen, a substituted or unsubstituted alkyl, aryl, and heteroaryl radical;

wherein $(C(R^{90})_2)_n$ represents an aliphatic diradical where n equals 1,2,3,4,5,6,7 or 8;

wherein $R^{90}$ is independently chosen from hydrogen or alkyl radical;

and wherein said catalyst may optionally contain one or two ligands L coordinated to the metal M where L is independently selected from the group consisting of water, alcohols, ethers, thioethers, amines, pyridines, imidazoles, phosphines, phosphites, arsines, isonitriles, carbonyl and carboxylate; and wherein D is a divalent anion or two monovalent anions selected from the group consisting of $NO_3^-$, $Cl^-$, $Br^-$, $I^-$, $N_3^-$, $CN^-$, $OH^-$, $C_2O_4$, $BF_4^-$, $PF_6^-$, $^{SbF}6^-$, $ClO_4^-$, $NCS^-$, $SO_4^{2-}$, $CO_3^-$ and $(R^{91})CO_2^-$, where $R^{91}$ is a C1 to C12 alkyl.

31. A polymer product produced by the polymerization of a monomer mixture comprising the composition of claim 20, wherein the color of the polymer product has a lower APHA yellowness index and a lower chroma (according to the CIE Lab 1976 calculation)when compared to that of a second polymer product produced by the polymerization of the monomer mixture comprising a homogeneous catalyst CAT-Rx where R is H or a C1-C19 radical; wherein said polymer product and said second polymer product are produced under the same polymerization conditions.

32. A coating comprising the polymer product of claim 31.

33. An article comprising the coating of claim 31.

34. The article of claim 33, wherein said article is a vehicle body or vehicle part thereof.

* * * * *